(12) United States Patent
Carter et al.

(10) Patent No.: US 12,695,971 B2
(45) Date of Patent: *Jul. 28, 2026

(54) BIRDHOUSE INCORPORATING A CAMERA FOR REMOTE VIEWING

(71) Applicant: LoveNest Enterprises LLC, Atlanta, GA (US)

(72) Inventors: Robert M. Carter, Atlanta, GA (US); Frederick J. Carter, Atlanta, GA (US)

(73) Assignee: LoveNest Enterprises LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,124

(22) Filed: Jun. 10, 2024

(65) Prior Publication Data

US 2024/0334037 A1    Oct. 3, 2024

Related U.S. Application Data

(63) Continuation-in-part of application No. 17/669,572, filed on Feb. 11, 2022, now Pat. No. 12,052,978.

(60) Provisional application No. 63/507,394, filed on Jun. 9, 2023, provisional application No. 63/160,045, filed on Mar. 12, 2021.

(51) Int. Cl.
| | |
|---|---|
| *H04N 23/57* | (2023.01) |
| *A01K 29/00* | (2006.01) |
| *A01K 31/10* | (2006.01) |
| *A01K 31/12* | (2006.01) |
| *A01K 31/14* | (2006.01) |
| *A01M 29/10* | (2011.01) |
| *A01M 29/16* | (2011.01) |
| *A01M 29/30* | (2011.01) |

(Continued)

(52) U.S. Cl.
CPC .......... *H04N 23/57* (2023.01); *A01K 29/005* (2013.01); *A01K 31/10* (2013.01); *A01K 31/12* (2013.01); *A01K 31/14* (2013.01); *A01M 29/10* (2013.01); *A01M 29/16* (2013.01); *A01M 29/30* (2013.01); *G06V 10/764* (2022.01); *G06V 40/10* (2022.01)

(58) Field of Classification Search
CPC ........ A01K 31/00; A01K 31/06; A01K 31/14; A01K 29/005; A01K 39/01; A01K 31/10; A01K 31/12; A01K 1/03
USPC .......................................... 119/428, 432, 431
See application file for complete search history.

(56) References Cited

U.S. PATENT DOCUMENTS

| | | | | | |
|---|---|---|---|---|---|
| 4,167,917 A | * | 9/1979 | Noll | ....................... | A01K 31/14 |
| | | | | | 119/57.8 |
| 5,746,156 A | * | 5/1998 | Petrides | ................ | A01K 31/14 |
| | | | | | 119/428 |

(Continued)

*Primary Examiner* — Joshua J Michener
*Assistant Examiner* — Nicole Paige Maccrate
(74) *Attorney, Agent, or Firm* — Nelson Mullins Riley & Scarborough LLP; Anthony A. Laurentano

(57)    ABSTRACT

A birdhouse is provided comprising a housing including an inner volume, and the housing also includes a front wall defining a portal. The birdhouse also includes a camera platform disposed within the inner volume. The camera platform separates a nest chamber and a wiring chamber within the inner volume. The portal is in open communication with the nest chamber and an environment external from the housing. The birdhouse also includes a camera connected to the camera platform. The birdhouse also includes a liner box configured to rest within the nest chamber when being used.

19 Claims, 68 Drawing Sheets

(51) Int. Cl.
  *G06V 10/764*  (2022.01)
  *G06V 40/10*  (2022.01)

(56)  References Cited

U.S. PATENT DOCUMENTS

| | | | |
|---|---|---|---|
| 6,170,437 B1* | 1/2001 | Jones | A01K 31/14 |
| | | | 119/431 |
| 7,377,230 B2* | 5/2008 | Conley | A01K 31/14 |
| | | | 119/429 |
| 7,721,677 B1 | 5/2010 | McClaskey | |
| 10,697,947 B1* | 6/2020 | Armitage | H02S 40/30 |
| 11,363,802 B1 | 6/2022 | Nelson | |
| 12,052,978 B2 | 8/2024 | Carter et al. | |
| 2012/0048203 A1 | 3/2012 | Bonham | |
| 2014/0123907 A1 | 5/2014 | James | |
| 2014/0182518 A1 | 7/2014 | Boehm | |
| 2014/0220859 A1* | 8/2014 | McCutchan | A01K 67/30 |
| | | | 119/416 |
| 2015/0047573 A1* | 2/2015 | Tam | A01K 1/03 |
| | | | 119/51.01 |
| 2018/0077908 A1 | 3/2018 | Kratz | |
| 2019/0110444 A1* | 4/2019 | Boehm | A01K 45/00 |
| 2019/0216044 A1* | 7/2019 | Mazzapica | A01K 29/005 |
| 2022/0110300 A1* | 4/2022 | Chong | A01K 39/014 |
| 2023/0380351 A1* | 11/2023 | Ellis | F24F 11/63 |

* cited by examiner

Power Source
922

1300

1310

1308

1368

1350

1386

1385

1388

1302

1346  1325

1500

1554        1564        1562        1557        1564        1556

1560

1552

1558

1550

1503

1505

1500

1552

1558

1556

1546

2100

RECEIVE IMAGE(S)
2102

IDENTIFY AN ANIMAL WITHIN THE IMAGE(S)
2103

DETERMINE ANIMAL RELATED INFORMATION
2104

GENERATE AN OUTPUT NOTIFICATION
2106

DETERMINE WHETHER ANIMAL IS A FRIEND OR A FOE
2108

ACTIVATE AN INTRUDER DEFENSE DEVICE
2110

BIRDHOUSE INCORPORATING A CAMERA FOR REMOTE VIEWING

CROSS-REFERENCE TO RELATED APPLICATION(S)

This application claims priority as a continuation-in-part of U.S. patent application Ser. No. 17/669,572, filed Feb. 11, 2022, entitled "Birdhouse Incorporating a Camera for Remote Viewing," which claims priority to U.S. Provisional Patent Application No. 63/160,045, filed Mar. 12, 2021, entitled "Birdhouse Incorporating a Camera for Remote Viewing." The current application also claims priority to U.S. Provisional Patent Application No. 63/507,394, filed Jun. 9, 2023, entitled "Birdhouse Incorporating a Camera for Remote Viewing," which is hereby incorporated by reference in its entirety.

FIELD

The following relates to a birdhouse and more particularly to a birdhouse with a camera.

BACKGROUND

A birdhouse is a man-made enclosure in which a bird nests. Birdhouses are used to encourage nesting within a given area. Birdwatching is a popular recreational activity in which people view birds in their natural habitat. Unfortunately, when a bird enters a birdhouse, birdwatchers are typically not able to see the bird as the view of the bird is obstructed by walls of the birdhouse.

Birdhouses generally fall into two categories—a nest box category and a roosting box category. Birdhouses configured in the nest box category require a portal (e.g., an opening) above the area where birds will build their nest, and the portal needs to be an appropriate height above the floor of the nest "chamber" to permit the specific species to be able to build a nest and have enough distance between the nest and the portal so that hatchlings will not accidentally fall from or exit the nest until they are ready to fledge. Nest boxes are optimal when the interior dimensions are appropriate for the size of the bird seeking to nest.

By contrast, in birdhouses designed for roosting, birds seek often warmth and shelter in birdhouses from rain, wind, and cold temperatures. These birdhouses are optimal when the portal is located at a low point relative to the interior space so that birds can enter and roost up inside the box above the portal. While some birds will roost individually, it is not uncommon for multiple birds to roost in groups to generate and share warmth. Roosting boxes used during times of cold temperature are optimal when they have minimal interior flow of air from bottom to top inside the box so that heat can accumulate and keep the birds warm where they congregate near the top of the interior space. Roosting boxes also often offer interior perches for birds to utilize in gripping on while sleeping, and this is a feature not found in nesting boxes.

Because birdhouses configured for nesting have unique requirements relative to birdhouses configured for roosting, birdhouses are generally designed to fall in the nest box category or the roosting box category, but not in both of these categories. While birds can and do roost in boxes designed for nesting, it is not optimal for the well-being and safety of the birds.

Additionally, predators occasionally attempt to approach birdhouses and the openings of birdhouses in order to reach birds or eggs in or around the birdhouse. Currently, most birdhouses do not include any protective measures to protect the birds and eggs from these predators.

BRIEF SUMMARY

Aspects of the present disclosure address the above-referenced problems and/or others. In one aspect, a birdhouse comprises a housing. The housing includes inner volume and a camera platform disposed within the inner volume. The camera platform divides the inner volume into a nest chamber and a wiring chamber. A camera is connected to the camera platform. The housing also includes a portal that is in open communication with the nest chamber and the external environment. The housing further includes a channel wall defining a channel extending through the nest chamber. The channel is in open communication with the wiring chamber and the external environment. The channel is configured to retain wiring. In some embodiments, the camera can be a webcam configured to provide a livestream of the nest chamber. In some embodiments, the housing can include a ventilation gap in open communication with the wiring chamber and the external environment.

The camera platform can be sized and shaped based on the size and shape of the camera. In some embodiments, the wiring chamber can be positioned vertically above the nest chamber, and the camera can be disposed within the nest chamber. In some embodiments, one or more latches can retain the camera in a position vertically below the camera platform. In some embodiments, the wiring chamber can be positioned vertically above the nest chamber and the camera can be disposed within the wiring chamber. The camera platform can include an aperture extending through the camera platform and a lens of the camera can be positioned vertically above or extends through the aperture. In some embodiments, the camera is removably connected to the camera platform. The birdhouse can further include a solar panel connected to an exterior surface of the housing, and the solar panel can be connected to the camera.

In some embodiments, the birdhouse can include a plurality of perching grooves disposed on a surface of the nest chamber, and each of the plurality of perching grooves can be spaced equally apart.

In some embodiments, the birdhouse can include a nest chamber door that provides access to the nest chamber when open and a wiring chamber door that provides access to the wiring chamber when open, with the nest chamber door and the wiring chamber door being different.

In some embodiments, a bottom wall can define a bottom of the nest chamber and can include a plurality of beveled corners. Each of the beveled corners of the bottom wall can define an opening that is communication with the nest chamber and the external environment. The camera platform can include a plurality of beveled corners, and each of the beveled corners of the camera platform can define an opening that is communication with the wiring chamber and the nest chamber.

The birdhouse can include a nest chamber floor plate disposed in the nest chamber, and the nest chamber floor plate can cover the openings defined by the beveled corners of the bottom wall and a wiring chamber floor plate disposed in the wiring chamber. The wiring chamber floor plate can cover the openings defined by the beveled corners of the camera platform. In other embodiments, the openings can be covered by a mesh covering. In some embodiments, the birdhouse can include one or more floor plates that slide into the birdhouse and rest upon the bottom wall or the camera platform. In some embodiments, the birdhouse can include at least one wall plate disposed within the nest chamber, and the wall plate can reduce the width and/or depth of the nest chamber. In other embodiments, the vertical height of the nest chamber can be modified by raising or lowering a floor (also referred to as a "bottom wall") of the nest chamber.

The birdhouse can include a second camera connected to an exterior surface of the housing. The second camera can be a webcam configured to provide a livestream of the portal and area outside the birdhouse. In some embodiments, the second camera can be connected to the exterior surface of the birdhouse either by being embedded into the surface of the birdhouse or the nest chamber cover or via an arm that includes a conduit, with the conduit being in open communication with the channel and with the conduit being configured to retain wiring associated with the second camera. In some embodiments, the camera platform disposed within the inner volume can be a first camera platform and the second camera can be connected to a second camera platform that is connected to the arm, and the second camera platform can be sized and shaped based on a size and shape of the second camera.

In another aspect, a birdhouse can include a housing that includes a nest chamber, a camera connected to an external surface of the housing via an arm, the arm can include a conduit configured to retain wiring associated with the cameras, and a channel can extend through the nest chamber and can be in open communication with the conduit and an environment external from the housing. The channel can be configured to retain the wiring. In other embodiments, wiring associated with the camera can extend through the conduit and into a wiring chamber of the birdhouse via the channel. In these embodiments, the wiring chamber can include an AC power outlet and/or a battery that powers the camera. Additionally, in some embodiments, a solar panel can be positioned external to the birdhouse, and this solar panel can supply power to electrical components within the wiring chamber.

One of the major challenges for owners of any birdhouse is cleaning the inner parts of the birdhouse after birds such as baby birds have fledged. This creates a significant logistical challenge as cleaning can be very difficult depending on how the birdhouse is mounted, how big the birdhouse is, how it is designed, how dirty it is, etc. A liner box can be used that is removable from a birdhouse, and the removable liner box can allow the larger birdhouse to remain installed at an installation location while allowing for the removal of liner box. In some embodiments, the liner box can simply be allowed to rest in the nest chamber of a birdhouse without attaching the liner box to any other portions of the birdhouse. This can allow for the liner box to be cleaned, adjusted in size, adjusted in terms of the accessories present on the liner box (e.g., roosting pegs), or otherwise maintained and then returned to the birdhouse. By allowing the liner box and the birdhouse to be more easily cleaned, they can be made safer and healthier for birds. Cleaning is also important to facilitate future nesting of birds. Cleaning may be particularly complex and important where cameras are present within the nest chamber.

Various birdhouses described herein can be configured to be used either with or without a liner box in some embodiments. The liner box can also be easily converted between a nesting configuration and a roosting configuration to use the internal space within a birdhouse in the optimal manner. Additionally, the size of the liner box may be increased or decreased in some embodiments, and the liner boxes may be customized in other ways. The birdhouses can enable the owner to customize the birdhouses in a wide variety of ways to tailor the birdhouse to a particular bird type that the owner wishes to attract and/or to a particular environment.

A nest chamber can be separated from a wiring chamber and/or a bottom chamber. By doing so, adjustments can be made to components within the wiring chamber and/or the bottom chamber without disturbing birds or a nest within the nest chamber. This can be important as it is illegal in many jurisdictions to disturb an active nest.

In various embodiments described herein, a birdhouse can be easily converted from a roosting configuration to a nesting configuration (and vice versa). Various modular components can be easily reconfigured to convert between a nesting configuration and a roosting configuration. This conversion can be accomplished by adjusting the position and/or orientation of various components. For example, a liner box positioned within a birdhouse can be used in one orientation in the nesting configuration, and the liner box can be flipped upside down when in the roosting configuration. The front wall of the birdhouse can also be used in one orientation where a portal is positioned proximate to the top of the front wall in the nesting configuration, and this front wall can also be flipped so that the portal is positioned proximate to the bottom of the front wall when in a roosting configuration. By allowing the configuration for a birdhouse to be easily changed, the appropriate configuration can be used more frequently, enhancing birds' ability to successfully ride out inclement weather and nest successfully using the same overall structure during different seasons.

Nest boxes need good airflow through the space from bottom to top to help keep the nest cool and dry during nesting season. Further, the nest box is optimally a simple open space with easy navigation inside for parents frequently entering and exiting when building nests and feeding and raising their young. Birdhouses can be provided with various elements configured to selectively permit or prevent airflow through the birdhouses, which can be beneficial when birdhouses are used in very cold environments. For example, a screen panel can be used within a bottom chamber of the birdhouse, and the screen panel itself can be selected or changed to adjust the amount of airflow. In some embodiments, solid panels can be installed in place of screen panels to restrict airflow through the birdhouse. Alternatively, solid panels can be selectively moved to an open position where the screen panel is uncovered or to a closed position where the screen panel is covered to restrict airflow through the birdhouse. Furthermore, apertures or gaps formed in the internal portions of a birdhouse can be blocked during very cold times, allowing airflow through the birdhouse to be reduced.

In an example embodiment, a birdhouse is provided. The birdhouse comprises a housing including an inner volume. The birdhouse also comprises a camera platform disposed within the inner volume, and the camera platform separates a nest chamber and a wiring chamber within the inner volume. The birdhouse also comprises a camera connected to the camera platform. The birdhouse also comprises a front wall defining a portal in open communication with the nest chamber and an environment external from the housing. Additionally, the birdhouse comprises a liner box configured to rest within the nest chamber.

In some embodiments, the liner box can be configured to rest within the nest chamber without any attachments between the liner box and the walls forming the nest chamber. This can enable the liner box to be quickly and easily positioned within the nest chamber and then removed from the nest chamber for cleaning, maintenance, or for other reasons.

In some embodiments, the liner box can include a front liner panel defining a front opening, and the liner box can be configured to be used in a nesting configuration and a roosting configuration. The front opening can be positioned at a first location in the nesting configuration, the front opening can be positioned at a second location in the roosting configuration, and the first location can be positioned above the second location. Additionally, in some embodiments, the liner box can be configured to be converted from the nesting configuration to the roosting configuration by flipping the liner box upside down. Furthermore, in some embodiments, the liner box can also include a left-side liner panel, a right-side liner panel, and a rear liner panel.

In some embodiments, the liner box can also include a corner support member including a base portion and a plurality of brackets. Each of the plurality of brackets can define slots, and the brackets can be configured to receive a panel within each slot so that the panel is capable of sliding along the slot to adjust a size of the liner box. The panel can be one of the front liner panel, the left-side liner panel, the right-side liner panel, or the rear liner panel. Additionally, in some embodiments, the brackets can define extended portions that are configured to act as spacers that enable airflow around the liner box when the liner box is received within the nest chamber of a birdhouse.

In some embodiments, the birdhouse can also include a channel wall defining a channel extending through the nest chamber and in open communication with the wiring chamber and the external environment, and the channel can be configured to retain wiring. Additionally, in some embodiments, the housing can include a ventilation gap in open communication with the wiring chamber and the external environment. Furthermore, in some embodiments, the camera platform can be sized and shaped based on a size and shape of the camera. In some embodiments, the wiring chamber can be positioned vertically above the nest chamber and the camera can be disposed within the nest chamber. In some embodiments, a rotatable latch can retain the camera in a position vertically below the camera platform. In some embodiments, a nest chamber door can be provided that provides access to the nest chamber when open, a wiring chamber door can be provided that provides access to the wiring chamber when open, and the nest chamber door and the wiring chamber door can be different from each other.

In some embodiments, the wiring chamber can be positioned vertically above the nest chamber, and the camera can be disposed within the wiring chamber. The camera platform can include an aperture extending through the camera platform, and a lens of the camera can be positioned vertically above the aperture or can extend through the aperture.

In some embodiments, a bottom wall can include a plurality of beveled corners and each of the beveled corners of the bottom wall can define an opening that is communication with the nest chamber or a bottom chamber and the external environment. Additionally, the camera platform can include a plurality of beveled corners, and each of the beveled corners of the camera platform can define an opening that is communication with the wiring chamber and the nest chamber.

In some embodiments, a second camera can be included in the birdhouse, with the second camera connected to an exterior surface of the housing. Additionally, the second camera can be connected to the exterior surface of the birdhouse via an arm that includes a conduit, and the conduit can be in open communication with the channel and can be configured to retain wiring associated with the second camera. Furthermore, in some embodiments, the second camera can be connected to a second camera platform that is connected to the arm, and the second camera platform can be sized and shaped based on a size and shape of the second camera.

In some embodiments, the birdhouse can also include a portal assembly including a base plate and a removable portal plate, and a portal roof can be integrally attached to the base plate. The base plate can define a base plate opening, the base plate can be configured to be attached to the front wall of the birdhouse so that the base plate opening aligns with the portal of the front wall, the removable portal plate can define a portal plate opening, and the removable portal plate can be removably attachable to the base plate or the front wall of the birdhouse so that the portal plate opening aligns with the portal of the front wall and the portal plate opening.

Additionally, in some embodiments, the birdhouse can also include at least one opening covered with a mesh. The mesh can be configured to provide ventilation between the inner volume and the exterior environment.

In another example embodiment, a birdhouse system can be provided comprising a birdhouse, at least one processor, and at least one memory device. The birdhouse can include a housing including an inner volume and a front wall defining a portal in open communication with the nest chamber and an environment external from the housing. The birdhouse can also comprise an external camera platform disposed outside of the birdhouse and an external camera connected to the external camera platform. The external camera platform can be configured to enable a position or orientation of the external camera to be adjusted so that the external camera captures one or more images of an area proximate to the portal. The memory device(s) can include computer program code, wherein, when executed, the computer program code can be configured to cause the at least one processor to receive the one or more images of the area proximate to the portal, identify an animal within the one or more images, and make a determination of whether the animal is a friend or a foe.

In some embodiments, a machine learning unit can be provided. The machine learning unit can be configured to deploy a model to assist in making the determination of whether the animal is a friend or a foe, and the machine learning unit can be configured to improve the model over time as additional data is obtained. Additionally, in some embodiments, the birdhouse system can also include an intruder defense device. The intruder defense device can be at least one of a speaker or a buzzer configured to generate a sound upon activation, a light configured to be flashed upon activation, or an actuatable member configured to be moved upon activation. Furthermore, when executed, the computer program code can be configured to cause the at least one processor to activate the intruder defense device if it is determined that the animal is a foe.

BRIEF DESCRIPTION OF THE DRAWINGS

Aspects of the present disclosure can take form in various components and arrangements of components, and in various steps and arrangements of steps. The drawings are only for illustration purpose of preferred embodiments of the present disclosure and are not to be considered as limiting. Drawings are not necessarily drawn to scale.

Features of embodiments of the present disclosure can be more readily understood from the following detailed description in conjunction with the accompanying drawings in which:

FIG. 1 depicts a perspective view of a birdhouse in accordance with an exemplary embodiment;

FIG. 2 is a rear view of the interior of the birdhouse where a back wall is hidden so that the interior can be seen in accordance with an exemplary embodiment;

FIG. 20 is a top view illustrating a floor plate of a birdhouse with mesh covers in accordance with an exemplary embodiment;

FIG. 23 is a schematic view illustrating a birdhouse with an apexed roof in accordance with an exemplary embodiment;

FIG. 24 is a front, schematic view illustrating a birdhouse with an apexed roof, a portal roof, and a portal guard in accordance with an exemplary embodiment;

FIG. 28 is a front, schematic view illustrating a birdhouse with an apexed roof and an angled lip in accordance with an exemplary embodiment;

FIG. 29 is a front, schematic view illustrating a birdhouse with an apexed roof, a nest chamber door and a wiring chamber door in accordance with an exemplary embodiment;

DETAILED DESCRIPTION

Figure 3:
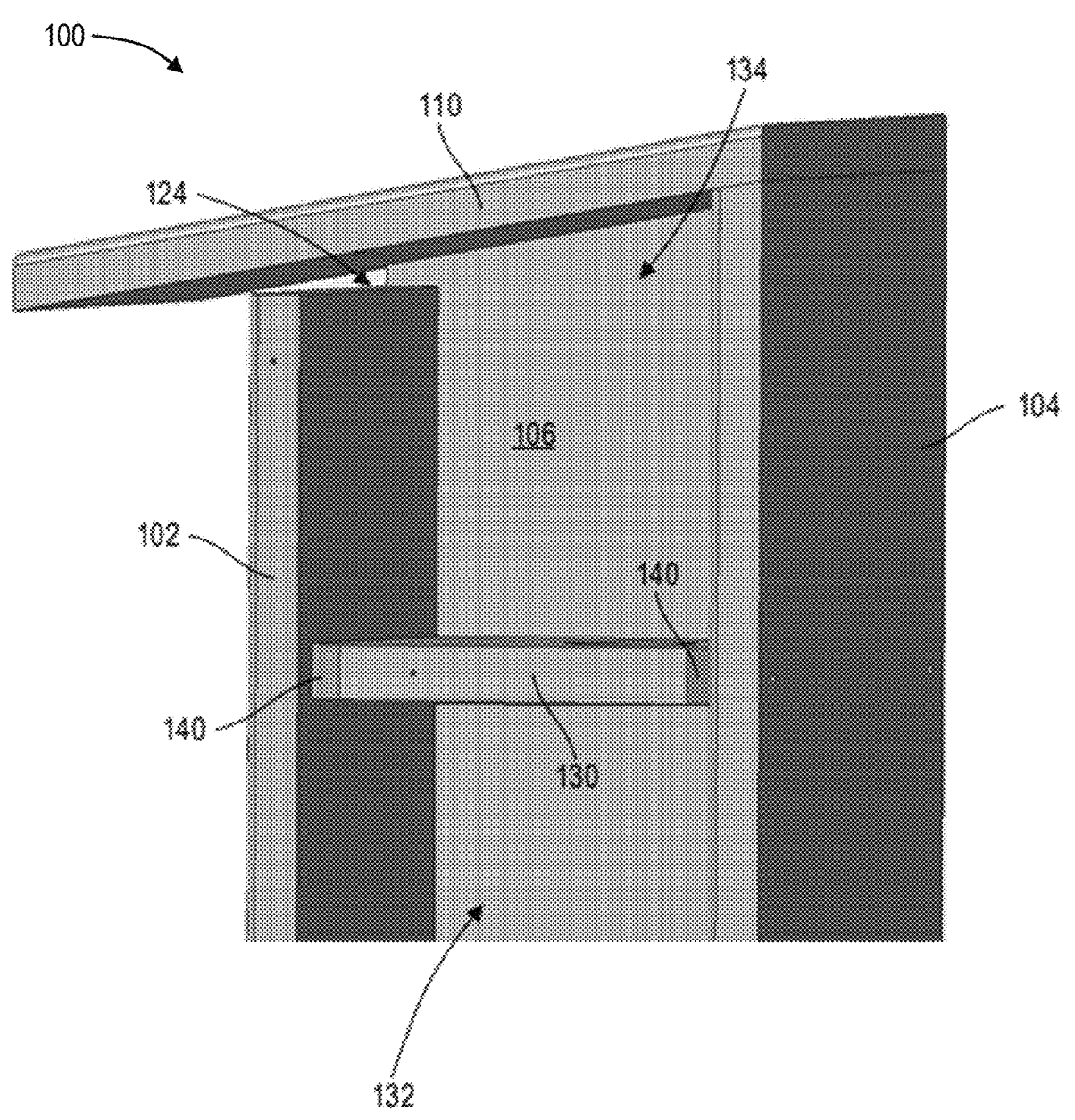
FIG. 3 is a side view of the interior of the birdhouse where a side wall is hidden so that the interior can be seen in accordance with an exemplary embodiment.

Example embodiments now will be described more fully hereinafter with reference to the accompanying drawings, in which some, but not all embodiments are shown. Similar features within different embodiments generally possess similar or identical features unless noted otherwise. Additionally, any connections or attachments can be direct or indirect connections or attachments unless specifically noted otherwise.

Various embodiments are illustrated in the figures and described herein, and different features are included in the different embodiments. It is intended that the features shown in different embodiments can be combined together, and certain features that are included in some described embodiments can be omitted.

The present disclosure generally relates to a birdhouse with a webcam provided therein. As used herein, a "webcam" is a video camera that feeds or streams an image or video and optionally audio in real time through a computer network (e.g., the internet) to a computer system (e.g., laptop, smartphone, tablet, server, etc.). A webcam can connect to the computer network via a wireless or wired connection.

Various elements described herein can be descried as "connected" to one another. As used herein, elements can be connected via any means that cause the elements to retain a position with respect to each other. Means of connecting various elements include, but are not limited to, coupling via a screw, adhesive, tongue and groove, welding, applied pressure, or via magnetic forces. A removable connection allows a user to disconnect various elements without damaging the elements.

As used herein, the term "about" means plus or minus 10% of the numerical value of the number with which it is being used. Therefore, about 100 cm means in the range of 90 cm-110 cm.

Figure 1:
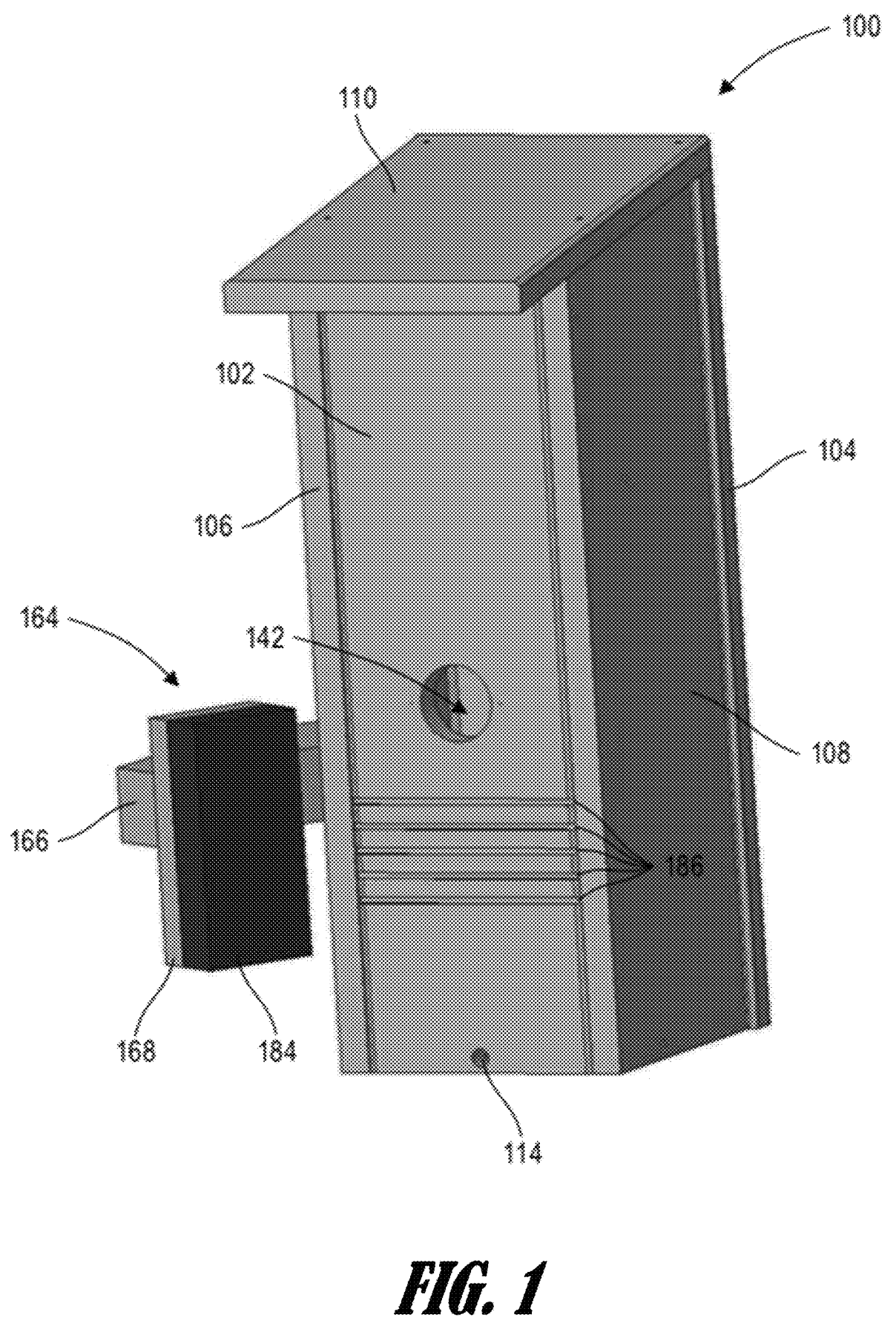

FIG. 1 depicts a perspective view of a birdhouse 100 in accordance with one exemplary embodiment. The birdhouse 100 includes a front wall 102, a rear wall 104, a left-side wall 106, a right-side wall 108, and a top wall 110. The birdhouse 100 also includes a bottom wall 112, which is visible in FIG. 2. The walls 102, 104, 106, 108, 110, and 112 define a housing of the birdhouse 100.

The front wall 102 is connected to the left-side wall 106 and the right-side wall 108. The front wall 102 extends between and perpendicular to the left-side wall 106 and the right-side wall 108. The front wall 102 can optionally be pivotably attached to walls 106, 108. For example, the top end of the front wall 102 can be pivotably attached to the walls 106, 108 so that the front wall 102 can be configured to pivot about an axis proximate to the top end of the front wall 102. Alternatively, the bottom end of the front wall 102 can be pivotably attached to the walls 106, 108 so that the front wall 102 can be configured to pivot about an axis proximate to the bottom end of the front wall 102. Where the front wall 102 is pivotably attached, the front wall 102 can pivot between an open position and a closed position (see, e.g., FIG. 56).

In some embodiments, the front wall 102 is connected to the left-side wall 106 and the right-side wall 108 via fastener(s) such as a rod, two opposing rods, screws, or bolts, and these fastener(s) can be configured to allow the front wall 102 to rotate. In some embodiments, the front wall 102 can be configured such that it can be removed from the birdhouse 100 by pulling the front wall 102 away from the birdhouse 100, and the front wall 102 can be configured so that it can be reconnected to the birdhouse 100 by pushing the front wall 102 into the birdhouse 100. For example, the front wall 102 can be configured to be connected to the birdhouse 100 via a ball and socket pressure mount. When the front wall 102 is in a closed position as illustrated in FIG. 1, the outer surfaces of the walls 102, 106 and 108 can be flush. When the front wall 102 is in the open position, a user can access an interior volume of the birdhouse 100.

Various elements of the birdhouse 100 (e.g., the walls 102-112) and other birdhouses described herein can be formed from various types of wood. In some embodiments, the exterior of the birdhouses can be formed from molded plastic. While the exterior can be formed from plastic, the interior can in some embodiments be formed from wood in order to provide a more natural nesting environment.

In some embodiments, the front wall 102 can include one or more rotatable latch(es) that are configured to rotate between a locked and an unlocked position. For example, the front wall 102 includes a latch 114. The latch 114 can be a rotatable latch that is configured to rotate about 90 degrees as the front wall 102 moves between a locked and an unlocked position. When the front wall 102 is in a closed position as illustrated in FIG. 1 and the latch 114 is in the locked position, the latch 114 couples to the bottom wall 112 and prevents a user from opening the front wall 102. When the latch 114 is rotated to the unlocked position, the latch 114 decouples from the bottom wall 112 to allow a user to open the front wall 102. The latch 114 is positioned proximate to the bottom end of the front wall 102. Where the front wall 102 is configured to pivot about an axis proximate to the bottom end of the front wall 102, the latch 114 can be positioned proximate to the top end of the front wall 102 or at another location away from the bottom end of the front wall 102. Latch 114 may be positioned at another location on the birdhouse 100 in other embodiments.

As illustrated in FIG. 1, the birdhouse 100 can also include an external camera support 164. The external camera support 164 includes an arm 166 and a camera platform 168. The arm 166 is connected to and extends between the left-side wall 106 and the camera platform 168, and, in some embodiments, the arm 166 can be perpendicular to the left-side wall 106 and the camera platform 168.

Figure 13:
FIG. 13 is a perspective view illustrating an arm of a camera support in accordance with an exemplary embodiment.
Figure 14:
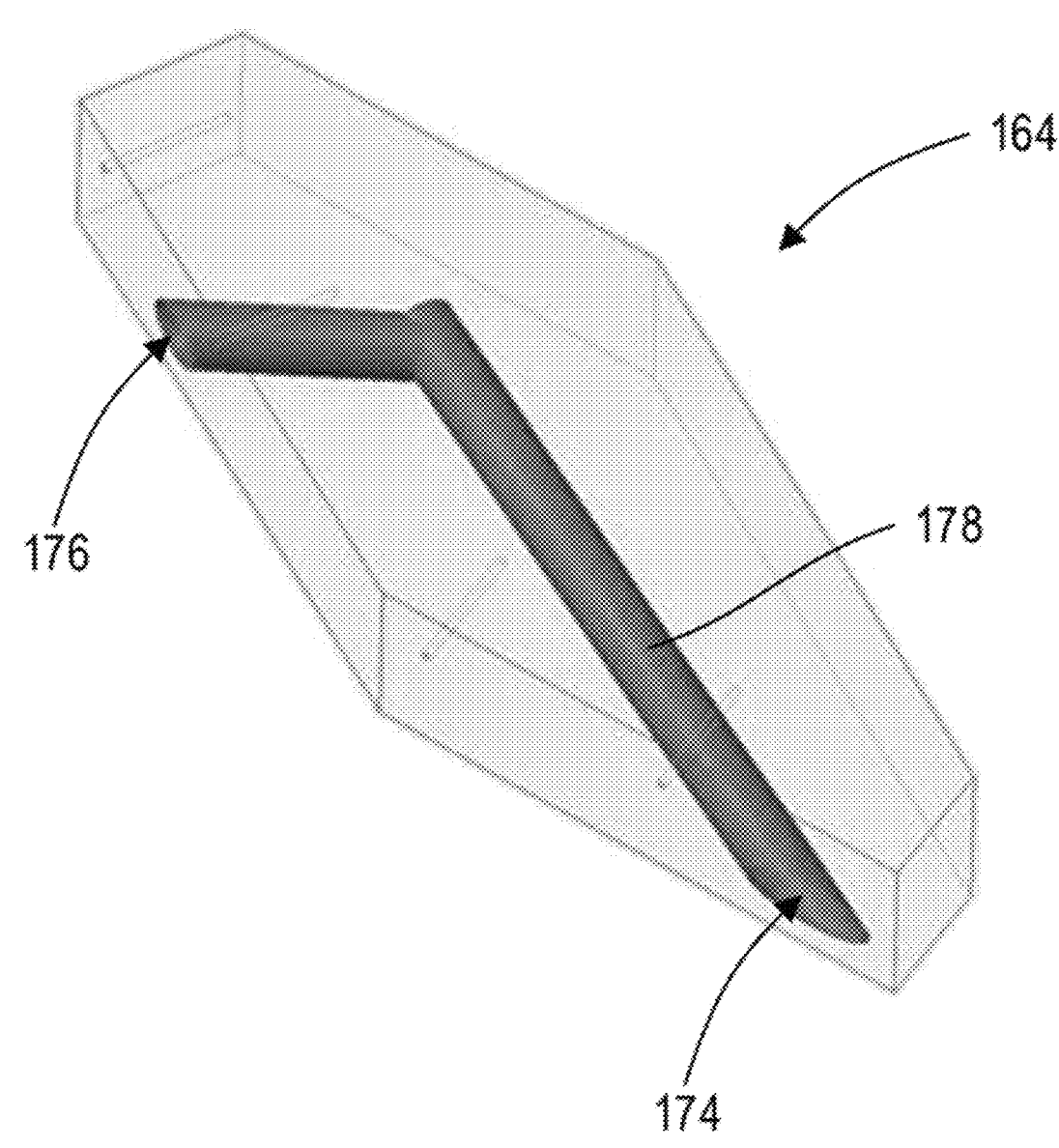
FIG. 14 is a schematic view illustrating the interior of the arm of the camera support in accordance with an exemplary embodiment.

Looking ahead to FIG. 13, the arm 166 includes a first connection surface 170 and a second connection surface 172. The first connection surface 170 can be configured to connect the arm 166 to the left-side wall 106. The second connection surface 172 can be configured to connect the arm 166 to the camera platform 168. The first connection surface 170 includes a first opening 174 and the second connection surface 172 includes a second opening 176. The arm 166 further includes a conduit 178 that extends between the first opening 174 and the second opening 176, and this conduit 178 is visible in FIG. 14.

Turning back to FIG. 1, the rear wall 104, the left-side wall 106, and the right-side wall 108 are connected to the top wall 110. The walls 104, 106, and 108 extend vertically, and the rear wall 104 generally extends perpendicularly relative to the left-side wall 106 and the right-side wall 108. The top wall 110 is diagonally sloped when the birdhouse 100 is oriented in an upright manner as illustrated in FIG. 1. This diagonal slope can be seen in FIG. 3. In FIG. 3, the top wall 110 is connected to the walls 104, 106, and 108 (which is hidden), such that the top wall 110 pitches down towards the front wall 102. The uppermost point of the rear wall 104 can be higher than the uppermost point of the front wall 102 when the birdhouse 100 is oriented in an upright manner and where the front wall 102 is in a closed position. The top wall 110 can be configured so that it overhangs the front wall 102. As such, when rainwater (or other precipitation) contacts the top wall 110, the top wall 110 can be configured to cause the rainwater to flow down an upper surface of the top wall 110 without entering the interior of the birdhouse 100.

Furthermore, the connection between the walls that form birdhouses described herein can be sealed with a waterproof material, and this can prevent water from entering the birdhouses. Preventing water from entering the interior of a birdhouse can protect electronics (e.g., a camera) within the birdhouse from water damage.

Figure 2:
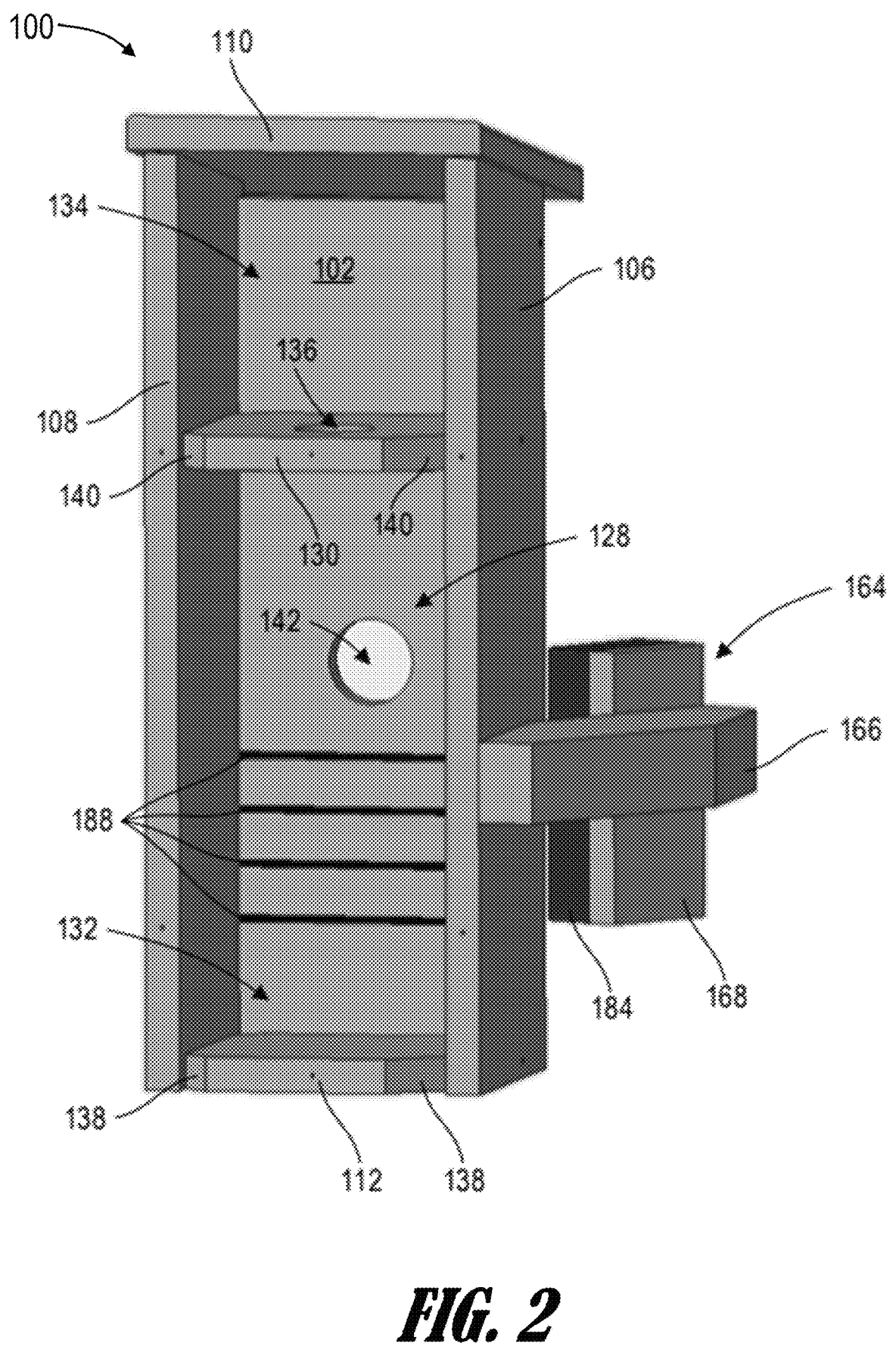
Figure 5:
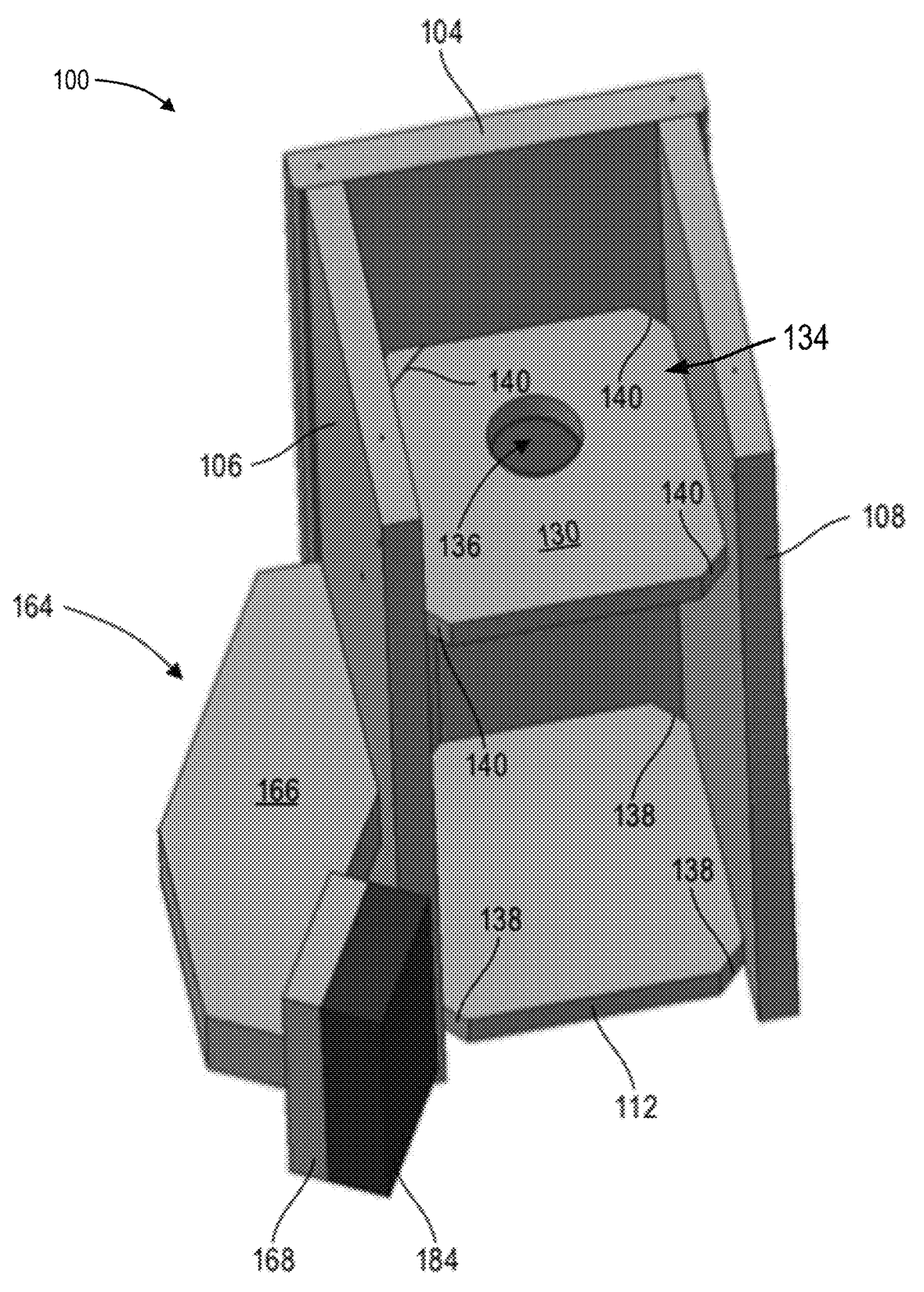
FIG. 5 is a downward, perspective view of the interior of the birdhouse where a front wall is hidden so that the interior can be seen in accordance with an exemplary embodiment.

FIG. 2 is a rear view of the interior of the birdhouse 100 where a back wall 104 is hidden so that the interior can be seen, and FIG. 5 is a downward, perspective view of the interior of the birdhouse 100 where a front wall 102 is hidden so that the interior can be seen.

The walls 102, 104, 106, 108, 110, 112 define an inner volume 128 of the birdhouse. The birdhouse 100 further includes a camera platform 130 disposed within the inner volume 128. The camera platform 130 can be connected to (and/or positioned up against) the walls 102, 104, 106, and 108 such that the camera platform 130 extends horizontally between and perpendicular to the walls 102, 104, 106, and 108. The camera platform 130 divides the inner volume 128 into a nest chamber 132 and a wiring chamber 134, with the nest chamber 132 being the portion of the inner volume 128 below the camera platform 130 and with the wiring chamber 134 being the portion of the inner volume 128 above the camera platform 130. The camera platform 130 includes an aperture 136 that extends through the camera platform 130. A camera can be positioned above or below the camera platform 130 proximate to the aperture 136. Where the camera is positioned above the camera platform 130, the camera can be directed downwardly through the aperture 136 to obtain video and/or audio of the nest chamber 132. Where the camera is positioned below the camera platform 130, one or more wires can be fed through the aperture 136 to the camera. A camera can also be at least partially positioned inside of the aperture 136.

As illustrated in FIG. 2, the bottom wall 112 can include beveled corners 138 and the camera platform 130 can include beveled corners 140. The beveled corners 138, 140 are illustrated proximate to locations where the rear wall (not shown in FIG. 2) is attached to the side walls 106, 108, but similar beveled corners can optionally be included proximate to locations where the front wall 102 is attached to the side walls 106, 108. The beveled corners 138 define openings that, if left unblocked, allow air to flow between the nest chamber 132 and the external environment. The beveled corners 140 define openings which allow air to flow between the nest chamber 132 and the wiring chamber 134. This can allow for the prevention of overheating within the wiring chamber 134 and the nest chamber 132, although other ventilation approaches described herein can be beneficial to prevent overheating as well. In some embodiments, it can also be desirable for users to provide a warmer nest chamber environment in order to promote roosting (e.g., during colder months in which additional warmth will not harm, but would rather benefit birds). In order to create a warmer environment, the openings created by the beveled corners 138 and 140 can be blocked or plugged thereby preventing warm air from escaping the birdhouse 100 via the openings. In some embodiments, the beveled corners 138 may enable any liquid material to fall out of the birdhouse through openings adjacent to the beveled corners 138, but the openings positioned adjacent to beveled corners 138 may be relatively small so that insects, animals, and other unwanted material are not permitted to enter through the openings. Mesh coverings may cover the openings in some embodiments.

As illustrated in FIG. 2 and in other figures illustrating the birdhouse 100, the front wall 102 of the birdhouse 100 includes a portal 142 that extends through the front wall 102. The portal 142 can be dimensioned such that a bird of a certain size can enter the birdhouse 100 via the portal 142 while a larger animal (e.g., a squirrel, larger bird) can not. The portal 142 is positioned vertically below the camera platform 130. As such, a bird entering into the birdhouse 100 through the portal 142 can only access the nest chamber 132, and the bird can not access the wiring chamber 134 positioned above the camera platform 130. This can be beneficial to prevent damage to electrical components positioned above the camera platform 130.

The size of the nest chamber 132 can be adjusted. For example, the camera platform 130 can be shifted up or down to increase or reduce the size of the nest chamber 132. Providing a larger or smaller nest chamber 132 can attract different species of birds as different species of birds can prefer a larger or smaller nest chamber 132. Furthermore, providing a smaller nest chamber 132 can promote roosting in some embodiments, as a smaller nest chamber 132 can create a warmer environment. Furthermore, it can be beneficial to provide a nest chamber 132 having a larger size in order to accommodate a larger camera 154.

The bottom wall 112 can be removably connected to the rear wall 104, the left-side wall 106, and the right-side wall 108 (e.g., via a tongue and groove fitting, via pegs, etc.). In this embodiment, the rear wall 104, the left-side wall 106, and the right-side wall 108 can include a plurality of grooves, pegs, etc. at different heights for receiving the bottom wall 112. The bottom wall can be removed and received by a groove, peg, etc. at a different height thereby increasing or decreasing the vertical size of the nest chamber 132 as desired. By shifting the bottom wall 112 up or down, the size of the nest chamber 132 can be reduced or increased.

Additionally, the camera platform 130 can be removably connected within the birdhouse 100 in some embodiments, thereby allowing the camera platform 130 to be shifted up or down. By shifting the camera platform 130 up or down, the size of the wiring chamber 134 can be adjusted. It can be desirable to adjust the size of the wiring chamber 134 in order to accommodate a different sized camera 154 that is disposed within the wiring chamber 134 or the nest chamber 132 or to accommodate a larger nest chamber 132. In one embodiment, the camera platform 130 can be removably connected to the rear wall 104, the left-side wall 106, and the right-side wall 108 (e.g., via a tongue and groove fitting, pegs, etc.). In this embodiment, the rear wall 104, the left-side wall 106, and the right-side wall 108 can include a plurality of grooves, pegs, etc. at different heights for receiving the camera platform 130. The camera platform 130 can be removed and received by a groove at a different height thereby increasing or decreasing the size of the wiring chamber 134 or the nest chamber 132 as desired.

The birdhouse 100 of FIGS. 1 and 2 can include features conducive to bird nesting and/or roosting. For example, as illustrated in FIG. 1, the front wall 102 can include exterior perching grooves 186 on the exterior facing side of the front wall 102. Also, as illustrated in FIG. 2, the front wall 102 can include interior perching grooves 188 on the interior facing side of the front wall 102. The perching grooves 186, 188 are configured to provide a grip for birds to perch while using the birdhouse 100. The interior perching grooves 188 can be spaced at a predetermined distance (e.g., about 1 inch, about 1.5 inches, about 2 inches, about 1 centimeter, about 3 centimeters, about 5 centimeters, etc.) to provide a marker for tracking nest height over time. That is, as a nest is developed, the nest can surpass an interior perching groove 188, thereby indicating the size of the nest. While the front wall 102 is depicted as including the interior perching grooves 188, in other embodiments, the rear wall 104, the left-side wall 106, and/or the right-side wall 108 can include perching grooves 188 spaced apart at a predetermined distance to provide a marker for tracking a nest height. In some embodiments, the exterior perching grooves 186 can be spaced at a predetermined distance (e.g., about 1 inch, about 1.5 inches, about 2 inches, about 1 centimeter, about 3 centimeters, about 5 centimeters, etc.), and this can be beneficial to provide a marker for determining a size of a bird adjacent to portal 142. For example, a bird or another animal can be positioned proximate to the exterior perching grooves 186, the camera 184 can obtain video footage of the bird/animal and the exterior perching grooves 186, and the size of the bird or the other animal can be determined based on the size of the bird/animal relative to the exterior perching grooves 186 or the spacing thereof within the video footage.

FIG. 3 is a side view of the interior of the birdhouse where a side wall is hidden so that the interior can be seen. As illustrated in FIG. 3, the top wall 110 and the front wall 102 of the birdhouse 100 can define a ventilation gap 124. This ventilation gap 124 can allow for the flow of air between the external environment and an interior of the birdhouse 100. Heat within the birdhouse 100 (e.g., heat generated by electronics within the birdhouse 100, heat from the sun or external temperature, heat from a bird within the birdhouse 100, etc.) can rise within the birdhouse 100 and can exit the birdhouse 100 via the ventilation gap 124, thereby safeguarding the electronics as well as birds within the birdhouse 100 from excess heat.

Figure 4:
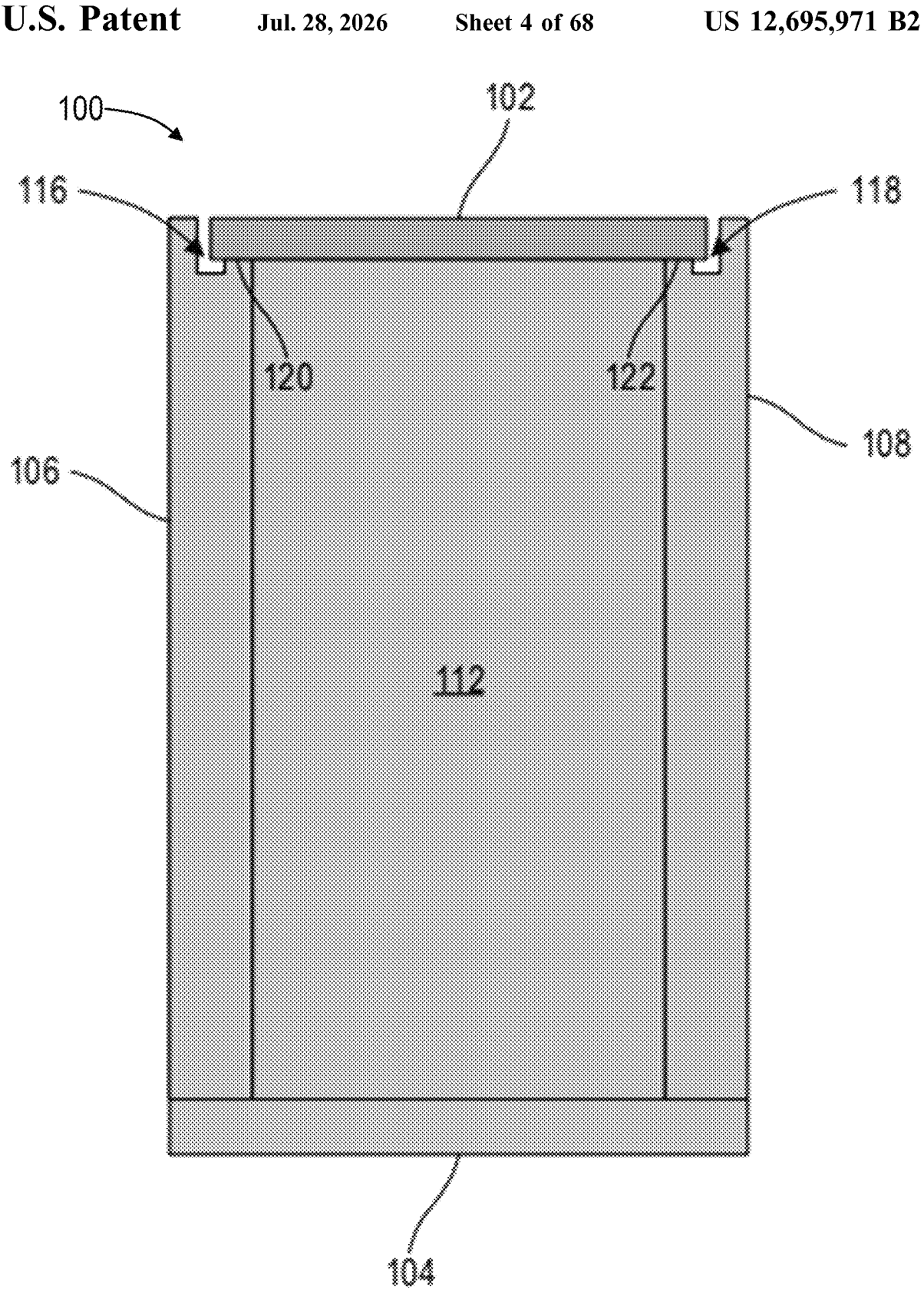
FIG. 4 is a top-down view of an interior of a birdhouse in accordance with an exemplary embodiment.

FIG. 4 is a top-down view of an interior of a birdhouse in accordance with an exemplary embodiment. The birdhouse 100 can include additional elements for preventing water from entering the birdhouse 100. With reference to FIG. 4, the birdhouse 100 can further include a U-shaped channel 116 and a U-shaped channel 118. The U-shaped channels 116 and 118 are defined by side walls 106 and 108 and the front wall 102. As depicted in FIG. 4, in these embodiments the left-side wall 106 includes a notch 120 and the right-side wall 108 includes a notch 122 and the front wall 102 rests upon a surface of the notches 120 and 122, thereby defining a gap (the U-shaped channels 116 and 118) between the front wall 102 and the side walls 106 and 108. The U-shaped channels 116 and 118 are configured to carry rainwater (or other precipitation) away from the internal portions of the birdhouse 100. While FIG. 4 depicts the U-shaped channels 116 and 118 as between the side walls 106 and 108 and the front wall 102, in other embodiments, a U-shaped channel can be similarly formed between the top wall 110, the left-side wall 106, and the right-side wall 108.

In the birdhouse 100 illustrated in FIG. 4, the bottom wall 112 is connected to the rear wall 104, the left-side wall 106, and the right-side wall 108 such that the bottom wall 112 extends horizontally between and perpendicular to the walls 102, 104, 106, and 108. Furthermore, the bottom wall 112 is connected to the walls 102, 104, 106, and 108 such that bottom surfaces of the walls 102, 104, 106, and 108 and the bottom surface of the bottom wall 112 are flush. However, in other embodiments, the bottom surface of the bottom wall 112 can not be flush with the bottom surfaces of the walls 102, 104, 106, and 108. The distance between the side walls 106, 108 generally remains uniform along the entire lengths of the side walls 106, 108, and the distance between the front wall 102 and the rear wall 104 generally remains uniform along the entire lengths of the front wall 102 and the rear wall 104. The uniform distance between the side walls 106 and 108 and the uniform distance between the front wall 102 and the rear wall 104 allows the same bottom wall 112 to be easily re-positioned higher or lower. The bottom wall 112 can be readjusted to different vertical positions using a tongue and groove slide-in method. Alternatively, peg holes can be positioned along the inner surfaces of side walls 106, 108, pegs can be received in the peg holes at a desired height, and the bottom wall 112 can be positioned so that it rests on the pegs. Alternatively, the bottom wall 112 can be adjustably attached to the birdhouse 100 using other fasteners or other approaches.

As illustrated in FIG. 4, the left-side wall 106 and the right-side wall 108 of the birdhouse 100 are also connected to the rear wall 104 such that the left-side wall 106 and the right-side wall 108 extend perpendicular from the rear wall 104.

Figure 6:
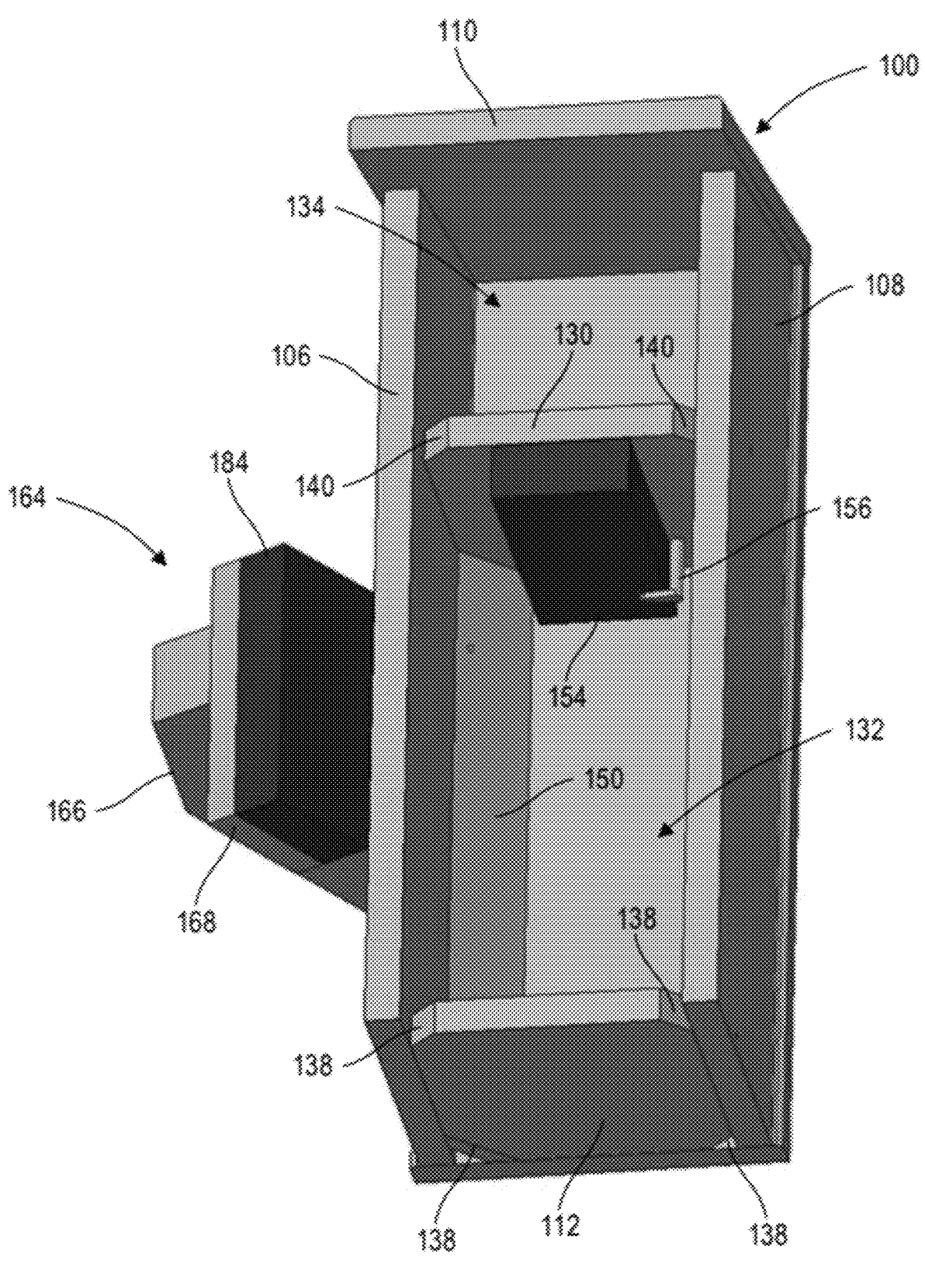
FIG. 6 is an upward, perspective view of the interior of the birdhouse where a front wall is hidden so that the interior can be seen in accordance with an exemplary embodiment.

The birdhouse 100 can also include a camera 154 disposed within the inner volume 128. The camera 154 can include, but is not limited to, a webcam. FIG. 6 is an upward, perspective view of the interior of the birdhouse 100 where a front wall 102 is hidden so that the interior can be seen in accordance with an exemplary embodiment.

Figure 9:
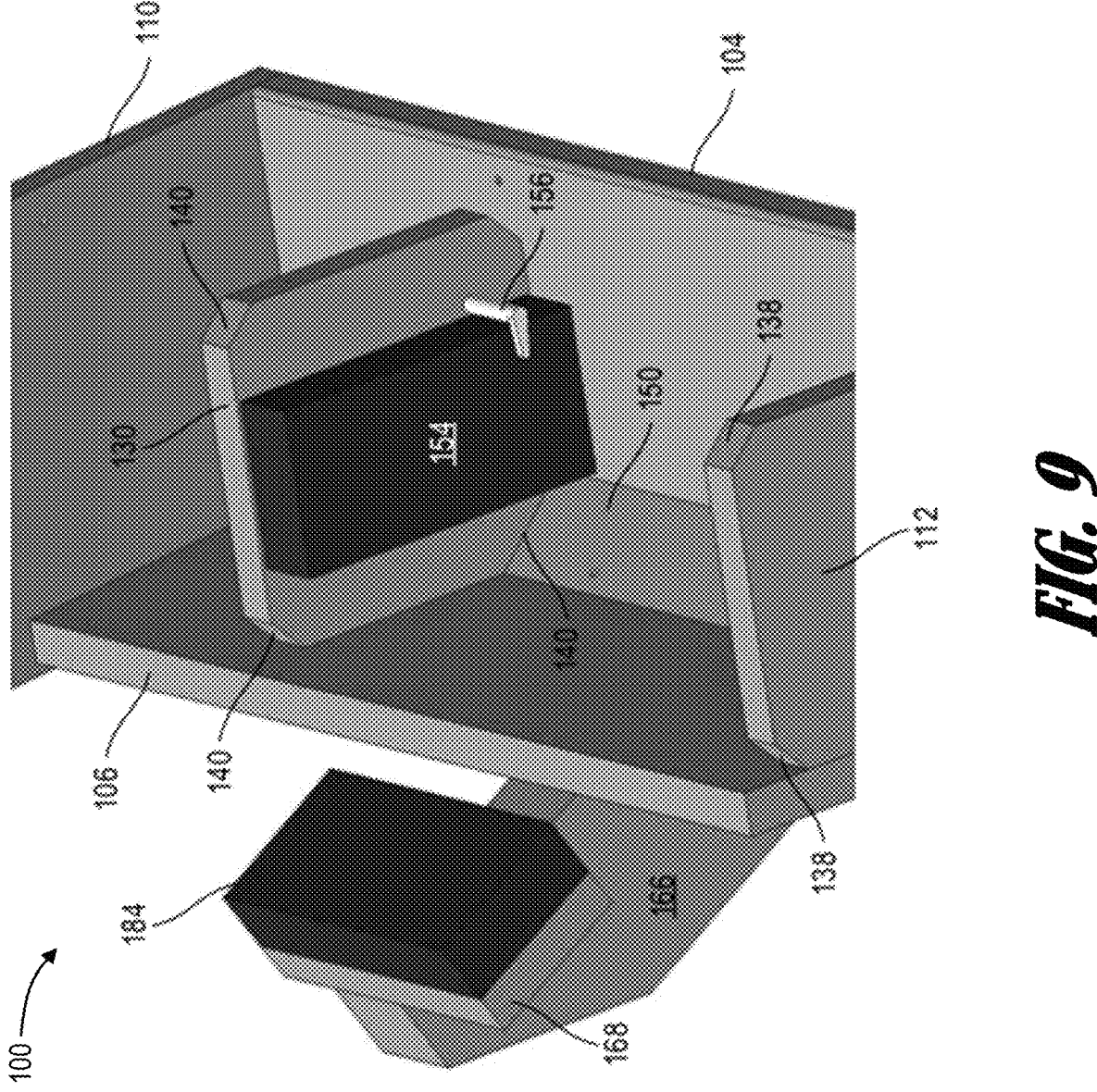
FIG. 9 is a bottom, perspective view of the interior of the birdhouse where a camera is disposed below a camera platform and where a camera retaining latch is in a locked position in accordance with an exemplary embodiment.
Figure 10:
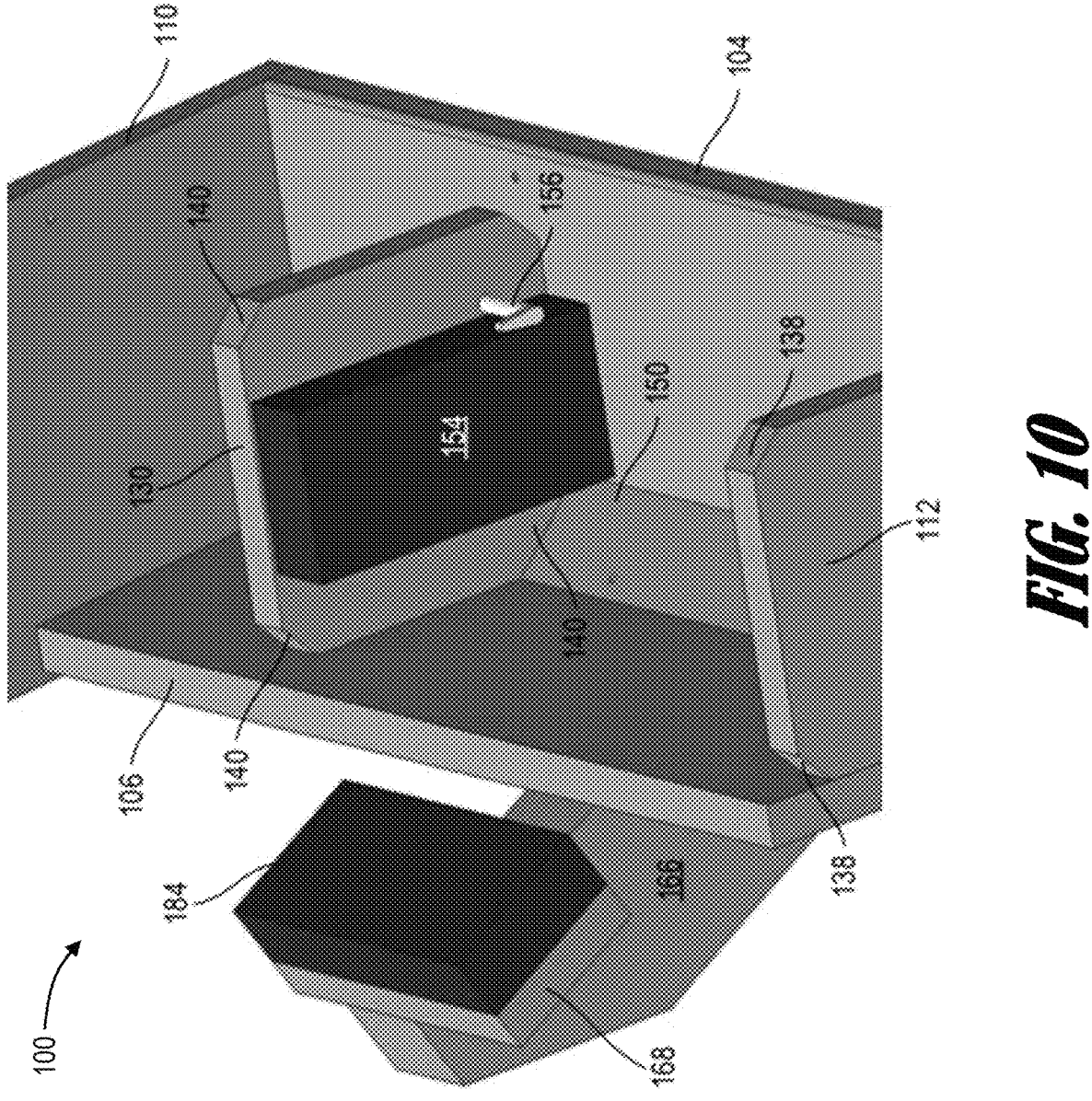
FIG. 10 is a bottom, perspective view of the interior of the birdhouse where a camera is disposed below a camera platform and where the camera retaining latch of FIG. 9 is in an unlocked position in accordance with an exemplary embodiment.

In FIG. 6, the camera 154 is disposed within the nest chamber 132 and is positioned vertically below camera platform 130. In this embodiment, the camera 154 can be mounted to the camera platform 130 via a rotatable latch 156 and a mount (e.g., a bracket) that is connected to the camera platform 130. As illustrated in FIGS. 9 and 10, the latch 156 can be configured to rotate about 90 degrees between a locked position (FIG. 9) and an unlocked position (FIG. 10). When the latch 156 is in the locked position, the latch 156 retains the camera 154 between the latch 156 and the camera platform 130. When the latch 156 is in the unlocked position, the camera 154 can be removed from the birdhouse 100. In some embodiments, the camera 154 can be slidably and removably mounted to the camera platform 130. As such, the camera 154 can be removed from the birdhouse 100 for maintenance. While the figures depict the latch 156 as retaining the camera 154 in position, other means for retaining the camera 154 can be employed (e.g., brace, strap, screw, slidable panel connected to the camera 154, etc.). Furthermore, while only one latch 156 is illustrated in FIGS. 6, 9, and 10, one or more additional latches can be provided that are configured to hold the camera 154.

In some embodiments, the camera platform 130 can be shaped and sized based on the size and shape of the camera 154. Furthermore, the camera platform 130 can be removably connected to the walls 104, 106, and 108 in some embodiments. As such, a first camera platform 130 that accommodates a camera 154 can be removed from the birdhouse 100 and replaced with a second different camera platform 130 that accommodates a second camera that is different from the camera 154.

A lens of a camera can resemble an eye of a predator and as such, can alarm birds nesting within the nest chamber 132. In order to camouflage the camera lens, both the body of the camera 154 and a bottom surface (e.g., the surface facing the nest chamber 132) of the camera platform 130 can be colored black. As such, a black lens of the camera 154 blends in with the body of the camera 154 and the bottom surface of the camera platform 130.

Figure 7:
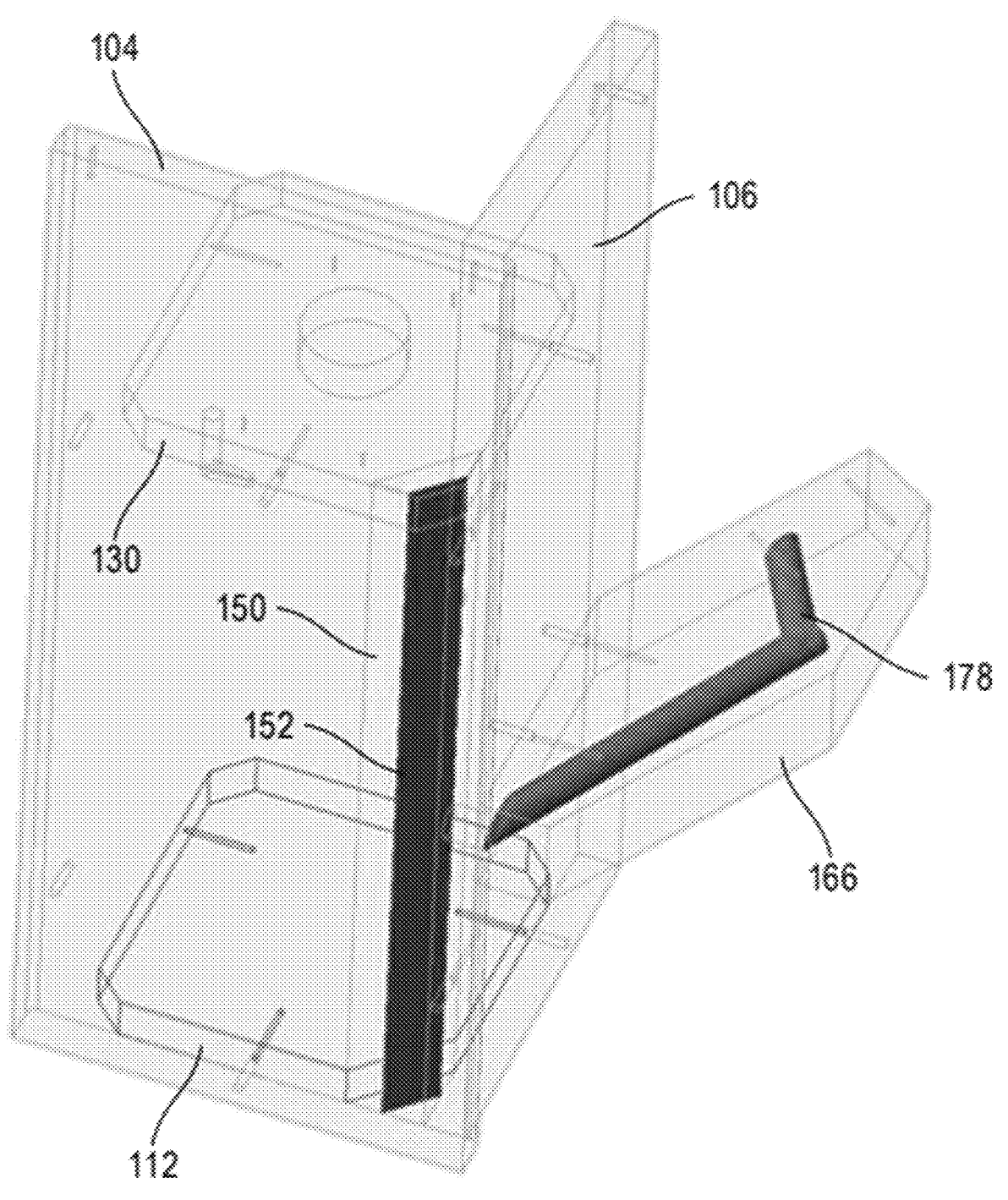
FIG. 7 is a schematic diagram illustrating inner channels of the birdhouse of FIG. 1 in accordance with an exemplary embodiment.

FIG. 7 is a schematic diagram illustrating inner channels of the birdhouse 100 of FIG. 1 in accordance with an exemplary embodiment. As illustrated in FIG. 7, the birdhouse 100 includes a channel wall 150. The channel wall 150 extends horizontally between and is connected to (or held in position up against) the rear wall 104 and the left-side wall 106 at about a 45 degree angle. The channel wall 150 also extends vertically between and perpendicular to the bottom wall 112 and the camera platform 130. The rear wall 104, the left-side wall 106, and the channel wall 150 define a void (hereinafter referred to as a "channel") 152 that extends vertically between the bottom wall 112 and the camera platform 130. Furthermore, the channel wall 150 is aligned with a beveled corner of the bottom wall 112 and is aligned with a beveled corner of the camera platform 130 and as such, the channel 152 is in open communication with the wiring chamber 134 positioned above the camera platform 130, and the channel 152 is also in open communication with the external environment. While the channel wall 150 can be beveled, the channel wall 150 can not be beveled in other embodiments. For example, in some embodiments, the channel wall 150 can be rectangular.

In some embodiments, the camera 154 described herein can require a connection to an external power source (e.g., an outlet located behind the birdhouse 100). In these embodiments, wiring can extend from the camera 154 and enter the channel 152 (see FIG. 7) via an opening created by a beveled corner 140 (see FIG. 6). When the camera 154 is positioned vertically below the camera platform 130 as illustrated in FIG. 6, the wiring can extend through the aperture 136 (see FIG. 5) and then through the channel 152. The wiring can then extend through the channel 152 and can exit the birdhouse 100 via an opening created by a beveled corner 138 (see FIG. 6) thereby allowing the wiring to connect to an external power source. While the corners of the bottom wall 112 and the camera platform 130 are depicted as beveled corners 138 and 140 respectively, the corners of the bottom wall 112 and the camera platform 130 can have any shape (e.g., rectangular, rounded, etc.) so long as the corners of the bottom wall 112 define openings between the nest chamber 132 and the external environment and the corners of the camera platform 130 define openings between the nest chamber 132 and the wiring chamber 134.

In other embodiments such as the one illustrated in FIGS. 6 and 7, wiring connected to an external power source (e.g., an extension cord connected to an external power outlet) can enter the channel 152 via an opening defined by the beveled corner 138. The wiring can then extend through the channel 152 and can enter the wiring chamber 134 via an opening defined by the beveled corner 140 and can provide an AC outlet within the wiring chamber 134. Power wiring associated with the camera 154 can enter the wiring chamber 134 via the aperture 136 (see FIG. 5) and connects to the AC outlet, thereby powering the camera 154. Since the wiring associated with the camera 154 is retained in the wiring chamber 134 and retained within the channel 152, the wiring is protected from damage that can be caused by the birds as the wiring is inaccessible from within the nest chamber 132. This also protects birds that are within the birdhouse 100. If the wiring were to become exposed, birds can be harmed.

Figure 8:
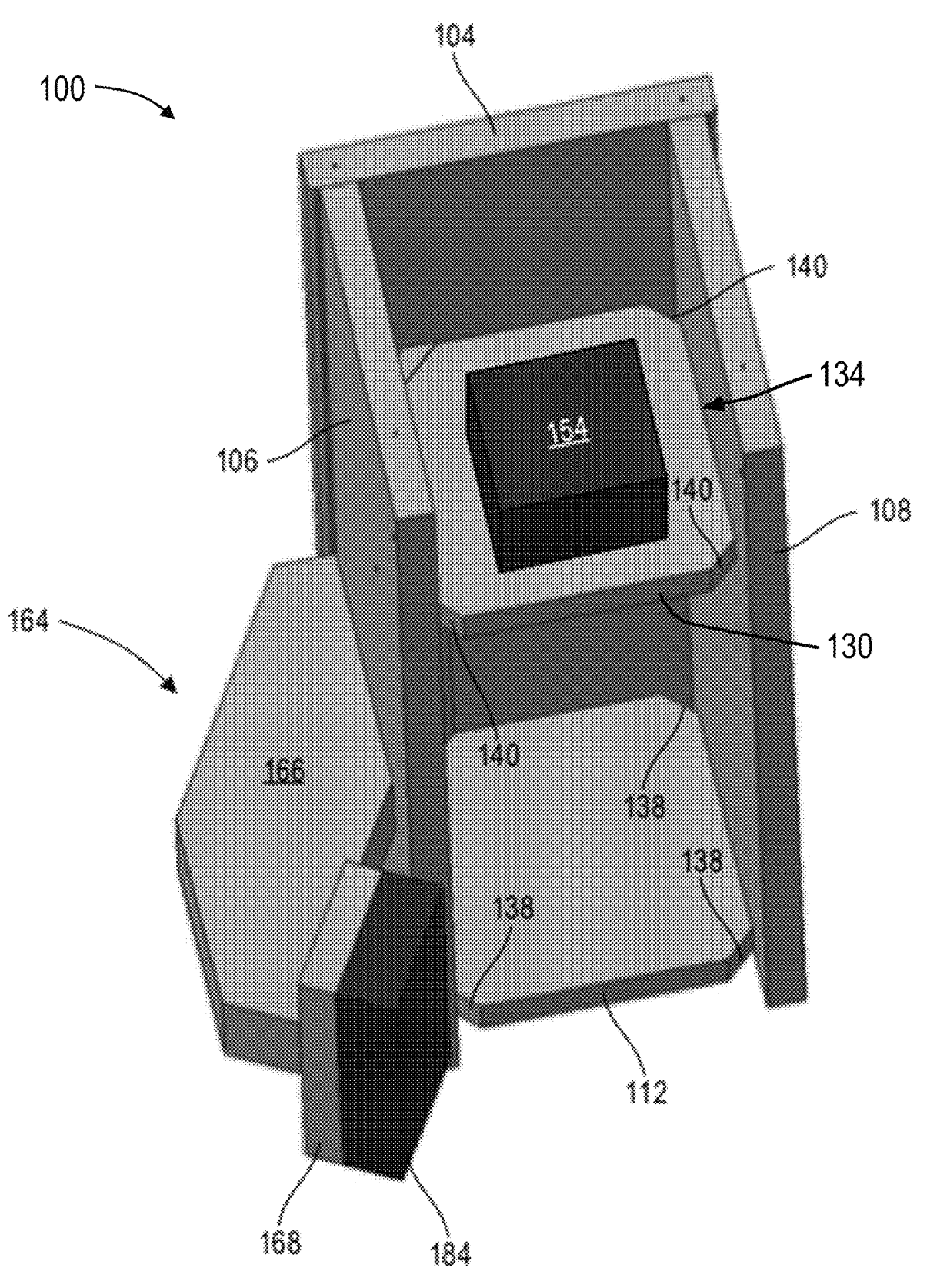
FIG. 8 is a top, perspective view of the interior of the birdhouse where a camera is disposed above a camera platform in accordance with an exemplary embodiment.

The birdhouse 100 can also include a camera 154 disposed within the inner volume 128. The camera 154 can include, but is not limited to, a webcam. FIG. 8 is a top, perspective view of the interior of the birdhouse 100 of one embodiment where the camera 154 is disposed above a camera platform 130. In FIG. 8, the camera 154 is disposed within the wiring chamber 134 and is positioned vertically above the camera platform 130. In this embodiment, the camera 154 can be mounted to the camera platform 130 (e.g., via one or more screws) such that a lens of the camera 154 is positioned vertically above the aperture 136, thereby allowing the camera 154 to capture an image of the nest chamber 132. Alternatively, the camera 154 can be mounted to the camera platform 130 such that a lens of the camera 154 is extends through the aperture 136, thereby allowing the camera 154 to capture an image of the nest chamber 132.

In some embodiments, the camera 154 can be battery powered. As such, the camera 154 can not require wiring in order to power the camera 154. In these embodiments, a user can remove the camera 154 as previously described herein or can remove the battery from the camera 154, charge the battery, and return the camera 154 to the birdhouse 100 or return the battery to the camera 154. In embodiments where the camera 154 is battery powered, the birdhouse 100 can include a secondary battery disposed within the wiring chamber 134. Where the camera 154 is positioned above the camera platform 130, the secondary battery can be connected to and power the camera 154 via wiring extending through the aperture 136 (see FIG. 5).

Figure 11:
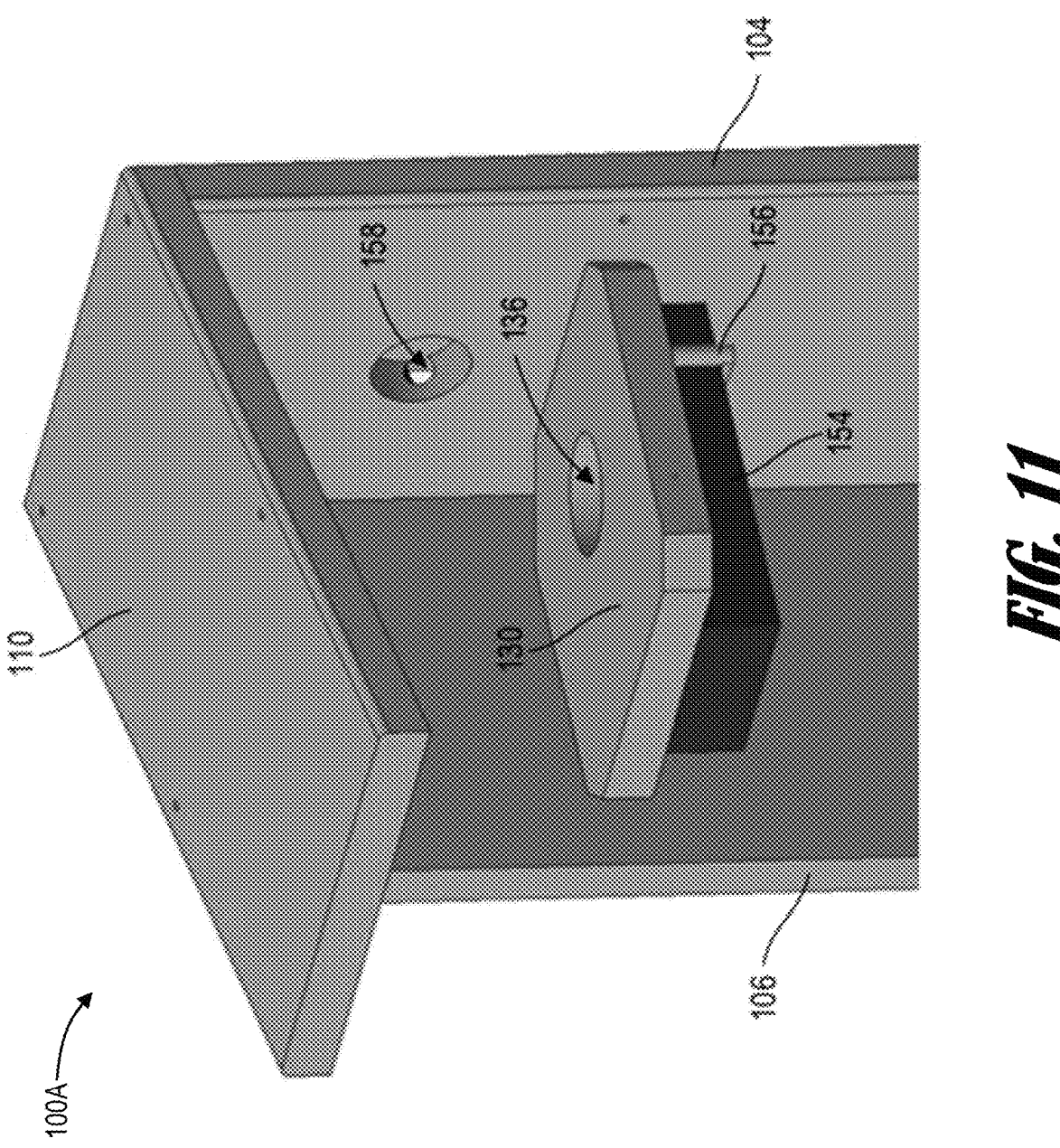
FIG. 11 is a perspective view of the interior of a birdhouse wherein a rear wall has an opening for a wire in accordance with an exemplary embodiment.
Figure 12:
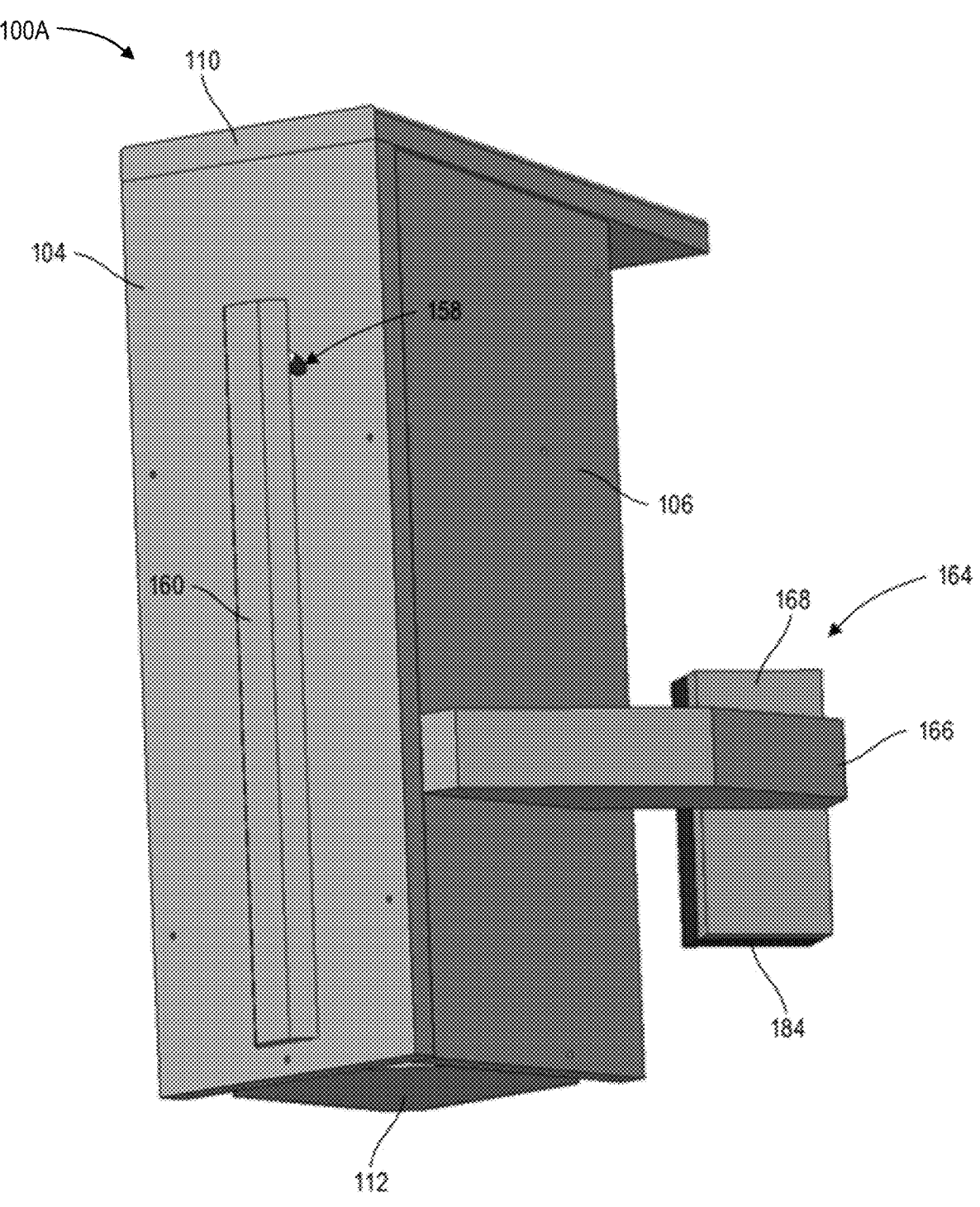
FIG. 12 is a rear, perspective view of a birdhouse wherein a rear wall has an opening for a wire in accordance with an exemplary embodiment.

Additionally, FIG. 11 is a front, perspective view of the interior of another birdhouse 100A where a rear wall has an opening for a wire, and FIG. 12 is a rear, perspective view of the same birdhouse 100A. In the embodiment illustrated in FIGS. 11 and 12, wiring associated with the camera 154 exits the rear of the birdhouse 100A.

In the birdhouse 100A of FIGS. 11 and 12, the rear wall 104 includes an angled opening 158 and a cord concealing spine 160. The opening 158 extends through the rear wall 104 and is angled downward to prevent the ingress of water into the wiring chamber 134. The cord concealing spine 160 provides a gap between a surface to which the birdhouse 100A is mounted and the outer surface of the rear wall 104. The wiring can run within this gap in the cord concealing spine 160 without being compressed by the rear wall 104.

Figure 15:
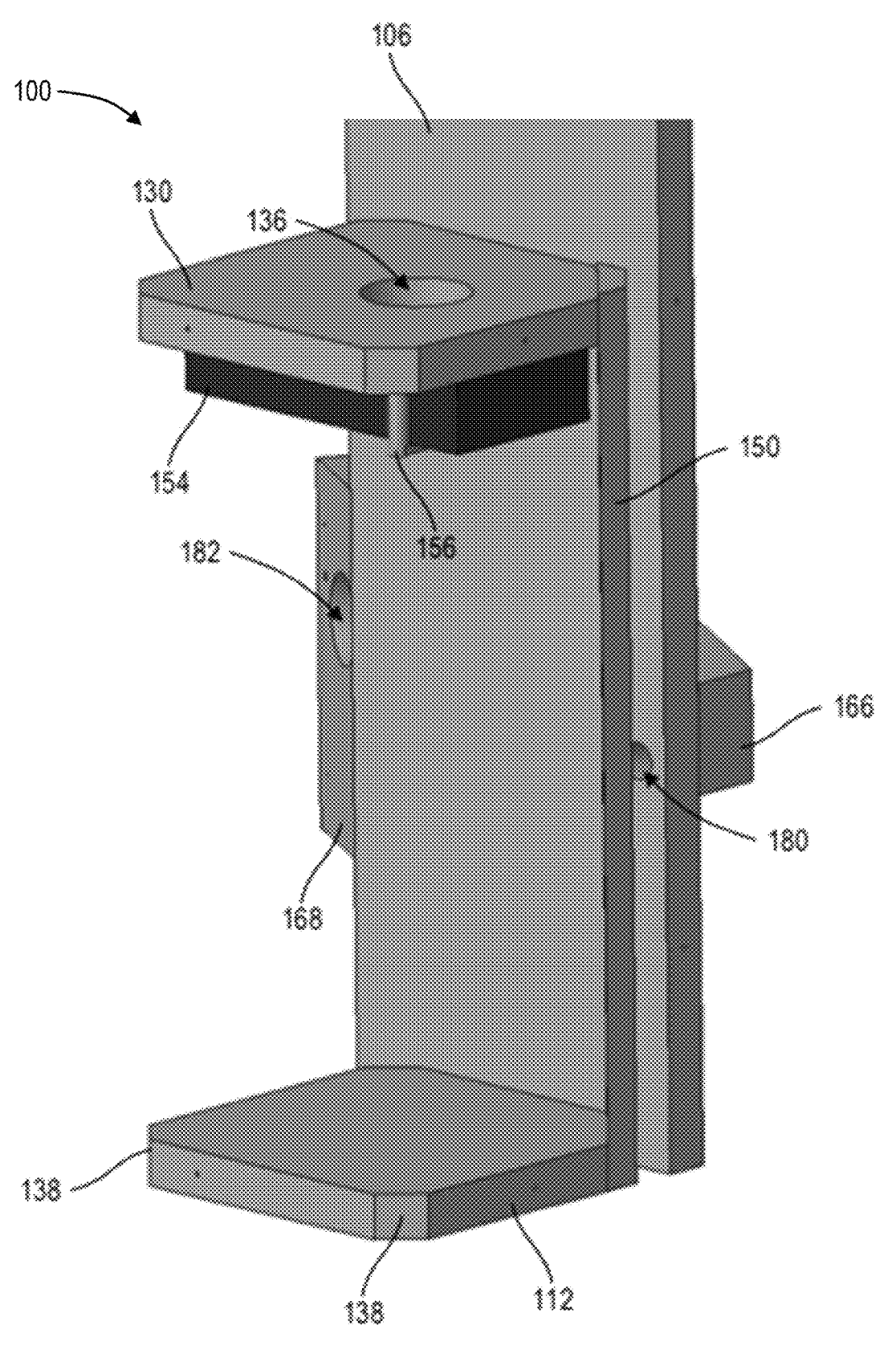
FIG. 15 is a perspective view illustrating an opening of a side wall of a birdhouse in accordance with an exemplary embodiment.

In the birdhouse 100 of FIG. 15, various walls are omitted to allow certain features to be seen. In FIG. 15, the left-side wall 106 includes an opening 180 that extends through the left-side wall 106. The opening 180 is located proximate to the rear wall 104 and can be in open communication with the channel 152 of FIG. 7. The arm 166 (see FIGS. 7, 13) is connected to the left-side wall 106 such that the first opening 174 (see FIGS. 13-14) of the arm 166 and the opening 180 of the left-side wall 106 align. When the arm 166 is positioned in this manner, the conduit 178 (see FIG. 14) and therefore the second opening 176 can be in open communication with the channel 152.

Figure 16:
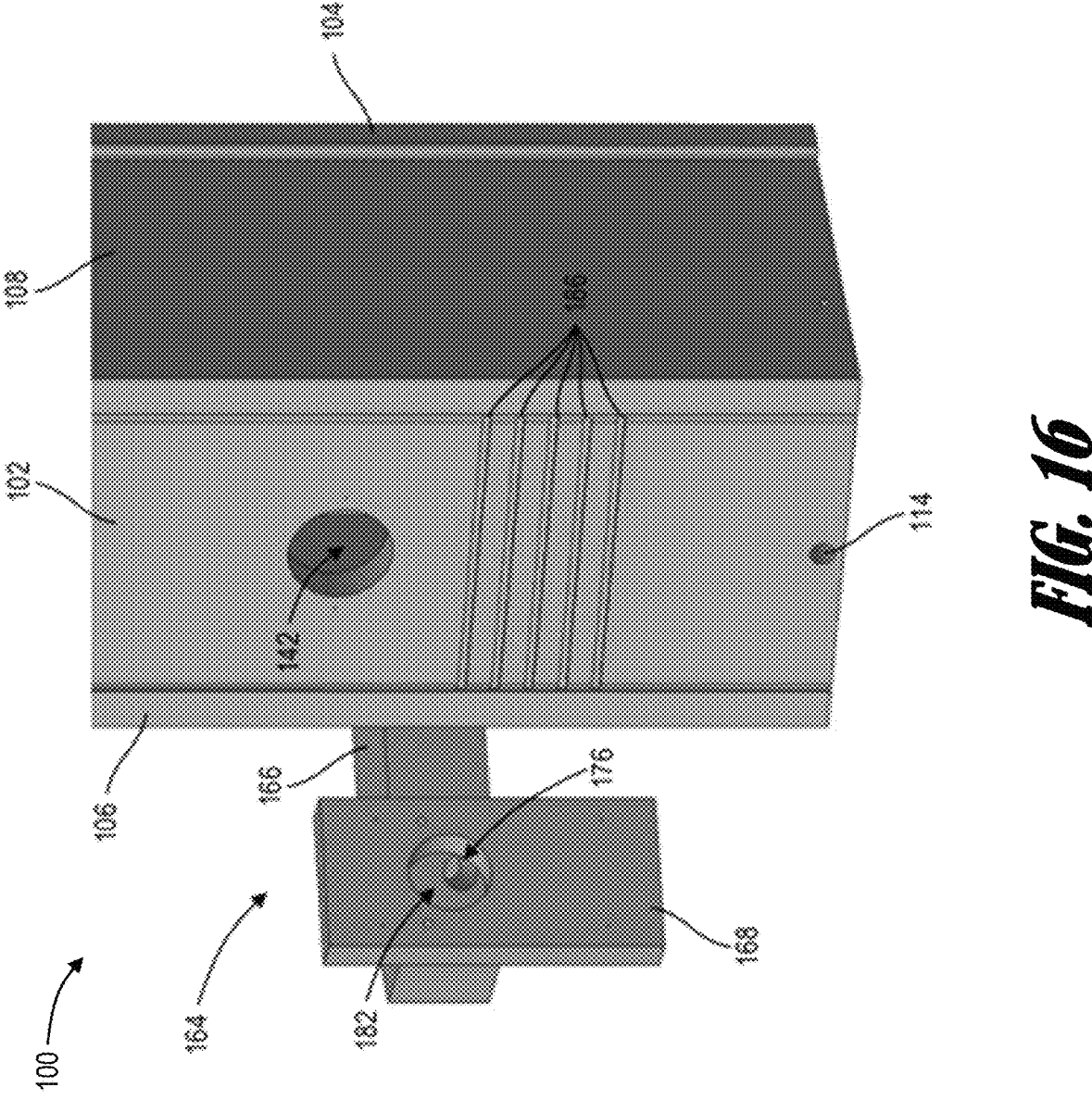
FIG. 16 is a perspective view illustrating openings of a camera support arm in accordance with an exemplary embodiment.

As illustrated in FIG. 16, the arm 166 can include an opening 176 therein. The camera platform 168 includes an opening 182 that extends through the camera platform 168. When the camera platform 168 is connected to the arm 166, the opening 182 of the camera platform 168 can be in open communication with the second opening 176 of the arm 166 as illustrated in FIG. 16. As such, the opening 182 of the camera platform is in open communication with the channel 152 (see FIG. 7) via the conduit 178.

Figure 17:
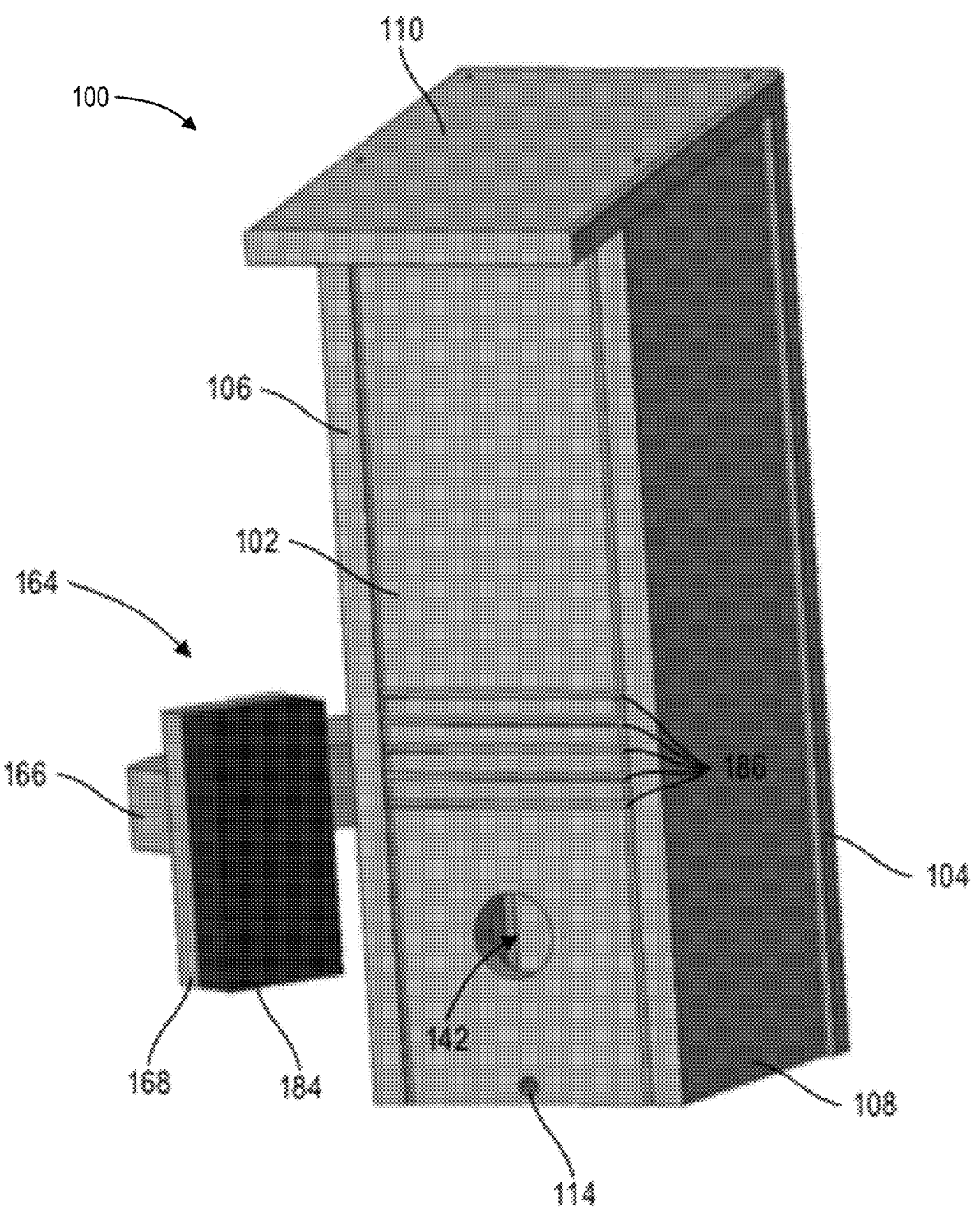
FIG. 17 is a perspective view illustrating a birdhouse with a portal in a roosting position in accordance with an exemplary embodiment.

As illustrated in FIG. 17, the birdhouse 100 can be configured so that the portal 142 is in a roosting configuration in some embodiments. In this roosting configuration, the portal 142 can be positioned vertically below the exterior perching grooves 186 and the interior perching grooves 188 (see FIG. 2) and closer to the bottom wall 112 (see FIG. 2). This portal 142 can be converted between a roosting configuration and a nesting configuration in various ways. For example, the conversion from the nesting configuration to the roosting configuration or from the roosting configuration to the nesting configuration can be accomplished by inverting the front wall 102. As another example, conversion between configurations can be accomplished by replacing the front wall 102 with a different second wall/door configured for roosting.

Placing the portal 142 closer to the bottom wall 112 (see FIG. 2) can provide an environment more conducive to roosting within the nest chamber 132 and as such, in this embodiment, the nest chamber 132 can be referred to as a "roosting chamber." For example, in this embodiment, when a bird perches on the perching grooves 188, the bird is located higher within the nest chamber 132 than a bird in a nest on the bottom wall 112. Heat rises within the nest chamber 132 and as such, a bird located higher up above the portal 142 within the nest chamber 132 can be more likely to roost in the birdhouse 100 as the perching grooves 188 are located in a warmer environment.

As illustrated in FIG. 17, a camera 184 can be mounted to the camera platform 168. The camera 184 is configured to capture an image of an area in front of the portal 142. As such, the camera 184 can capture an image of a bird (or another animal) attempting to enter and/or exit the birdhouse 100. The camera 184 can also be configured to capture an image of other animals proximate to the portal 142. While the camera 184 is depicted as vertically below the portal 142, in other embodiments, the external camera support 164 and therefore the camera 184 can be positioned vertically above the portal 142 as illustrated in FIG. 17. The camera 184 is positioned such that the camera 184 captures an image (or video) of the portal 142 and an area surrounding the portal 142.

The camera platform 168 can be shaped and sized based on the size and shape of the camera 184. Furthermore, the camera platform 168 can be removably connected to the arm 166. As such, a first camera platform 168 that accommodates a first camera 184 can be removed from the arm 166 and replaced with a different camera platform that accommodates a second camera that is different from the first camera 184.

The camera 184 can require a connection to a power source (e.g., an electrical outlet). In these embodiments, wiring can extend from the camera 184 and enters the conduit 178 (see FIG. 14) via the opening 182 (see FIG. 16) of the camera platform 168 and the second opening 176 of the arm 166. The wiring can then extend through the conduit 178, exit the conduit 178 via the first opening 174 (see FIG. 14) and enter the channel 152 (see FIG. 7) via opening 180 (see FIG. 15) of the left-side wall 106. The wiring can then extend through the channel 152 and can exit the birdhouse 100 via an opening created by a beveled corner 138 (see FIG. 15), thereby allowing the wiring to connect to an external power source.

As previously discussed herein, wiring connected to an external power source can extend through the channel 152 (see FIG. 7) and can enter the wiring chamber 134 (see FIG. 6), thereby providing an AC outlet within the wiring chamber 134. In this embodiment, wiring extends from camera 184 enters the channel 152 as previously discussed herein extends through the channel 152 and enters the wiring chamber 134 via an opening defined by a beveled corner 140 (see FIG. 6). The wiring connected to the camera 184 can then connect to the AC outlet within the wiring chamber 134. Since the wiring associated with the camera 184 is retained in the conduit 178 and the channel 152, the wiring is protected from damage that can be caused by the external environment and birds as the wiring is inaccessible from the external environment and is inaccessible from within the nest chamber 132. The birds are also protected by preventing them from interacting with the wiring.

In some embodiments, the camera 184 can be battery powered. As such does not include wiring needed to power the camera 184. In these embodiments, a user can remove the camera from the camera platform 168 or can remove the battery from the camera 184, charge the battery, and return the camera 184 to the camera platform 168 or return the battery to the camera 184. As previously discussed herein, the birdhouse 100 can include a secondary battery disposed within the wiring chamber 134. In these embodiments, wiring connected to the camera 184 can extend into the wiring chamber 134 as previously discussed herein and connect to the secondary battery.

Figure 18:
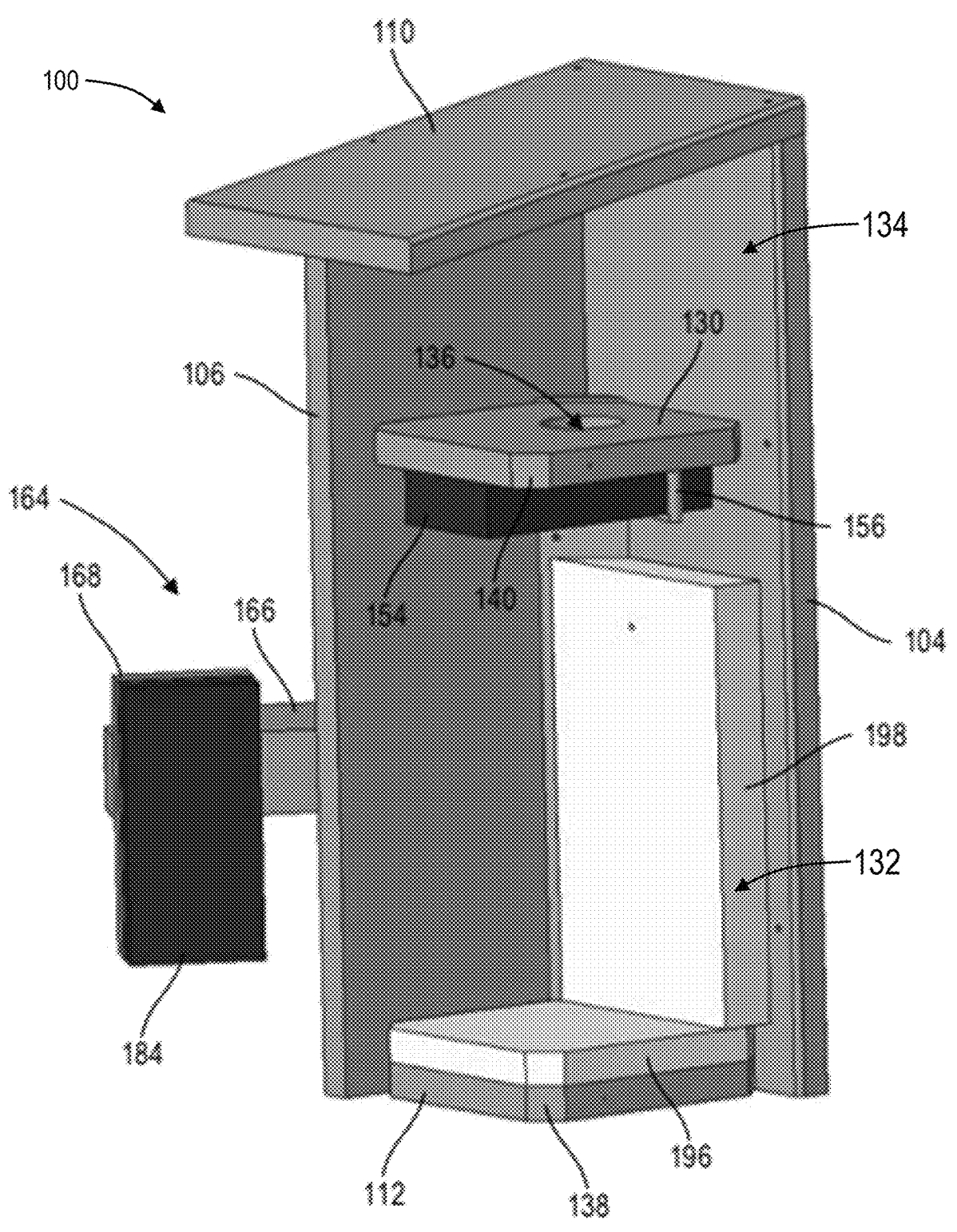
FIG. 18 is a perspective view illustrating an interior of a birdhouse with additional plates in accordance with an exemplary embodiment.

In FIG. 18, a perspective view is provided illustrating an interior of the birdhouse 100 where additional plates can be seen. As illustrated in FIG. 18, a nest chamber height adjusting floor plate 196 and/or one or more wall plates 198 can be added to the nest chamber 132 to reduce the size of the nest chamber 132. The nest chamber height adjusting floor plate 196 can rest on or can be connected to the bottom wall 112. The wall plate(s) 198 can be connected to the rear wall 104, the left-side wall 106 or the right-side wall 108. While FIG. 18 depicts the birdhouse 100 as including one wall plate 198, in other embodiments, the birdhouse 100 can include two or more wall plates 198 with each connected to one of the rear wall 104, the left-side wall 106, and/or the right-side wall 108. The nest chamber height adjusting floor plate 196 and the wall plate 198 can include beveled corners. When the birdhouse 100 includes the nest chamber height adjusting floor plate 196 and the wall plate 198, the nest chamber height adjusting floor plate 196 and the wall plate 198 can be positioned such that the plates 196, 198 do not cover the openings created by the beveled corners 138 of the bottom wall 112 or the camera platform 130. In another embodiment, changing the vertical height of the bottom wall

112 via a tongue and groove method (or other method) serves the same purpose as the insertion of the nest chamber height adjusting floor plate 196.

Figure 19:
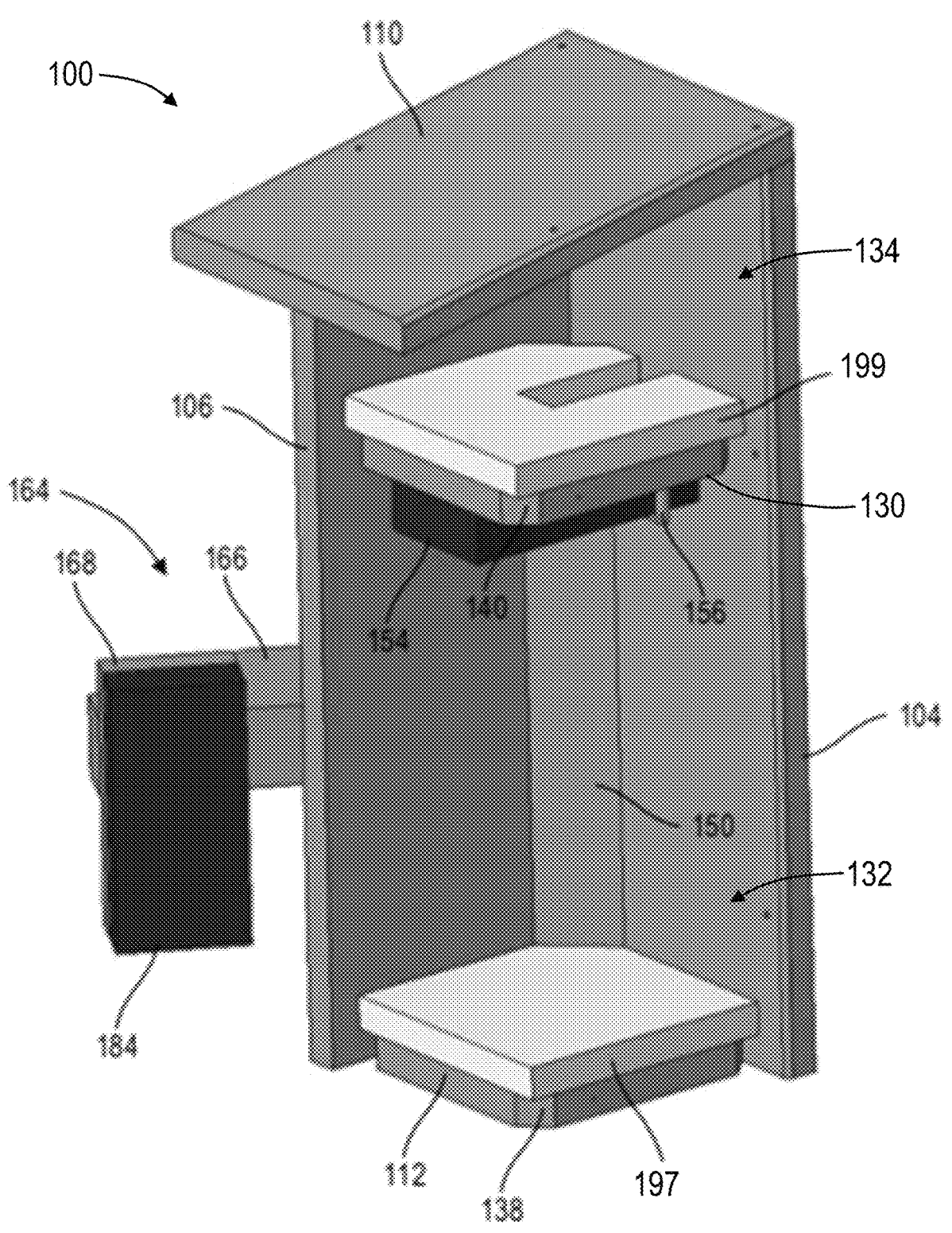
FIG. 19 is a perspective view illustrating an interior of a birdhouse with insulating plates in accordance with an exemplary embodiment.

As noted above, it can be beneficial in some scenarios for users to provide a warmer nest chamber environment in order to promote roosting (e.g., during colder months in which additional warmth will not harm, but would rather benefit birds). In order to create a warmer environment, the openings created by the beveled corners 138 and 140 can be blocked or plugged, thereby preventing warm air from escaping the birdhouse 100 via the openings. Another way to accomplish this is through the use of insulating plates, and FIG. 19 illustrates the interior of a birdhouse 100 having insulating plates positioned within the internal volume of the birdhouse 100. The insulating plates include an insulating nest chamber floor plate 197 and an insulating wiring chamber floor plate 199. The insulating nest chamber floor plate 197 can be added to the nest chamber 132, with the insulating nest chamber floor plate 197 being configured to rest on the bottom wall 112. The insulating wiring chamber floor plate 199 can be added to the wiring chamber 134, with the insulating wiring chamber floor plate 199 being configured to rest on the camera platform 130. Unlike the bottom wall 112 and the camera platform 130, the insulating nest chamber floor plate 197 and the insulating wiring chamber floor plate 199 do not include beveled corners. As such, the openings created by the beveled corners 138 and 140 are covered by the insulating floor plates 197 and the 199 respectively. While FIG. 19 depicts the insulating floor plates 197 and 199 as covering the openings created by the beveled corners 138 and 140, in other embodiments other means for covering these openings can be employed. In one example, the birdhouse 100 can include plugs that are inserted into the openings created by the beveled corners 138 and 140. In another example, the birdhouse 100 can include slidable or rotatable vertical or horizontal sliders that cover the openings created by the beveled corners 138 and 140. Sliders can be also small, discrete means of covering individual openings in the bottom wall 112 and the camera platform 130. These sliders can be connected to the surface of the camera platform 130, bottom wall 112, or the side walls 106 and 108 and slide or rotate into position to cover the openings.

Figure 20:
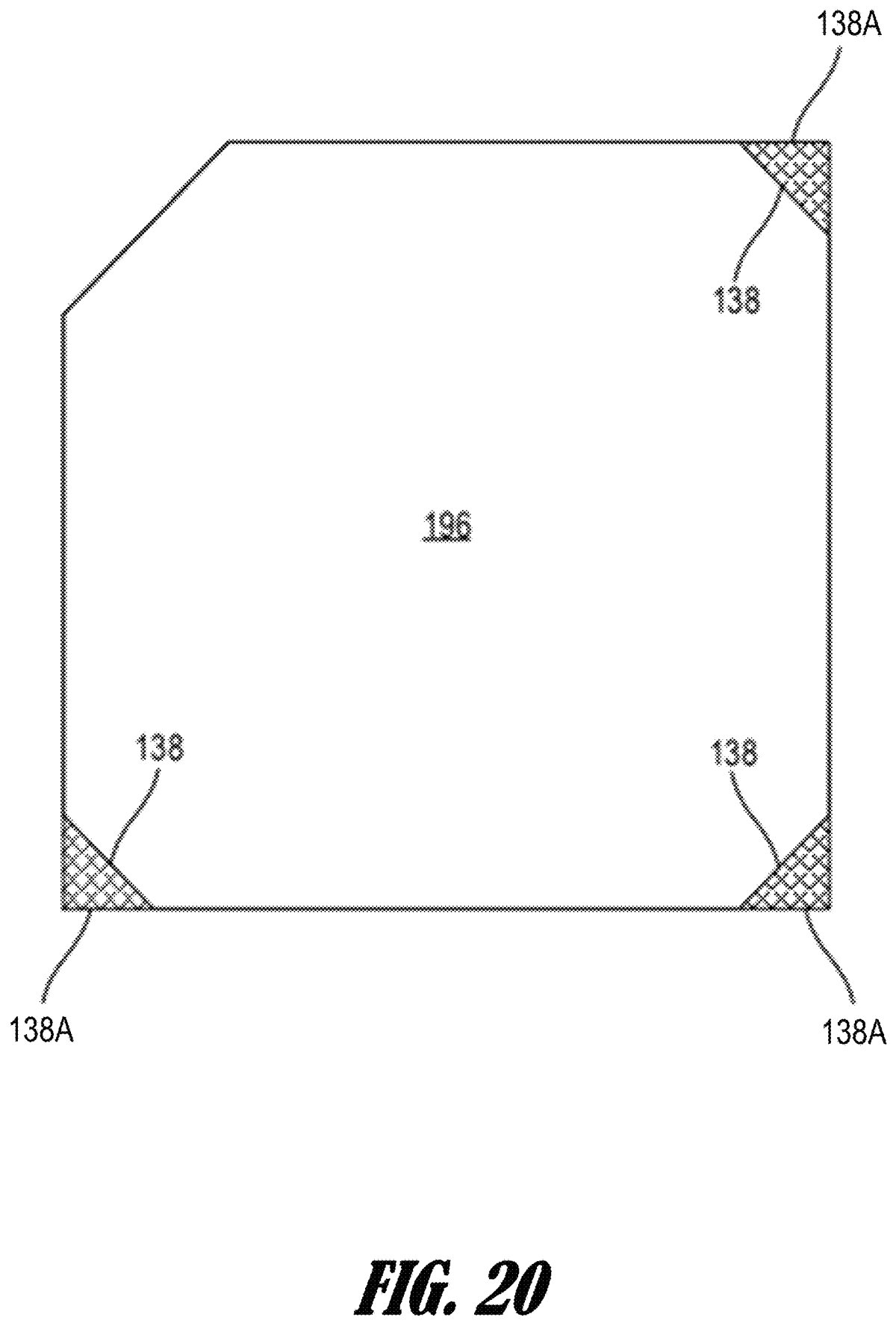

FIG. 20 is a top view illustrating a floor plate of a birdhouse with mesh coverings. Looking now at FIG. 20, an example nest chamber height adjusting floor plate 196 is illustrated. The nest chamber height adjusting floor plate 196 includes three mesh coverings 138A, but the nest chamber height adjusting floor plate 196 can include a different number of mesh coverings 138A in other embodiments. While the mesh covering 138A covers the openings created by the beveled corners 138 of the bottom wall 112, air can still flow between the external environment and the nest chamber 132. In one embodiment, the bottom wall 112 can also contain one or more mesh coverings that cover openings created by the beveled corners 138. Mesh coverings similar to mesh coverings 138A can be used in internal gaps that are present in other embodiments, and mesh coverings similar to mesh coverings 138A can be used at different locations within a birdhouse to prevent insects and other debris from passing through the mesh coverings. In some embodiments, mesh coverings can also be used to cover openings to the outside environment.

Figure 21:
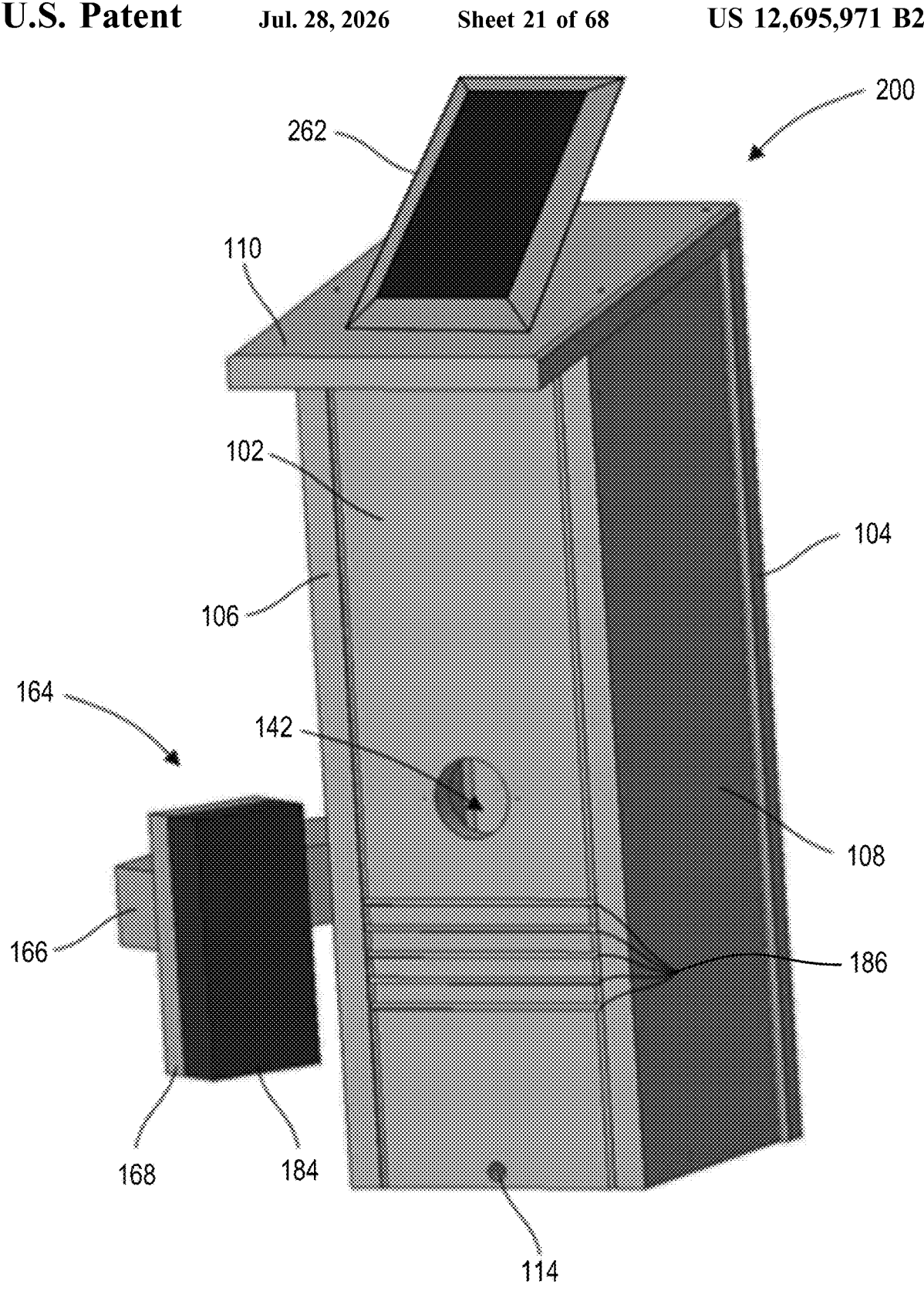
FIG. 21 is a perspective view illustrating a birdhouse with a solar panel in accordance with an exemplary embodiment.

Another embodiment of a birdhouse 200 is illustrated in the perspective view of FIG. 21. The birdhouse 200 can include a solar panel 262 and a camera 184 similar to camera 154. The camera 184 can be a battery powered camera in some embodiments, particularly where solar panel 262 is used. In the embodiment having a solar panel 262, wiring associated with the camera can exit the birdhouse 200 and couples to the solar panel 262. The solar panel 262 can charge the camera battery, thereby providing power to the camera without a connection to an electrical outlet. The camera can be connected to the solar panel via wiring that extends through an opening similar to opening 158 of FIG. 11.

Where the camera 184 and the birdhouse 200 includes the solar panel 262 as illustrated in FIG. 21, wiring associated with the camera 184 can exit the birdhouse 100 via the conduit 178 and the channel 152 as previously discussed herein, and the wiring can couple to the solar panel 262. The solar panel 262 can charge the camera battery, thereby providing power to the camera 184.

Figure 22:
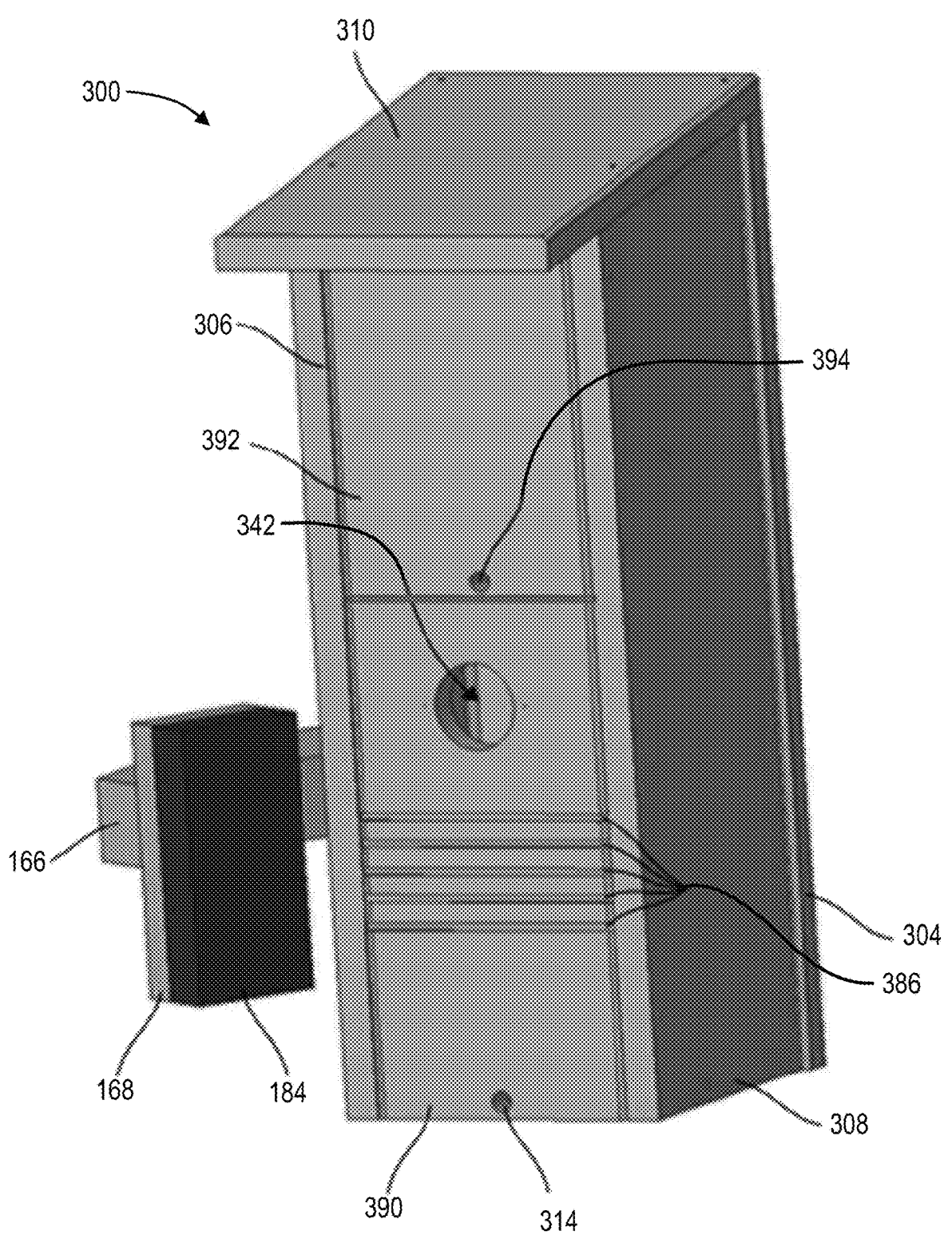
FIG. 22 is a perspective view illustrating a birdhouse with a nest chamber door and a wiring chamber door in accordance with an exemplary embodiment.

In some embodiments such as the embodiment of FIG. 1, the birdhouse 100 comprises a single front wall 102 that extends all the way from the bottom wall 112 to the top wall 110, with the front wall 102 being configured to be opened to provide access to both the nest chamber 132 and the wiring chamber 134. In other embodiments such as the embodiment of FIG. 22, this is not the case. In FIG. 22, the birdhouse 300 can include a nest chamber door 390 and a wiring chamber door 392 that is separate from the nest chamber door 390. The nest chamber door 390 extends from a first end proximate to the bottom wall of the birdhouse 300 to second end positioned at a location between the bottom wall of the birdhouse 300 and the top wall 310 of the birdhouse 300. The wiring chamber door 392 comprises a first end and a second end, with the first end positioned proximate to the second end of the nest chamber door 390 and with the second end of the wiring chamber door 392 positioned proximate to the top wall 310 of the birdhouse 300. Providing a two-door birdhouse 300 can allow a user to access the wiring chamber 334 without disturbing a nest in the nest chamber 332 or to access the nest chamber 332 without disturbing the electrical components within the wiring chamber 334.

In FIG. 22, the nest chamber door 390 is illustrated in a nesting configuration. This nest chamber door 390 can be converted between a roosting configuration and a nesting configuration in various ways. For example, the conversion from the nesting configuration to the roosting configuration or from the roosting configuration to the nesting configuration can be accomplished by inverting the nest chamber door 390. As another example, conversion between configurations can be accomplished by replacing the nest chamber door 390 with a different second nest chamber door configured for roosting/nesting.

The nest chamber door 390 includes a portal 342 similar to portal 142, exterior perching grooves 386 similar to exterior perching grooves 186, and interior perching grooves (not shown) similar to the interior perching grooves 188. The nest chamber door 390 also includes a latch 314 similar to latch 114, and the wiring chamber door 392 can include a latch 394 that operates similarly to the latch 114.

In some embodiments, the nest chamber door 390 and the wiring chamber door 392 can be pivotably connected on the birdhouse 300 so that these doors 390, 392 are configured to rotate open. For example, the top end of the nest chamber door 390 and the top end of the wiring chamber door 392 can be pivotably connected to the left-side wall 306 and the right-side wall 308 such that the nest chamber door 390 and the wiring chamber door 392 pivot upwards to an open position. These doors 390, 392 can alternatively be pivotably connected to the top wall 310 or a camera platform in some embodiments. As another example, the bottom end of the nest chamber door 390 and the bottom end of the wiring chamber door 392 can be pivotably connected to the left-side wall 306 and the right-side wall 308 such that the nest chamber door 390 and the wiring chamber door 392 pivot downwards to an open position. These doors 390, 392 can alternatively be pivotably connected to the bottom wall or a camera platform in some embodiments. In other embodiments, the nest chamber door 390 and the wiring chamber door 392 can be removably coupled to the left-side wall 306 and the right-side wall 308 via any manner of connection (e.g., via tongue and groove fit, a ball and socket pressure mount, etc.) and can be removed to provide access to the nest chamber and the wiring chamber within the birdhouse 300 respectively. In some embodiments, the nest chamber door 390 and wiring chamber door 392 can be removed from the birdhouse 300 by pulling the doors 390, 392 away from the birdhouse 300 and can be reconnected to the birdhouse 300 by pushing the doors 390, 392 into the birdhouse 300 (e.g., when the doors 390, 392 are connected to the birdhouse 300 via a ball and socket pressure mount). The nest chamber door 390 is dimensioned such that only the nest chamber (see, e.g., nest chamber 132 of FIG. 2) is accessible when the nest chamber door 390 is open or removed and the wiring chamber door 392 is dimensioned such that only the wiring chamber (see, e.g., wiring chamber 134 of FIG. 2) is accessible when the wiring chamber door 392 is open or removed. The rear wall 304, left-side wall 306, and right-side wall 308 are also illustrated in FIG. 22, and these can generally be similar to other walls described herein.

The birdhouse 300 also includes a latch 314 that is similar to the latch 114 previously described herein. In certain embodiments, the latch 314 is configured to move between a locked and unlocked position. When the latch 314 is in the locked position and the nest chamber door 390 is closed, the latch 314 couples to a bottom wall of the birdhouse 300 and prevents a user (or animal) from opening or removing the nest chamber door 390. When the latch 314 is rotated to the unlocked position, the latch 314 decouples from the bottom wall to allow a user to open or remove the nest chamber door 390. Like the latch 314, the latch 394 is also configured to move between a locked and unlocked position. When the latch 394 is in the locked position and the wiring chamber door 392 is closed, the latch 394 couples to the camera platform (see, e.g., camera platform 130 of FIG. 2) and prevents a user from opening or removing the wiring chamber door 392. When the latch 394 is rotated to the unlocked position, the latch 394 decouples from the camera platform 330 which allows a user to open or remove the wiring chamber door 392.

Figure 23:
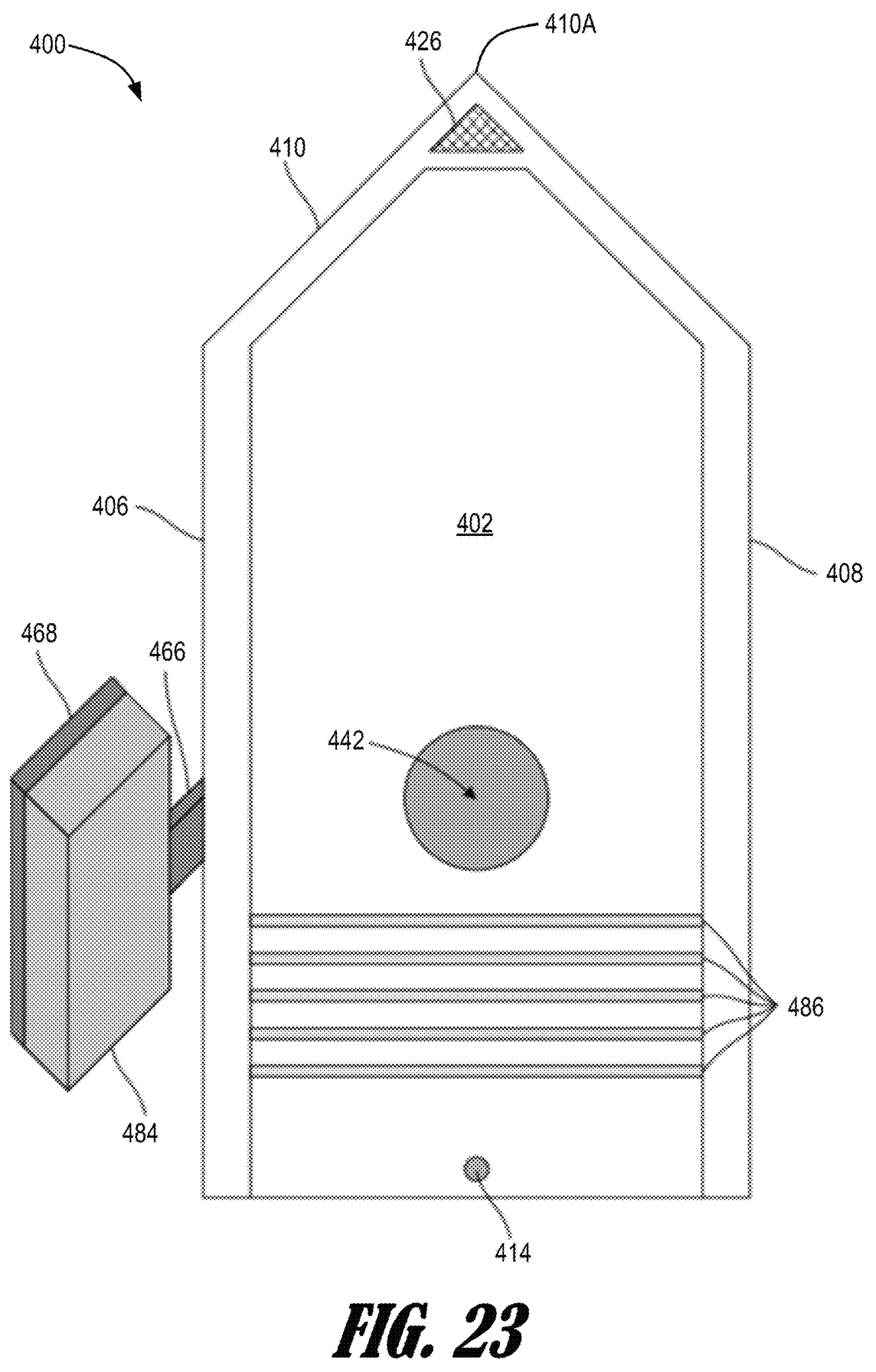

As illustrated in FIG. 23, the top wall 410 can be apexed such that the top wall 410 defines an apex 410A. The apex 410A can be an uppermost point or line for the top wall 410. The apex 410A is positioned approximately at a central location between the left-side wall 406 and the right-side wall 408, but the apex 410A can be positioned at another location between the left-side wall 406 and the right-side wall 408. In FIG. 23, the apex 410 defines a line that extends in a direction that is parallel to planes defined by the left-side wall 406 and the right-side wall 408. The top wall 410 pitches downward between the apex 410A and the left-side wall 406, and the top wall 410 also pitches downward between the apex 410A and the right-side wall 408. In these embodiments, the top wall 410 is configured to cause water (e.g., rainwater) to flow over the top wall 410 and towards either the left-side wall 406 or the right-side wall 408. Alternatively, the apex can be positioned at a central location between the front wall 402 and the rear wall (not shown), and the apex can define a line that extends in a direction that is parallel to planes defined by the front wall 402 and the rear wall 404.

In some embodiments where the top wall 410 is apexed and possesses an apex 410A, the top wall 410 can include an opening between the external environment and the interior of the birdhouse 400. The opening can be covered by a mesh, which is hereinafter referred to as a mesh vent 426. The mesh employed in covering the opening can prevent the ingress of insects or other unwanted objects into the interior of the birdhouse 400. Similar mesh can be employed to cover other openings of the birdhouse that are not intended for bird entry (e.g., the openings of a bottom wall of a birdhouse, ventilation openings of any of the walls of the birdhouse, the ventilation gap 124 of FIG. 3, etc.). While FIG. 23 depicts the birdhouse 400 as including one mesh vent 426, in other embodiments, the birdhouse 400 can include a plurality of mesh vents. Mesh vents can be positioned at other locations within the birdhouse 400. Heat within the birdhouse 400 (e.g., heat generated by electronics within the birdhouse 400, heat from the sun or external temperature, heat from a bird within the birdhouse 400, etc.) can rise within the birdhouse 400 and can exit the birdhouse 400 via the mesh vent(s) 426 thereby safeguarding the electronics as well as birds within the birdhouse 400 from excess heat.

The birdhouse 400 of FIG. 23 also illustrates a latch 414, an arm 466, an external camera platform 468, an external camera 484, and exterior perching grooves 486. Each of these components can be similar to other corresponding components described herein (e.g., external camera platform 468 can be similar or identical to camera platform 168 of FIG. 5 and other external camera platforms described herein). Exterior perching grooves 486 can be similar to the perching grooves 186, 188 and other grooves described herein.

Figure 24:
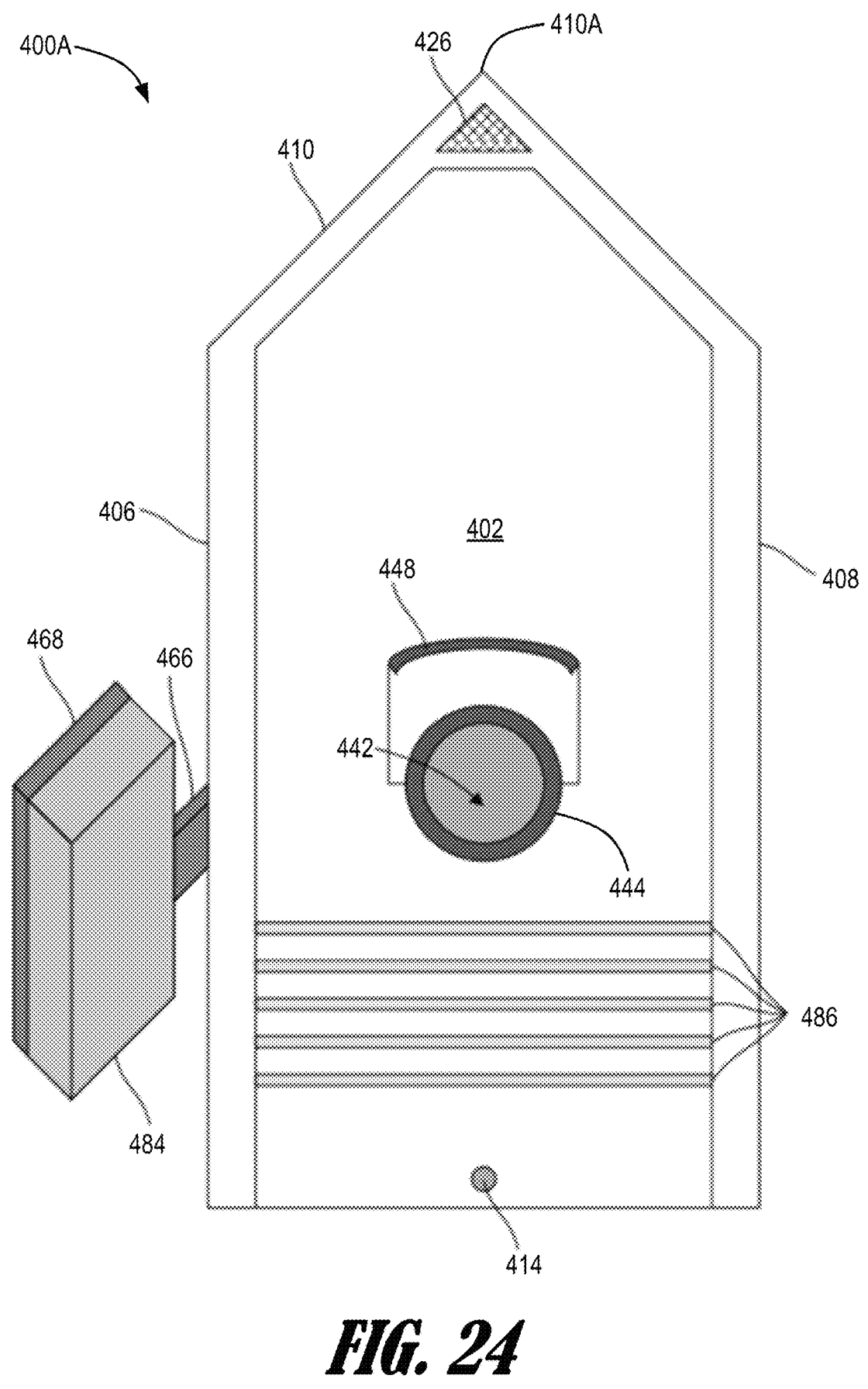

In the embodiment illustrated in FIG. 24, the front wall 402 of the birdhouse 400A includes a portal guard 444 that surrounds the portal 442. The portal guard 444 can be formed of a metal or another durable material. The portal guard 444 can be configured to provide additional structural strength to the front wall 402.

The birdhouse 400A of FIG. 24 can include a portal roof 448. This portal roof 448 can be similar to the angled lip 646 described herein in reference to FIGS. 26 and 27. The portal roof 448 is positioned vertically above the portal 442 and extends downward and away from the front wall 402. Additionally, the portal roof 448 is generally curved in shape so that the uppermost position of the portal roof 448 is generally centered between sidewalls 406, 408 and so that the portal roof 448 drops to lower locations at positions closer to the sidewalls 406, 408. Thus, when water (or other precipitation) contacts the portal roof 448, the portal roof 448 can be configured to cause rainwater to flow over the portal roof 448 and off a side of the portal roof 448 without entering the internal volume of the birdhouse 400A via the portal 442. The portal roof 448 does not extend across the entire width of the front wall 402, but the portal roof 448 can possess different sizes, shapes, and/or positions in other embodiments.

Figure 25:
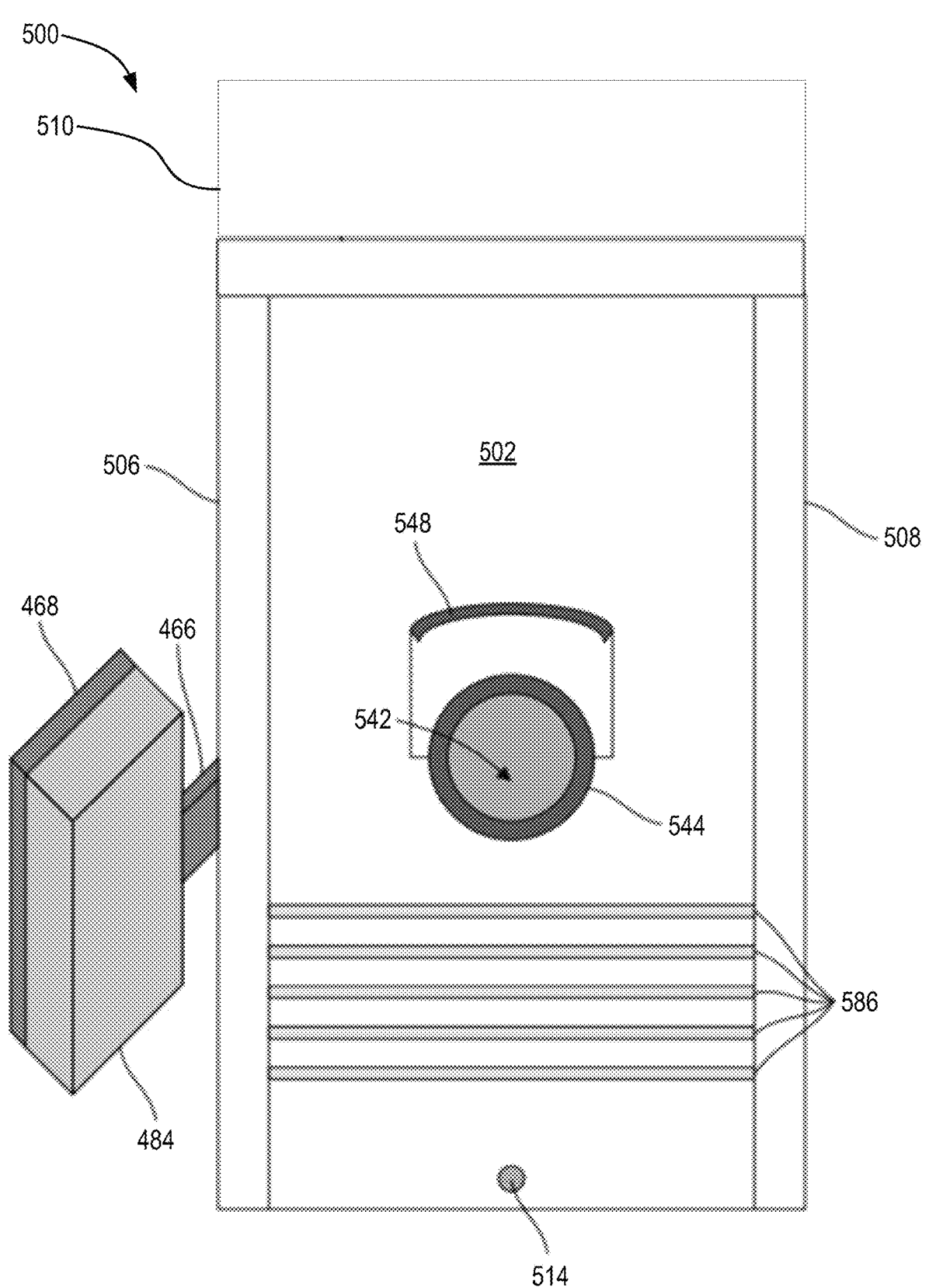
FIG. 25 is a front, schematic view illustrating a birdhouse with a portal roof and a portal guard in accordance with an exemplary embodiment.

In FIG. 25, another birdhouse 500 is illustrated. This birdhouse 500 includes a portal roof 548 that is generally identical to the portal roof 448 of FIG. 24. The birdhouse 500 also includes a portal 542 and a portal guard 544, and these components are generally identical to the corresponding features within the birdhouse 400 of FIG. 24.

In the embodiment illustrated in FIG. 25, the front wall 502 of the birdhouse 500 includes a portal guard 544 that surrounds the portal 542. The portal guard 544 can be formed of a metal or another durable material. The portal guard 544 can be configured to provide additional structural strength to the front wall 502. The birdhouse 500 also includes a left-side wall 506, a right-side wall 508, a top wall 510, a latch 514, and exterior perching grooves 586, and each of these components can be similar or identical to corresponding components described herein.

Figure 26:
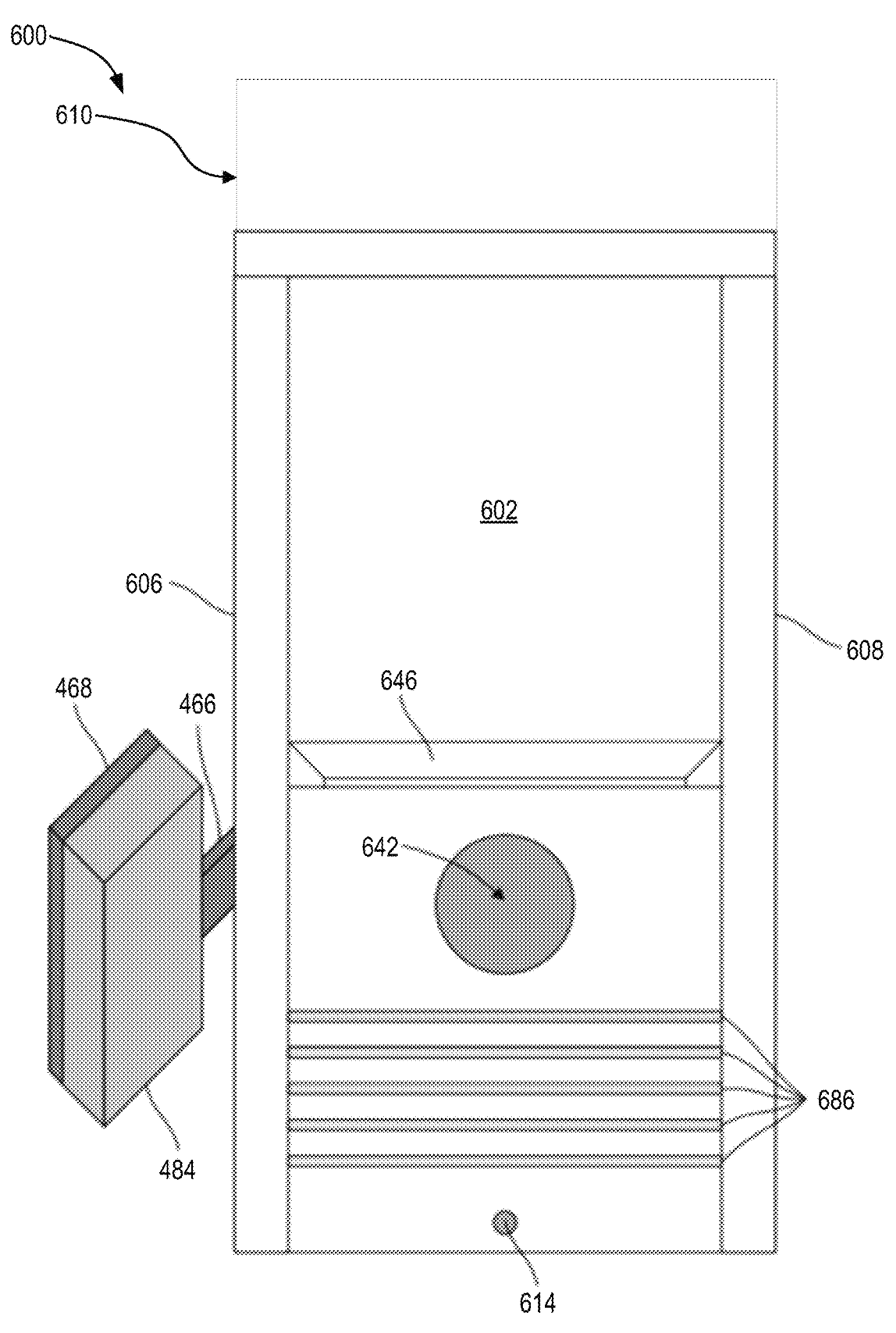
FIG. 26 is a front, schematic view illustrating a birdhouse with an angled lip in accordance with an exemplary embodiment.
Figure 27:
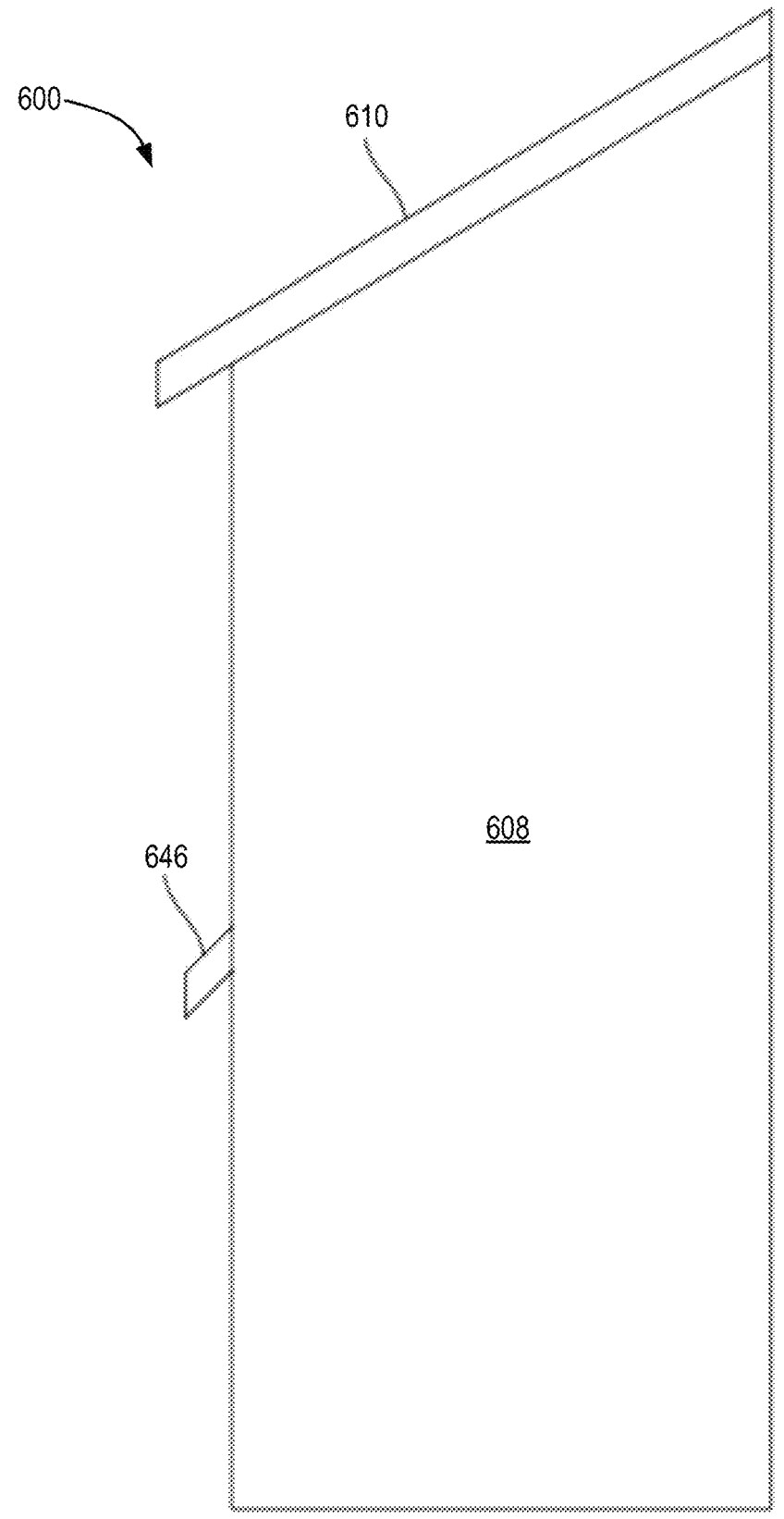
FIG. 27 is a side, schematic view illustrating the birdhouse of FIG. 26 in accordance with an exemplary embodiment.

Birdhouse can also include features for preventing water from entering a birdhouse nest chamber via a portal. For example, FIG. 26 illustrates a front, schematic view of a birdhouse 600 with an angled lip 646, and FIG. 27 is a side, schematic view illustrating the angled lip 646 of the birdhouse 600.

The angled lip 646 is attached to the front wall 602, and the angled lip 646 is positioned above the portal 642. The angled lip 646 extends horizontally across the full length of the front wall 602. However, the angled lip 646 can possess a different shape, size, or position in other embodiments (e.g., the angled lip 646 can only be positioned at locations immediately above the portal 642). The top surface of the angled lip 646 extends downward and away from the front wall 602. For example, the top surface of the angled lip 646 can define an angle relative to the front surface of the front wall 602, with this angle being between about 95 degrees and about 150 degrees. Where the angled lip 646 is used, rainwater (or other precipitation) can contact the top surface of the angled lip 646, and this rainwater can flow over the angled lip 646 without entering the internal contents of the birdhouse 600 via the portal 642.

The birdhouse 600 also includes a left-side wall 606, a right-side wall 608, a top wall 610, a latch 614, and exterior perching grooves 686, and each of these components can be similar or identical to corresponding components described herein. The portal 642, the exterior perching grooves 686, and the latch 614 are each positioned on the front wall 602 or the exterior surface of the front wall 602.

Figure 28:
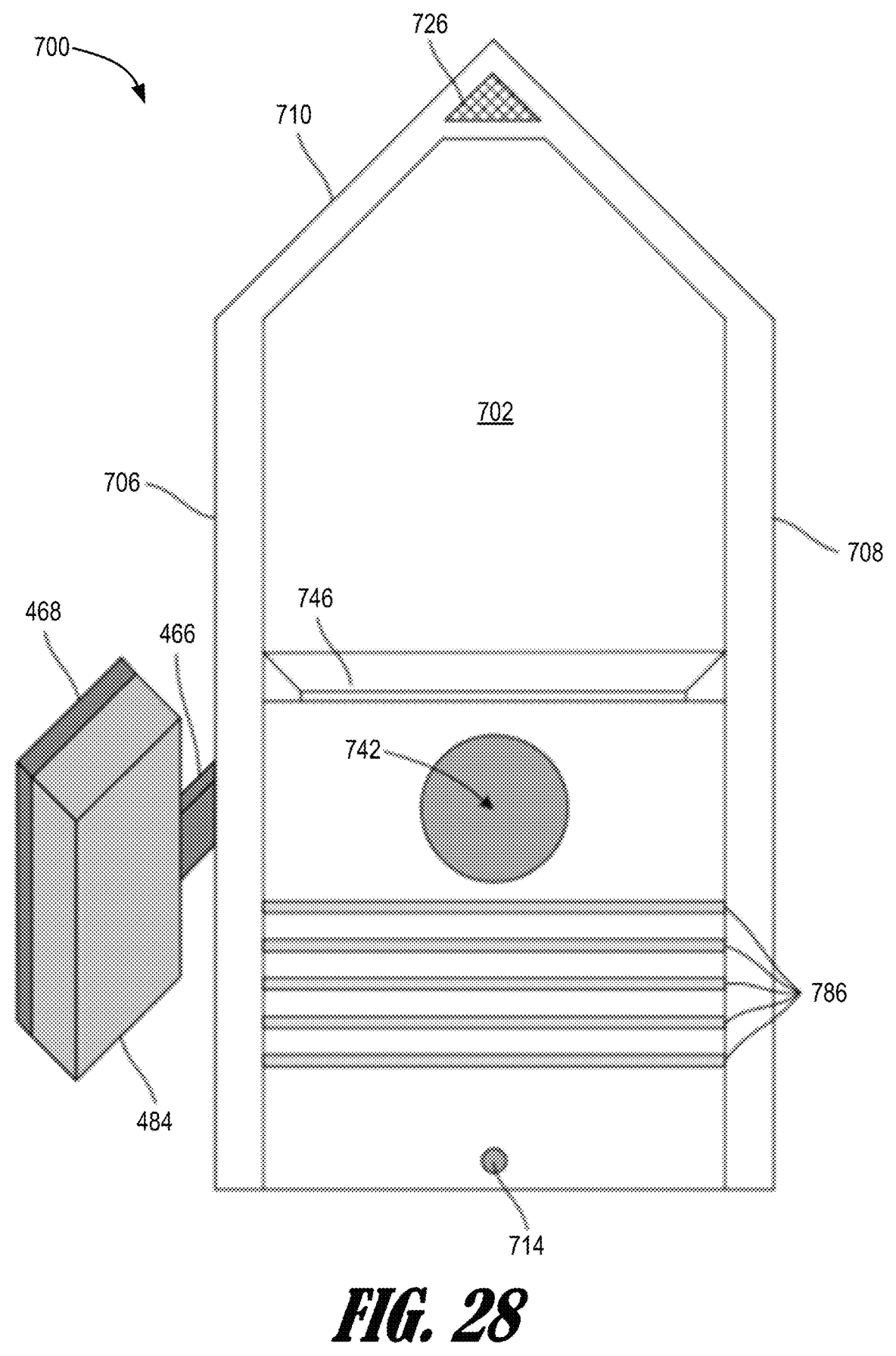

FIG. 28 is a front, schematic view illustrating a birdhouse 700 with an apexed roof 710 and an angled lip 746 in accordance with an exemplary embodiment. The angled lip 746 is generally identical to the angled lip 646 of FIGS. 26 and 27 and functions in the same manner. The birdhouse 700 comprises a front wall 702 that serves as a door. The birdhouse 700 also includes a left-side wall 706, a right-side wall 708, a latch 714, a mesh vent 726, a portal 742, and exterior perching grooves 786, and each of these components can be similar or identical to corresponding components described herein.

Figure 29:
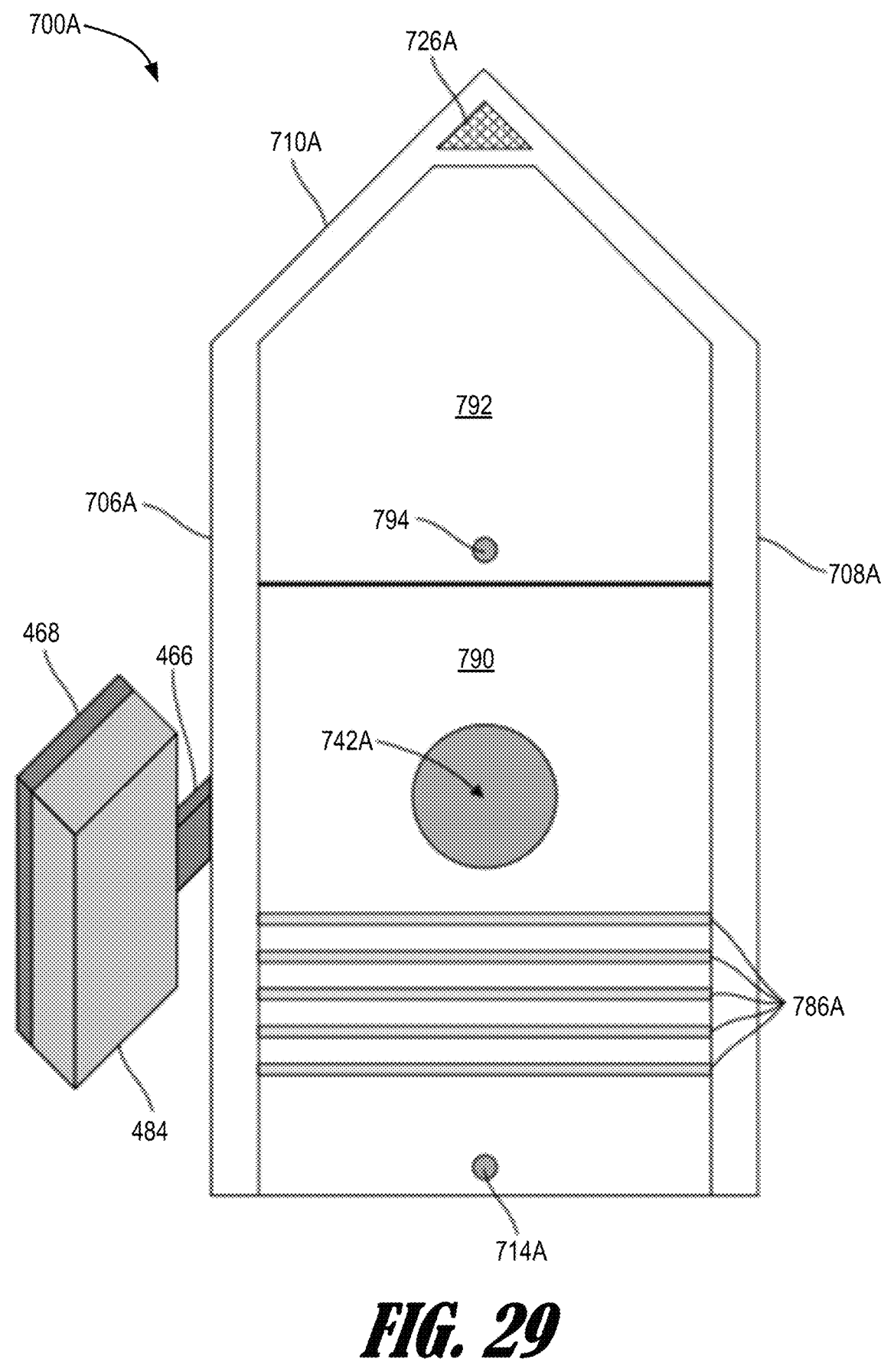

Another birdhouse 700A is illustrated in FIG. 29. Rather than having a single front door, the front of the birdhouse 700A comprises a separate nest chamber door 790 and wiring chamber door 792. The nest chamber door 790 can be configured to be opened to allow access to the nest chamber within the birdhouse 700 without exposing the wiring chamber to the external environment. Similarly, the wiring chamber door 792 can be configured to be opened to allow access to the wiring chamber within the birdhouse 700 without exposing the nest chamber.

While angled lip is illustrated in the birdhouse 700A, an angled lip can be positioned at the top of the nest chamber door 790 just above the portal 742A. The birdhouse 700A includes an apexed roof 710A and a mesh vent 726A similar to those described herein. The portal 742A, the exterior perching grooves 786A, and the latch 714A are each positioned on the nest chamber door 790. Additionally, the latch 794 is positioned on the wiring chamber door 792. The latch 714A can be configured to selectively lock the nest chamber door 790, and the latch 794 can be configured to selectively lock the wiring chamber door 792. The left-side wall 706A and the right-side wall 708A can be compressed against the sides of the doors 790, 792 to help ensure that an effective seal is formed. It should be noted that the dimensions of the birdhouse 700, the nesting chamber door 790, and the wiring chamber door 792 can be different in other embodiments— for example, the nesting chamber and the nesting chamber door 790 can be increased in height, and the wiring chamber and the wiring chamber door 792 can be reduced in height.

The light that enters a birdhouse through the portal such as portal 142 of FIG. 1 can sometimes be such that viewing activity in the nest chamber is difficult due to poor overall illumination. As such, providing additional illumination, such as via a supplemental light source can enhance the viewer's experience watching and learning about the bird's activities. As such, it would be highly advantageous to replicate the natural nesting environment of cavity nesting birds.

Figure 30:
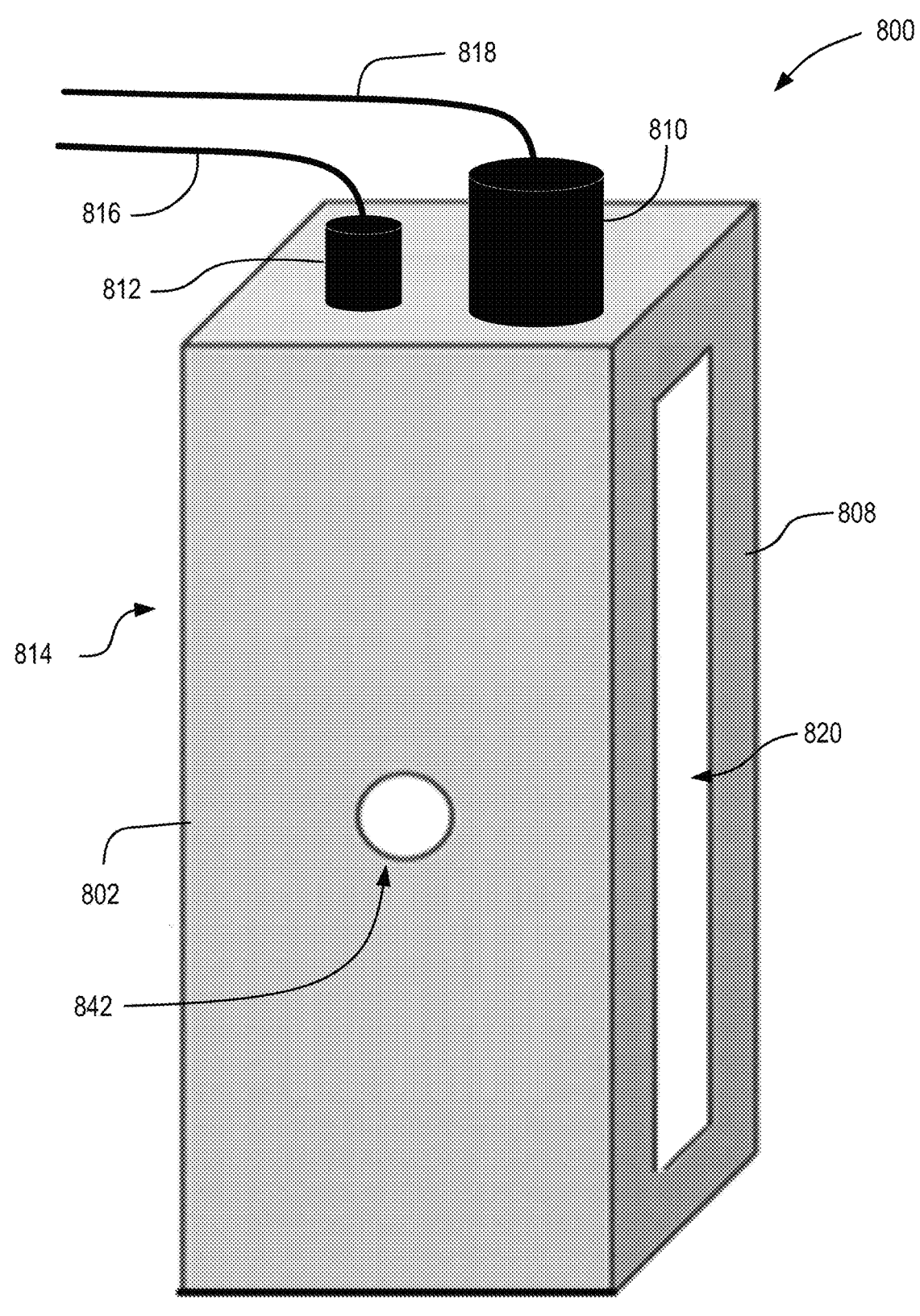
FIG. 30 is a schematic view illustrating an example birdhouse having a light panel and a light that is optically coupled to the nest chamber in accordance with an exemplary embodiment.
Figure 31:
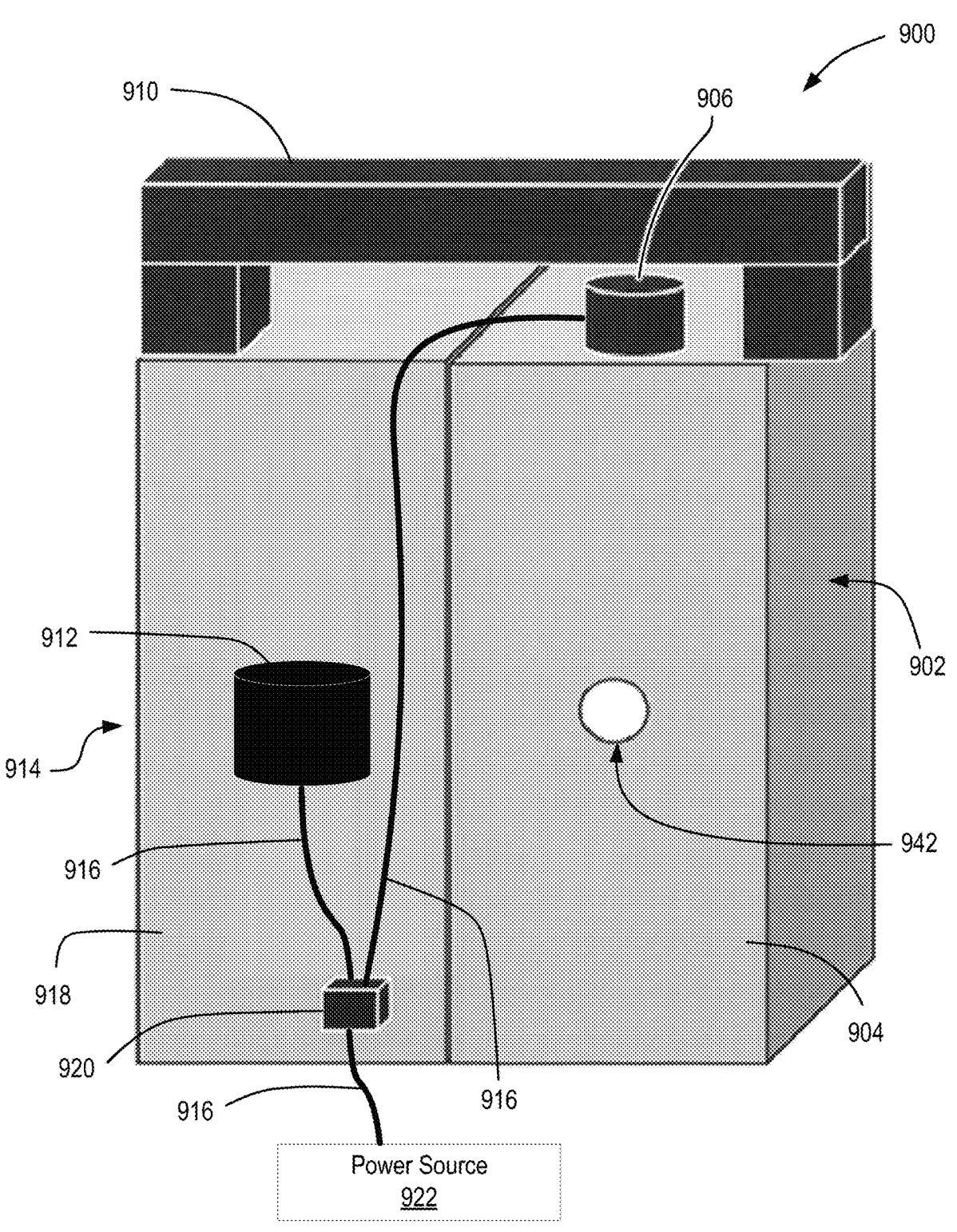
FIG. 31 is a schematic view illustrating a birdhouse having a wiring chamber and a nest chamber, in accordance with an exemplary embodiment.

FIGS. 30-31 illustrate different embodiments of bird-houses where additional lighting is provided. In FIG. 30, the birdhouse 800 includes a light panel 820 and an electrically powered light source 812 that is optically connected to the nest chamber 814. The illustrated birdhouse 800 can include a housing that includes means of illuminating the interior of the nest chamber 814 beyond the light which enters through the portal 842 formed within the front wall 802. For example, as shown in FIG. 30, the additional light can be provided by employing a translucent passive light panel 820 forming one or more vertical walls of the housing to allow the filtering of external light into the interior of the housing so as to illuminate the activities of birds in the nest chamber 814. The light panel 820 is positioned on sidewall 808, but the light panel 820 can be positioned at another location on the birdhouse 800, a different number of light panels can be provided, and the light panel 820 can be provided with a different shape and/or size. Additionally or alternatively, as shown in FIG. 30, the birdhouse 800 can employ a light source 812 that is optically coupled to the nest chamber 814 so as to provide additional light thereto. The light source 812 can be remote controlled or can be coupled to a suitable sensor so as to only provide light during daylight hours, thus ensuring that the nest chamber 814 is kept dark at night and does not disturb the natural sleeping pattern of birds in the nest chamber 814. The birdhouse 800 also includes a camera 810, which can be connected via connectors 818 (e.g., cable(s)) to send and receive information, to obtain power, etc. The light source 812 can be connected via connectors 816 (e.g., cable(s)) to send and receive information, to obtain power, etc. The additional lighting can enable the camera 810 to obtain higher quality images and video footage of the internal contents of the nest chamber 814.

The birdhouse 800 illustrated within FIG. 30 can be less disruptive/disturbing to birds nesting within the birdhouse 800 compared with designs which have large plexiglass panels, which can constitute placements on windows of houses, or otherwise have moveable elements which encourage physically "peeking in" on the birds. Further, the fixed/sealed nature of the birdhouse 800 prevents water intrusion in the nest chamber that would otherwise occur through structural "peep holes." In some embodiments, the light source 812 and the camera 810 can be positioned on a camera platform above the nest chamber 814, with the light source 812 and the camera 810 positioned directly above holes within the camera platform. This can enable the light source 812 to supply light into the nest chamber 814, and this can enable the camera to obtain images and video footage of the internal volume within the nest chamber 814. The camera 810 and the light source 812 can be removable, accessible, changeable, etc.

Some birdhouses can also mount the electrical wiring and associated electrical components, including the camera and light source, in a vertically extending chamber adjacent to the nest chamber, as shown for example in FIG. 31. In FIG. 31, the birdhouse 900 includes a nest chamber 902 and a separate wiring chamber 914 positioned to the side of the nest chamber 902. In this embodiment, the wiring chamber 914 is disposed to the side of the nest chamber 902, such that both the wiring chamber 914 and the nest chamber 902 share a common roof 910 (which can optionally be similar to other top walls or apexed roofs described herein). The cameras 906, 912 can be coupled to an external power source 922 that can come up through the base of the wiring chamber 914 and feed an external camera 912 located on the front wall of the wiring chamber 914. Connection devices 920 can be used to connect, split, direct, etc. the power from the power source. Connectors 916 (e.g., cables, wires, or other similar elements) can also be configured to connect the cameras 906, 912 to the power source 922 and to other components so that power can be obtained at the cameras 906, 912, so that data can be shared, etc., and these connectors 920 can be routed through the wiring chamber 914 to limit exposure of the connectors 920 to the external environment and to birds within the nest chamber 902. The connectors 920 and other similar connectors and electrical components can be positioned in the wiring chamber 914 and protected from the external environment. The front wall 918 of the wiring chamber 914 can be a removable panel to provide access to the wiring chamber 914 and allow attachment of one or more camera body styles to the front wall 918. In another embodiment, the wiring chamber 914 can be accessed via a removable panel or door positioned elsewhere on the wiring chamber 914. The nest chamber 902 can also have a front wall 904 that can serve as a door that can be opened, and the front wall 904 defines a portal 942 that can function similarly to other portals described herein.

The power source 922 can also feed the camera 906 located above the nest chamber 902 via a wire running up and over the adjacent wall of the nest chamber 902. The power source 922 can be positioned in the wiring compartment in some embodiments.

The placement of the wiring chamber 914 to the side of the nest chamber 902 can facilitate easier wiring of the cameras 906, 912 so that wires are more easily accessible, so that wires are fully enclosed for the safety of the birds and the equipment, and so that wires do not need to run through the nest chamber 902. For example, in one embodiment, the front wall 918 of the wiring chamber 914 can constitute an access panel to the wiring chamber 914, the wiring chamber 914 can serve as host to an externally mounted camera for viewing activity at a portal 942 for the nest chamber 902, and the wiring chamber 914 can allow easy attachment/detachment and wiring of the externally mounted camera. This side wiring compartment design facilitates changing out any or all electrical components (including, but not limited to, all wires, transformers, cameras) of the birdhouse without having to disassemble any core structural elements of the birdhouse. Among other benefits, this makes it easy to start out with a birdhouse that has only an internal camera and then an external camera can be added later by simply accessing the wiring chamber 914.

Figure 32:
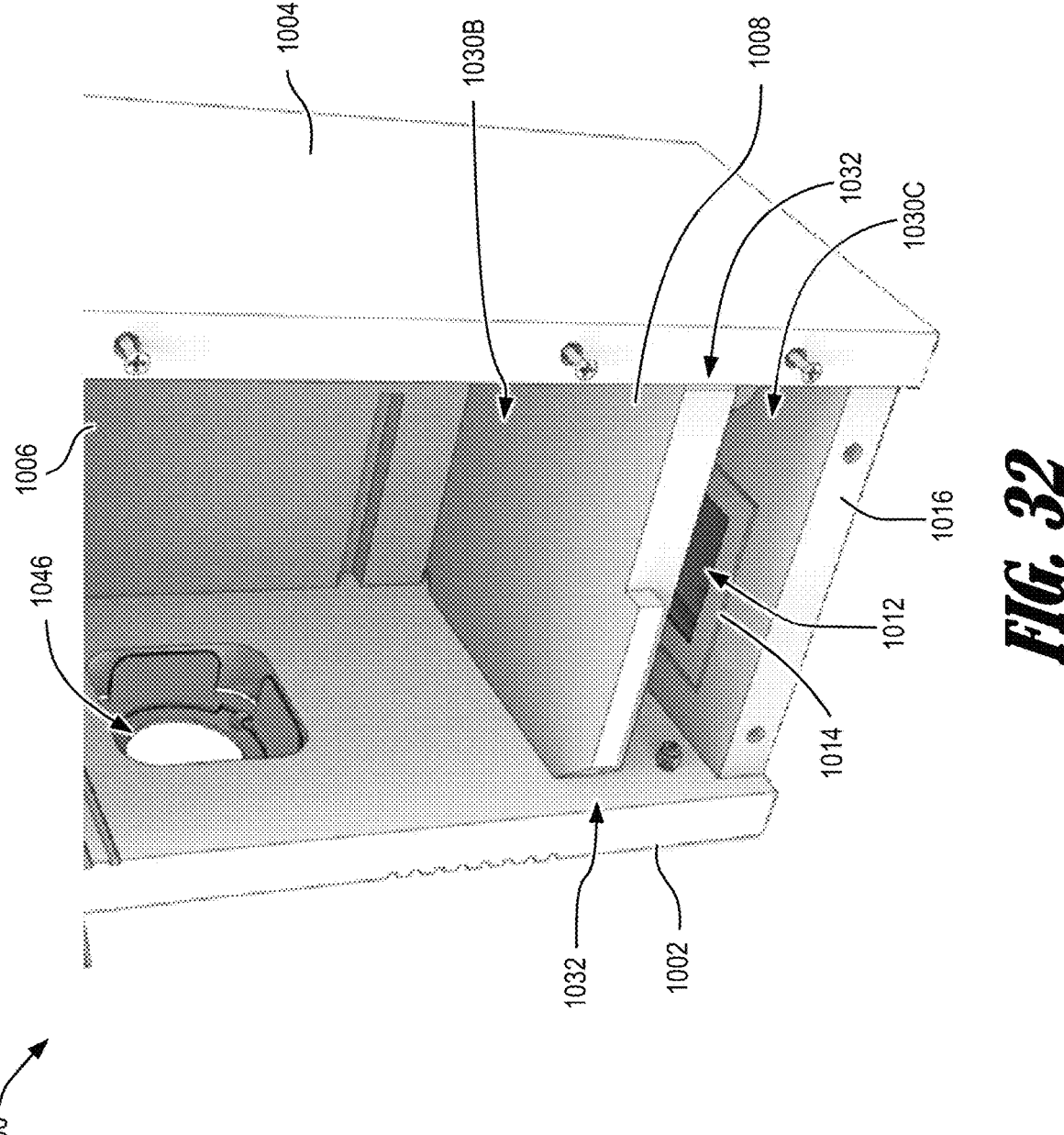
FIG. 32 is a perspective view illustrating another example birdhouse where a right-side wall is hidden so that the interior of the birdhouse can be seen in accordance with an exemplary embodiment.
Figure 33:
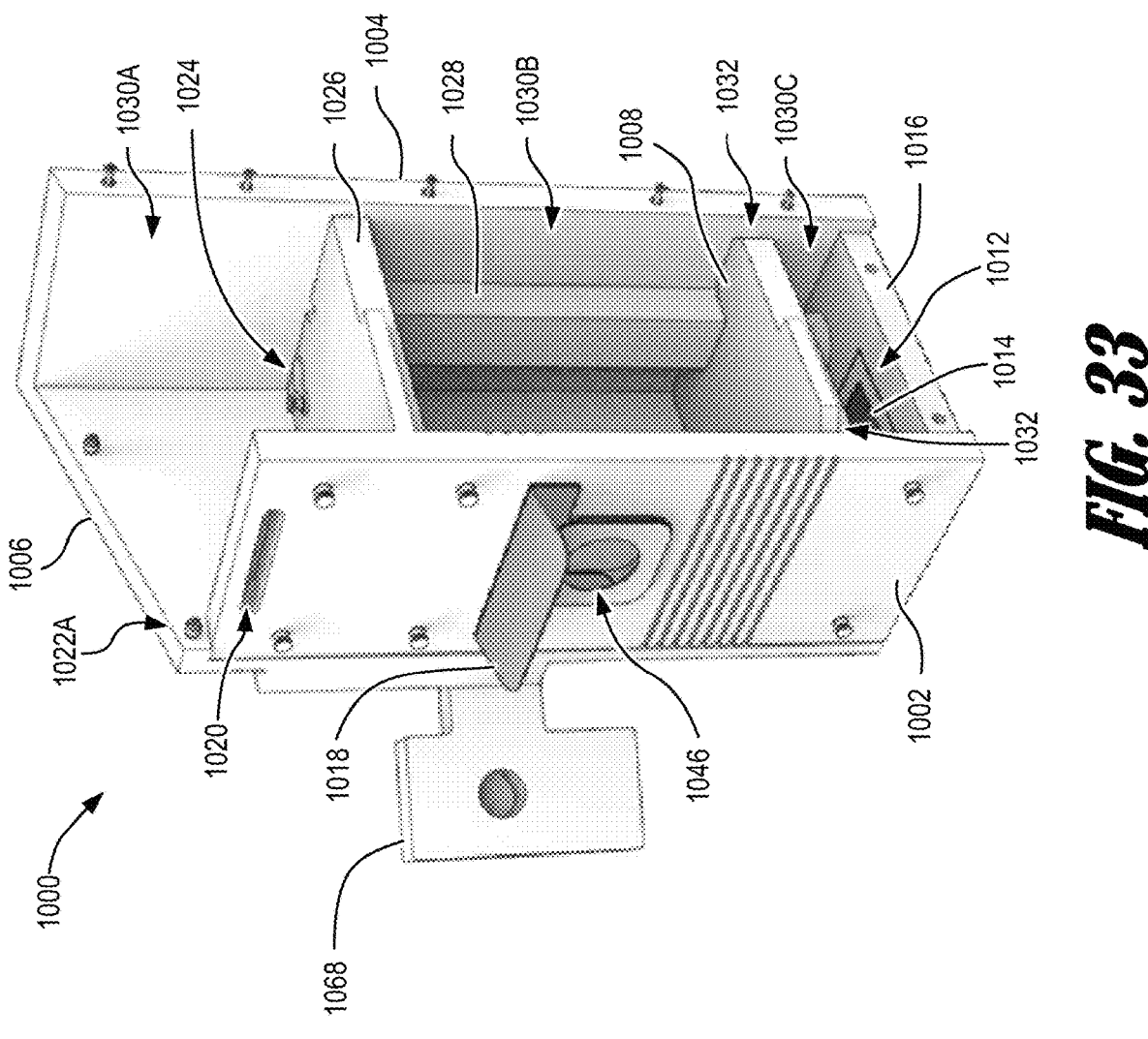
FIG. 33 is a perspective view illustrating the birdhouse of FIG. 32 where the right-side wall is hidden so that the interior of the birdhouse can be seen in accordance with an exemplary embodiment.

FIG. 32 is a perspective view illustrating another example birdhouse 1000 where a right-side wall is hidden so that the interior of the birdhouse 1000 can be seen, and FIG. 33 is a perspective view illustrating the birdhouse 1000 of FIG. 32 where the right-side wall is hidden so that the interior of the birdhouse 1000 can be seen. The birdhouse 1000 is similar to the other birdhouses described herein in many respects. The birdhouse 1000 comprises a front wall 1002, a rear wall 1004, a left-side wall 1006, a portal assembly 1018, and a portal 1046, and each of these features can generally be similar to other corresponding components described herein.

The front wall 1002 can be designed to be compressed from the sides in some embodiments by the left-side wall 1006 and the right side wall (not shown), and this can be beneficial to prevent water intrusion. In some embodiments, an effective seal can be formed as a result of this compression, and compressive sealing material can be used such as a rubber material to help form an effective seal.

The birdhouse 1000 can include different chambers that are configured to be used for different purposes. For example, the birdhouse 1000 can include a wiring chamber 1030A, a nest chamber 1030B, and a lower chamber 1030C. A camera platform 1026 can be positioned between the wiring chamber 1030A and the nest chamber 1030B to separate these two chambers. A chamber floor 1008 is positioned between the nest chamber 1030B and the bottom chamber 1030C to separate these two chambers. In some embodiments, the camera platform 1026, the chamber floor 1008, and other similar components described herein can be easily removed if desired, thereby allowing a larger nest chamber to be provided and allowing maintenance, cleaning, etc. to be performed more easily.

Including a wiring chamber 1030A separate from the nest chamber 1030B can be beneficial to allow cameras and other components to be adjusted from within the wiring chamber 1030A without disturbing any birds in the nest chamber 1030B. For example, the separate wiring chamber 1030A can offer the ability to access, maintain, and/or troubleshoot electrical component(s) and the interior camera without interfering with any birds in the nest chamber 1030B. The wiring chamber 1030A and other wiring chambers described herein can provide a unique space which can accommodate various wiring configurations such as solar panel connections, AC wiring, supplemental battery connections, etc.

The birdhouse 1000 also includes an external camera support 1068, which can be configured to receive an external camera for attachment. As stated elsewhere herein, the external camera support 1068 can be rotated about a hinge in some embodiments and/or the external camera support 1068 can be moved up, down, or laterally to enable different types of cameras to be effectively attached to the external camera support 1068. Having an external camera whose attachment and wiring is external to the nest chamber 1030B offers the ability to access, maintain, and/or troubleshoot the external camera and associated wiring without disturbing the nest of birds located inside the nest chamber 1030B.

The bottom chamber 1030C can be included to help control airflow within the birdhouse 1000. Within the bottom chamber 1030C, a screen panel 1014 can be provided within the bottom panel 1016, and the bottom panel 1016 can include a mesh area 1012. The mesh area 1012 can be configured to allow air to flow through the mesh area 1012 while effectively filtering larger particles, objects, or creatures from passing through. The screen panel 1014 can allow air to flow through the mesh area 1012 so that this air can circulate through the birdhouse 1000. The chamber floor 1008 includes beveled corners 1032 which can allow the air to move through the bottom chamber 1030C to the nesting chamber 1030B. In some embodiments, the chamber floor 1008 can be removable from the birdhouse 1000 so that the chamber floor 1008 can be easily cleaned or so that maintenance can be performed on the chamber floor 1008.

The inclusion of a bottom chamber 1030C that is separate from the nest chamber 1030B can be beneficial to allow adjustments to be made in the bottom chamber 1030C without interfering with any birds located in the nest chamber 1030B. For example, the screen panel 1014 can be removed and replaced with a different screen panel so that the amount of airflow can be changed so that the mesh area 1012 can be selected that better filters out certain particles.

Alternatively, the screen panel 1014 can be replaced by or blocked by a solid panel to optionally restrict the flow of air through the birdhouse 1000. When a birdhouse 1000 is used by birds for roosting to protect themselves from inclement weather, and particularly cold temperatures, preventing airflow up through the birdhouse 1000 can be beneficial to enhance the safety of the birds to so that heat can be trapped inside the birdhouse 1000 and within the nest chamber 1030B. In some embodiments, the solid panel can be swiveled or slid so that it covers the screen panel 1014 to effectively prevent the flow of air through the mesh area 1012.

Thus, during periods of extreme heat, the birdhouse 1000 can be adjusted to allow air to flow up from the bottom of the birdhouse 1000 and up through the top of the birdhouse 1000 to keep the interior of the nesting chamber 1030B cooler. Additionally, during periods of extreme cold, the birdhouse 1000 can be adjusted to minimize air flow through the birdhouse 1000, allowing the area inside the nest chamber 1030B to retain as much heat as possible for the protection of the birds. Where a liner box is received within the nesting chamber 1030B, the air can be configured to flow through the nesting chamber 1030B and around the exterior of the liner box to keep the nesting chamber and the internal volume within the liner box at the desired temperature.

As illustrated in FIG. 33, the camera platform 1026 includes an airflow port 1024, which can optionally be covered and uncovered in some embodiments. The airflow port 1024 can allow air to flow from the nest chamber 1030B to the wiring chamber 1030A, and the air within the wiring chamber 1030A can be allowed to flow out of the wiring chamber 1030A through the opening 1020 in some embodiments. While the opening 1020 is illustrated on the front wall 1002, the opening 1020 can alternatively be positioned on the rear wall 1004 or at another location. In some embodiments, the opening 1020 can be positioned at a higher location to enable warmer air to exit the birdhouse 1000 without getting trapped at elevated locations within the wiring chamber 1030A. The ability of the birdhouse 1000 to allow air to easily flow through the birdhouse 1000 can be beneficial to control the heat within the birdhouse. However, in some embodiments, the amount of airflow within the birdhouse 1000 can be limited to help maintain the chambers 1030A, 1030B, 1030C at a certain temperature.

As illustrated in FIG. 33, a channel wall 1028 can be attached within the nest chamber 1030B. The channel wall 1028 is attached to the rear wall 1004, but the channel wall 1028 can be attached at other locations. When the channel wall 1028 is attached to the rear wall 1004, the channel wall 1028 and the rear wall 1004 can effectively form a channel that allows wires, cables, etc. to extend from the wiring chamber 1030A to the bottom chamber 1030C without exposing these wires, cables, etc. within the nest chamber 1030B. This can beneficially protect the wires, cables, etc.

from the birds, and this can also beneficially protect the birds from the wires, cables, etc. In some embodiments, a fan may be added to the wiring chamber 1030A or to another location within the birdhouse 1000 in order to increase airflow.

Figure 35:
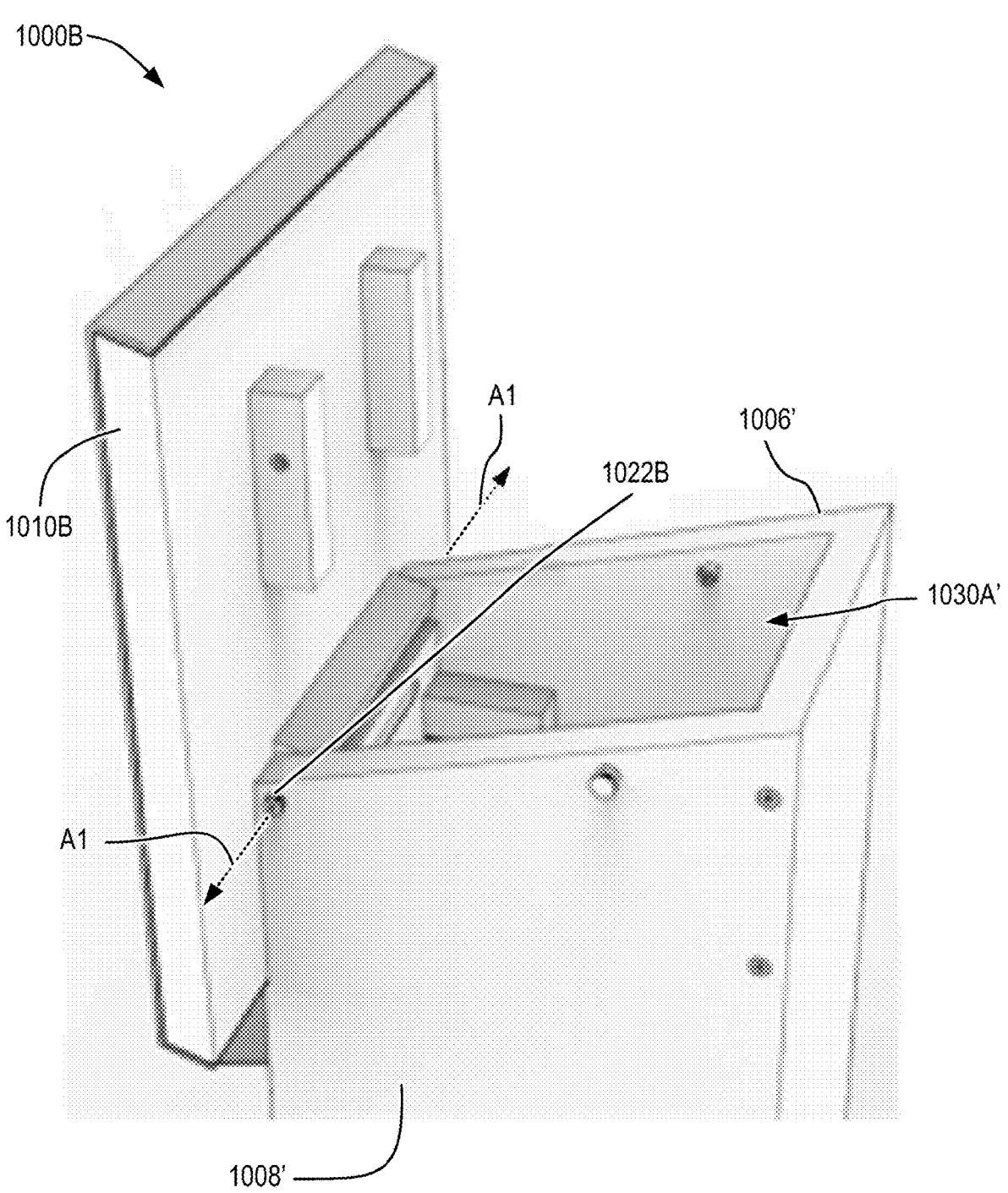
FIG. 35 is a perspective view illustrating another birdhouse where the roof is rotated about an axis to an opened position in accordance with an exemplary embodiment.

The birdhouse 1000 also includes a front peg 1022A positioned adjacent to the top end of the front wall 1002. Only one front peg 1022A is illustrated that is attached to the left side wall 1006, but an additional front peg 1022B (see FIG. 35) can be positioned adjacent to the top end of the front wall 1022, with this additional front peg 1022B attached to the right side wall 1008 (see FIG. 35). The front pegs 1022A can be provided in the form of thumbscrews in some embodiments. The front pegs 1022A, 1022B can be configured to be received within a hole of a top wall 1010B so that the top wall 1010B can rotate about an axis A1 defined by the front pegs 1022A, 1022B as illustrated in FIG. 35.

Figure 34:
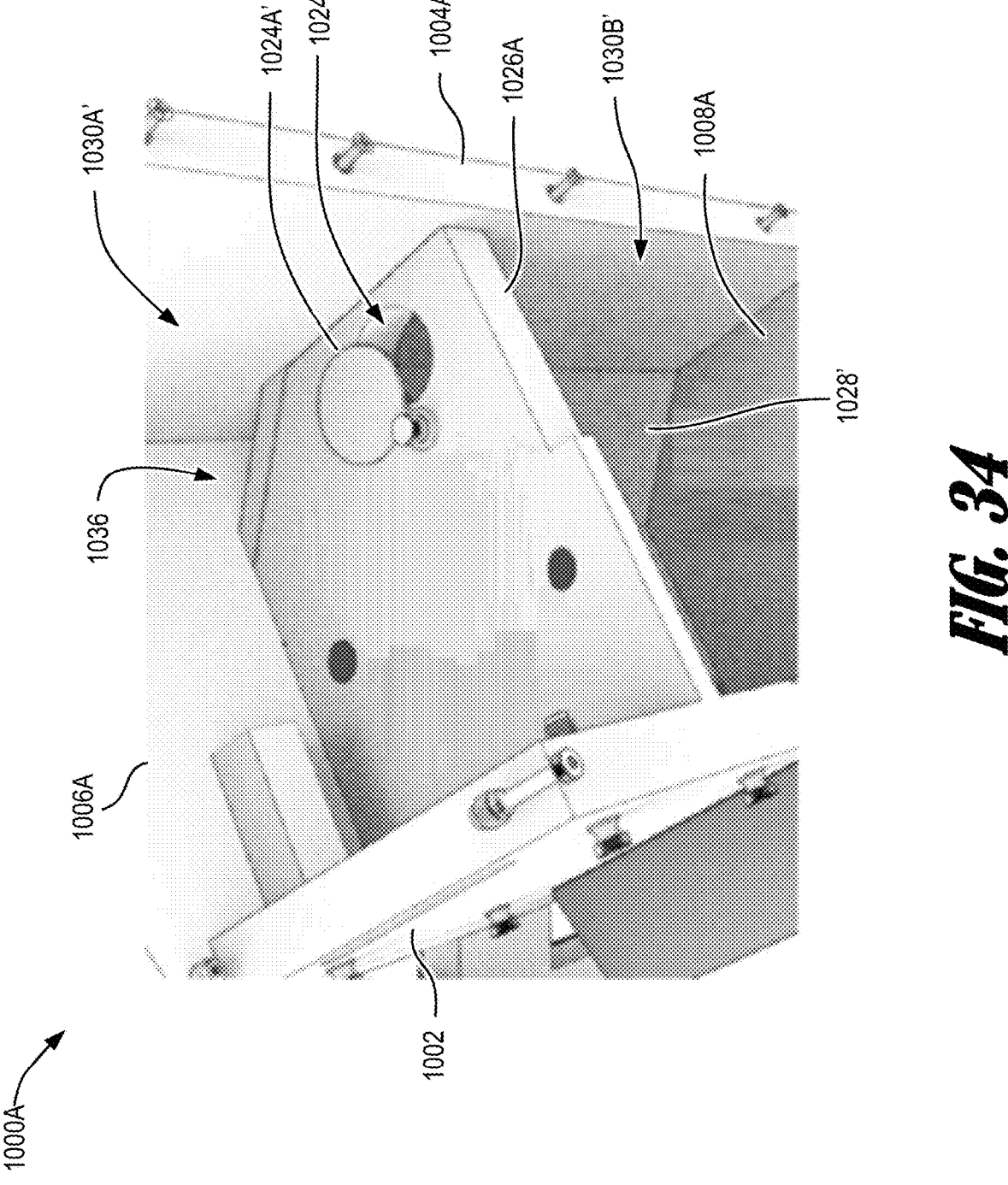
FIG. 34 is an enhanced, perspective view illustrating a camera platform of the birdhouse of FIG. 32 with a camera positioned on the camera platform in accordance with an exemplary embodiment.

FIG. 34 is an enhanced, perspective view illustrating a camera platform 1026A of a birdhouse 1000A. The birdhouse 1000A is similar in most respects to the birdhouse 1000 described herein. The birdhouse 1000A comprises a rear wall 1004A, a left side wall 1006A, and a right side wall 1008A, with each of these components being similar to corresponding components described in reference to FIG. 33 and other figures.

However, the birdhouse 1000A does have some differences relative to the birdhouse 1000. For example, the birdhouse 1000A comprises a camera platform 1026A with an opening 1036 defined at one corner proximate to the back left corner of the birdhouse 1000A. The opening 1036 can be configured to allow cables, wires, etc. to extend from the wiring chamber 1030A' into a channel defined by the channel wall 1028' so that the cables, wires, etc. can extend to the bottom chamber (not shown) and/or to a hole at the bottom of the birdhouse 1000A. The channel wall 1028' can be positioned at a back left corner of the birdhouse 1000A within the nest chamber 1030B'.

An airflow port 1024' is defined at the camera platform 1026A, and an airflow port cover 1024A' can be positioned at the camera platform 1026A to selectively cover the airflow port 1024'. The airflow port cover 1024A' can be configured to be moved between an open position and a closed position. In the open position, the airflow port cover 1024A' does not cover the airflow port 1024', so air can be allowed to flow between the nest chamber 1030B' and the wiring chamber 1030A'. In the closed position, the airflow port cover 1024A' blocks the airflow port 1024', so air is restricted at least partially from flowing between the nest chamber 1030B' and the wiring chamber 1030A'.

In FIG. 35, another example birdhouse 1000B is illustrated. The birdhouse 1000B can enable the wiring chamber 1030A' to be accessed by rotating the top wall 1010B about an axis A1, thereby permit maintenance of electrical components within the wiring chamber 1030A' to be completed. The top wall 1010B can rotate about front peg 1022A (see FIG. 33) attached at the left side wall 1006' and front peg 1022B attached at the right side wall 1008'.

Figure 36:
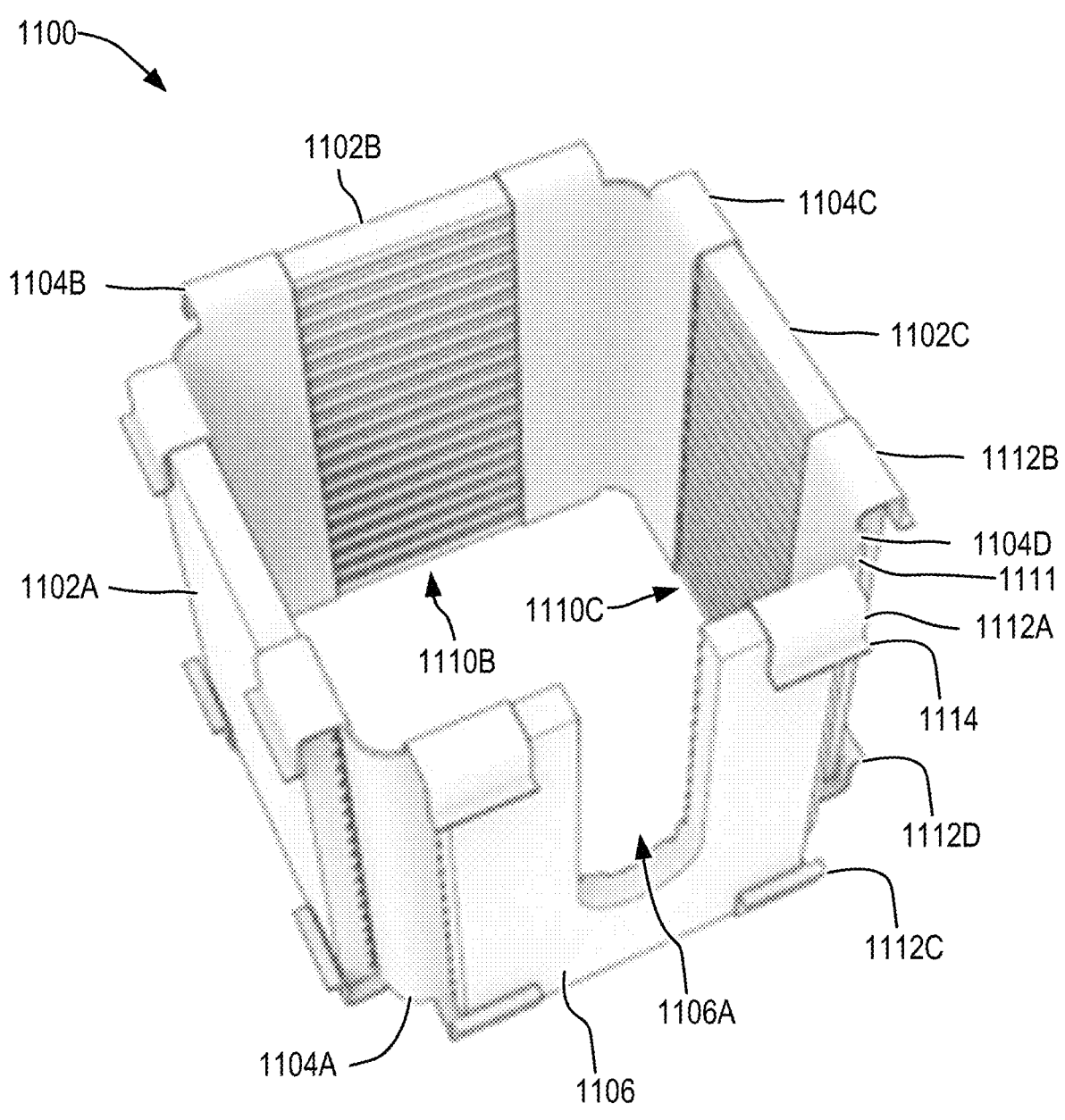
FIGS. 36 and 37 are varying perspective views illustrating a liner box that can be inserted into one or more of the chambers in accordance with an exemplary embodiment.
Figure 37:
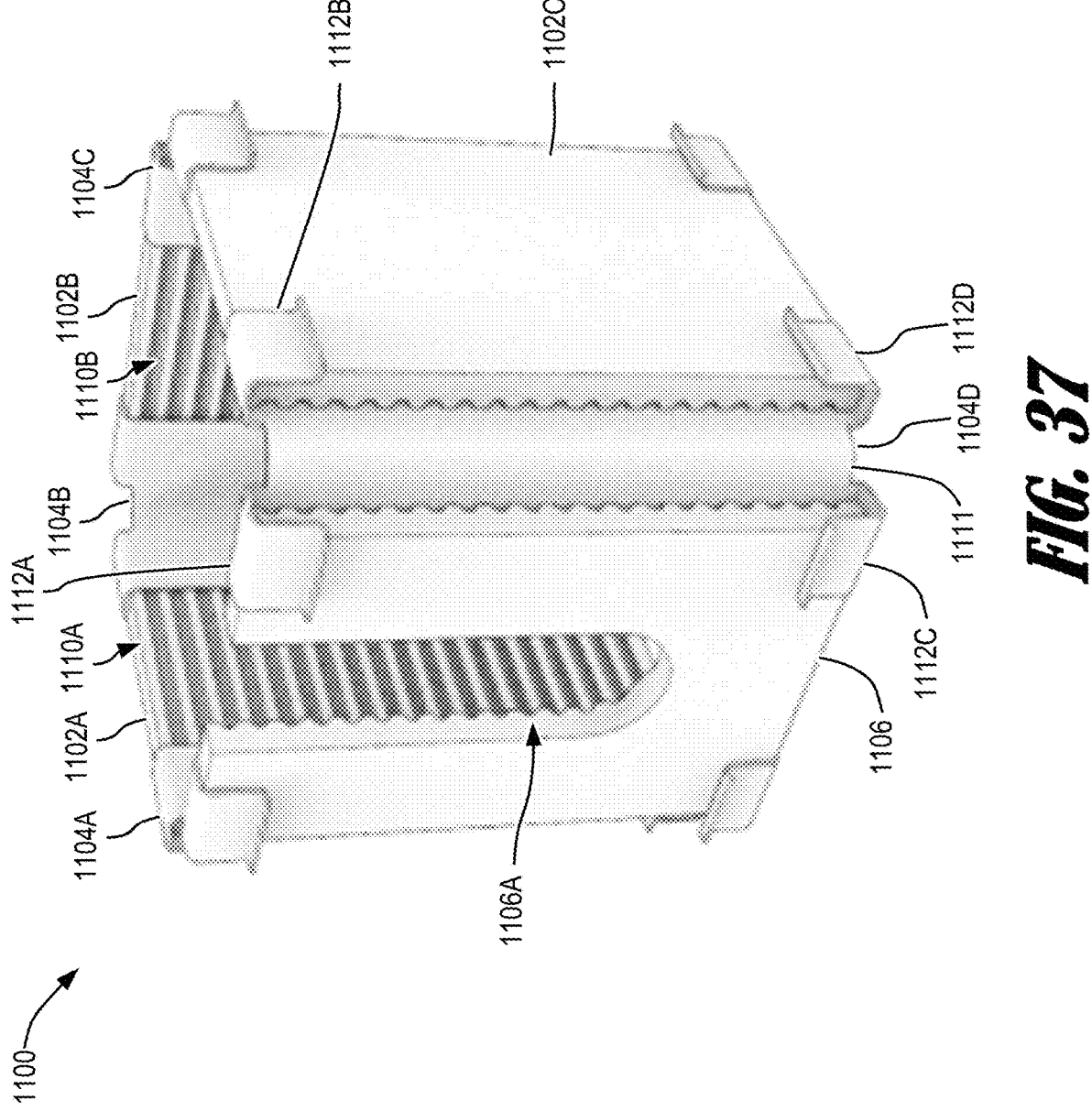
Figure 38:
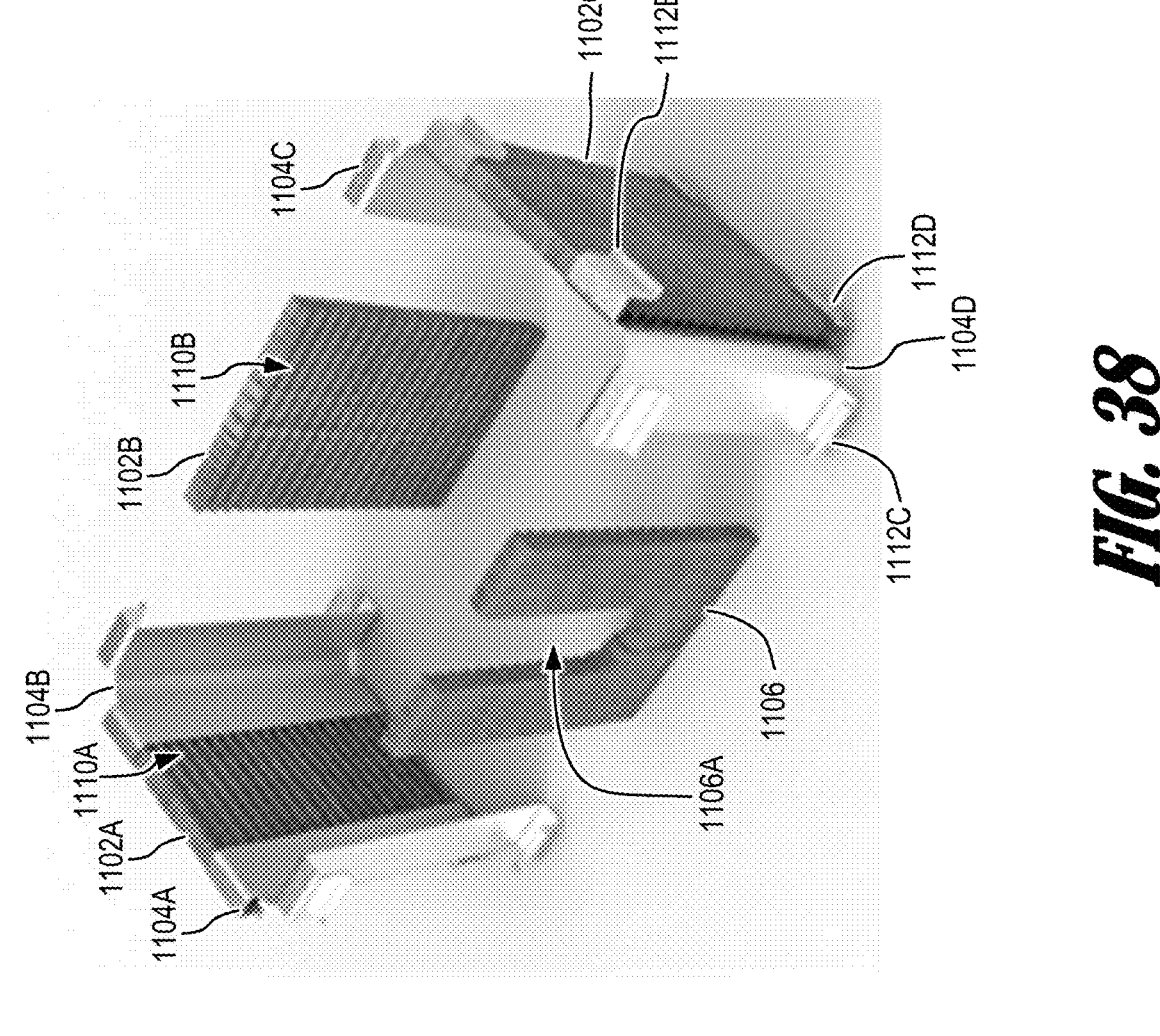
FIG. 38 is an exploded view illustrating the liner box of FIG. 36 in accordance with an exemplary embodiment.

FIGS. 36 and 37 are varying perspective views illustrating a liner box 1100 that can be inserted into one or more of the chambers described herein, and FIG. 38 is an exploded view illustrating the liner box 1100. The liner box 1100 can be configured so that the size of the liner box 1100 can be increased or decreased to fit within the overall dimensions of the birdhouse. However, in other embodiments, the liner boxes can possess a fixed size and can be designed to conform to the exact dimensions of a particular birdhouse. The liner box 1100 can also be configured to be easily assembled and disassembled to allow for maintenance and cleaning to be easily performed.

The liner box 1100 comprises various components, including corner support members 1104A, 1104B, 1104C, 1104D. The liner box 1100 also includes a left-side liner panel 1102A, a rear liner panel 1102B, a right-side liner panel 1102C, and a front liner panel 1106. Each of the corner support members 1104A-1104D can be similar to the corner support member 1104D. Corner support member 1104D comprises a first top bracket 1112A, a second top bracket 1112B, a first bottom bracket 1112C, and a second bottom bracket 1112D. Each of these brackets are attached to a body 1111, which can bend about 90 degrees as illustrated in FIGS. 36 and 37. Each bracket can define slots therein that are configured to receive a portion of a respective liner panel, and the slots defined by the brackets can enable the liner panels to slide so that the size of the liner box 1100 can be increased or decreased. However, other than allowing the liner panels to slide, the brackets can prevent movement of the liner panels in other directions. The corner support members 1104A-1104D can be configured to overlay the interior sides of the liner panels so that no gaps are present around the interior perimeter of the liner panels other than the front opening 1106A. Each of the brackets can optionally include extended portions extending outwardly from the body of the corner support members. For example, the first top bracket 1112A on the corner support member 1104D comprises an extended portion 1114 that extends outwardly from the body of the corner support member 1104D. The extended portion 1114 can act as a spacer that separates the exterior wall of the front liner panel from internal walls of a birdhouse. This can allow air to flow up around the perimeter of the liner box 1100. In some embodiments, the extended portion 1114 can still be made with a relatively small size that allows air to flow up around the perimeter while still being small enough to prevent small birds or baby birds from falling and/or getting stuck within the gaps between the liner box 1100 and the interior walls of the birdhouse.

The liner panels 1102A-1102C are identical to each other in the embodiment illustrated in FIG. 36. Each of the liner panels 1102A-1102C generally extend in a single plane, but the liner panels 1102A-1102C also has grooves defined in the inside surfaces of the liner panels 1102A-1102C. For example, the left-side liner panel 1102A has grooves at its internal side 1110A, the rear liner panel 1102B has grooves at its internal side 1110B, and the right-side liner panel 1102C has grooves at its internal side 1110C. By contrast, external sides can be made without grooves. Thus, in some embodiments, the liner panels 1102A-1102C can be flipped so that the grooved sides face outwardly and the so that the smooth sides are used as internal faces for the liner panels 1102A-1102C. The front liner panel 1106 includes a front opening 1106A while the liner panels 1102A-1102C do not, but the front liner panel 1106 is otherwise identical to the liner panels 1102A-1102C. The grooves can be beneficial to enable birds to grip onto the grooves while roosting within a liner box 1100. Similar grooves can be positioned on other liner boxes and on the internal walls of a birdhouse at a nesting chamber in other embodiments.

Figure 39:
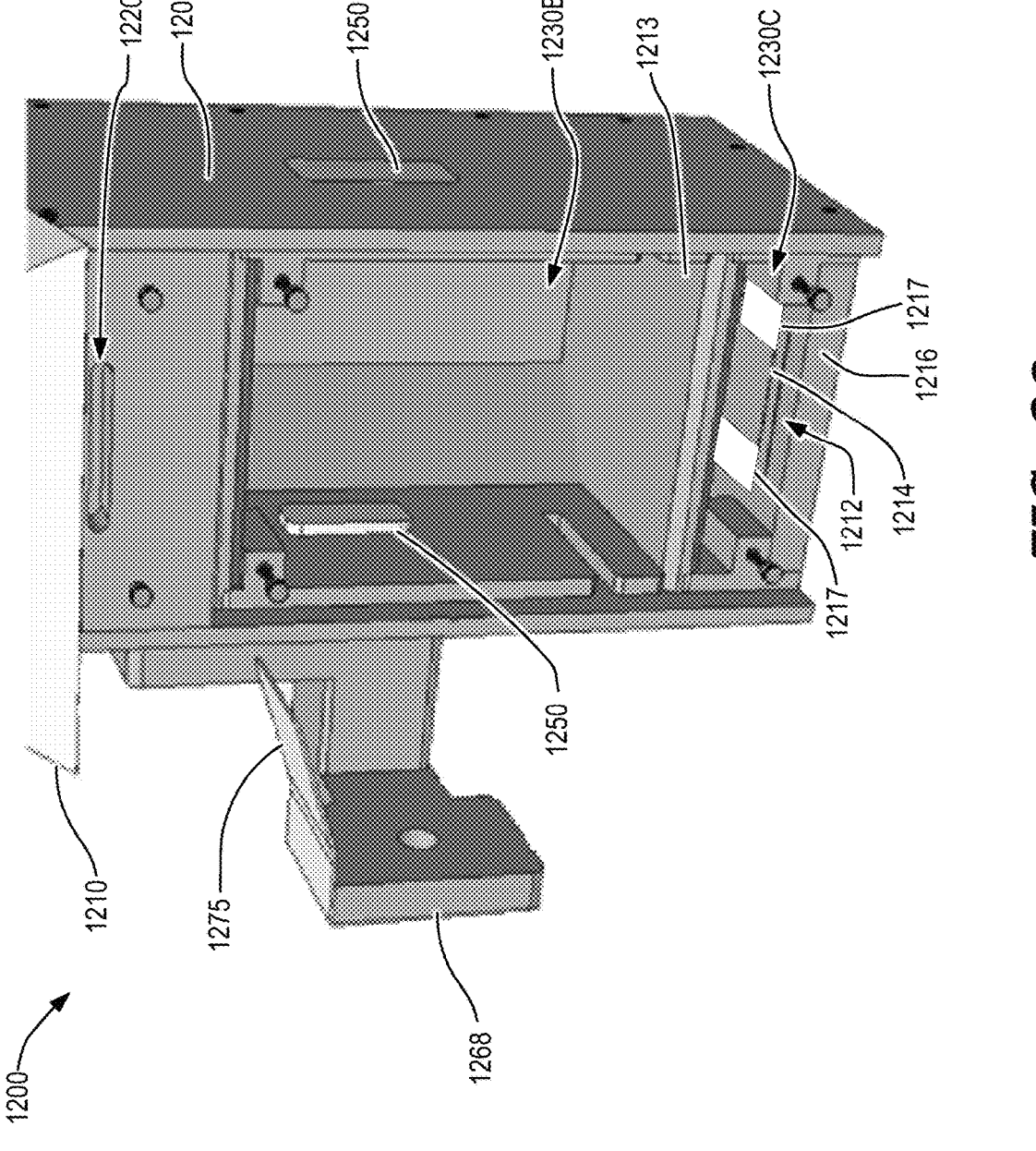
FIG. 39 is a perspective view illustrating another example birdhouse where a front wall is hidden so that a nesting chamber is visible in accordance with an exemplary embodiment.

FIG. 39 is a perspective view illustrating another example birdhouse 1200 where a front wall is hidden so that a nesting chamber 1230B is visible. In the birdhouse 1200 of FIG. 39, the birdhouse 1200 includes an external camera roof 1275 that is attached to the external camera platform 1268. Without the external camera roof 1275, cameras located outside of a birdhouse can be exposed to rainwater or other precipitation, which can lead to a degradation of the video quality or image quality of the cameras. The external camera roof 1275 can be beneficial to protect an external camera 1292 (see FIG. 42) positioned on the external camera platform 1268 from this rainwater, precipitation, or other material to avoid a degradation of the video/image quality and to avoid exposing the camera to excessive amounts of precipitation. The external camera roof 1275 can be configured to divert precipitation away from the camera lens, preserving a clean, unaltered view from the camera lens. The external camera roof 1275 can be sloped to divert the precipitation away as desired. The external camera roof 1275 can be assembled to the external camera roof 1275 so that the external camera roof 1275 does not interfere with the camera's view of the portal 1246 (see FIG. 41) when the front wall 1202 (see FIG. 41) is attached.

Figure 40:
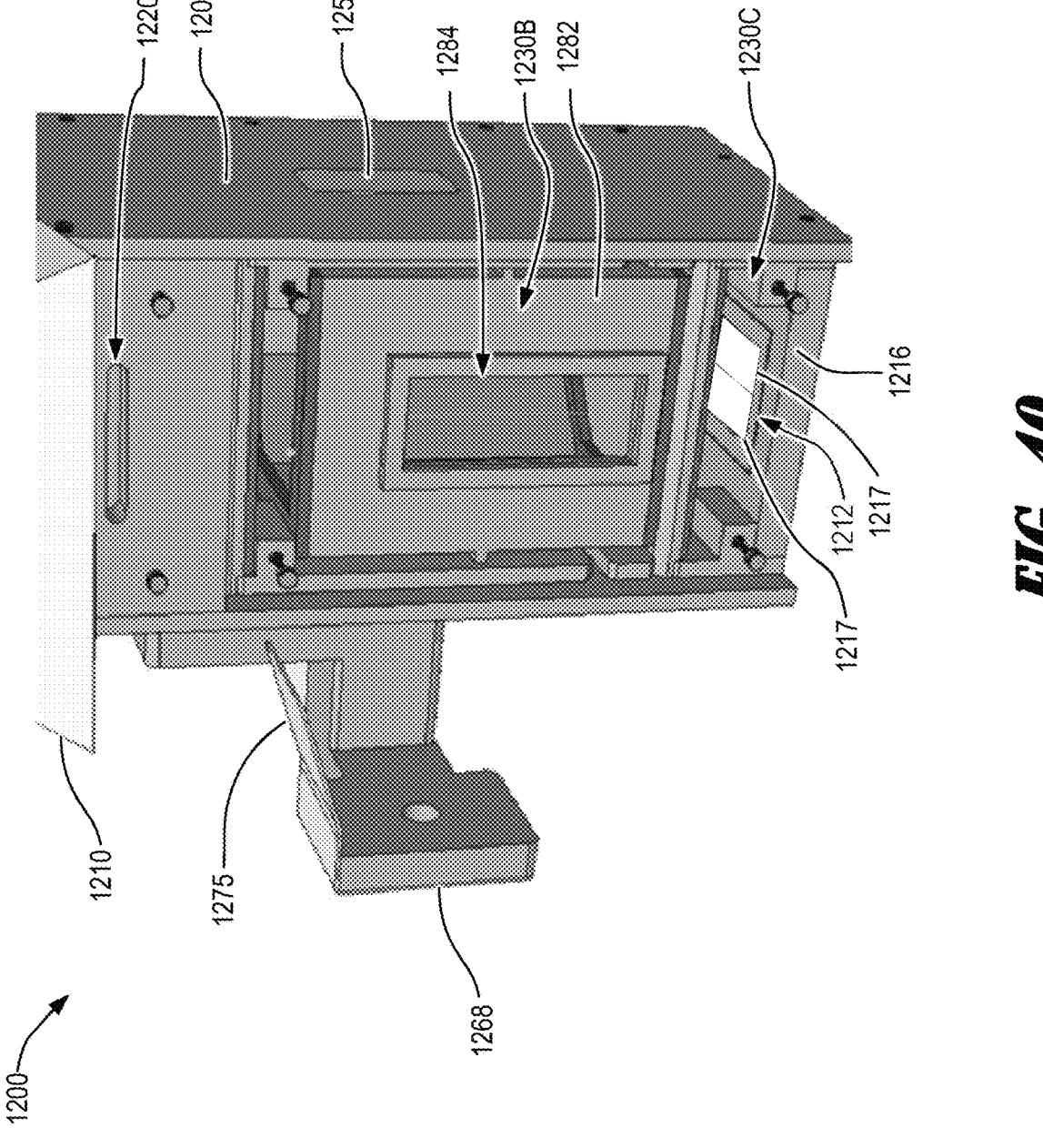
FIG. 40 is a perspective view illustrating the birdhouse of FIG. 39 where a liner box is positioned within the nesting chamber in accordance with an exemplary embodiment.

The birdhouse 1200 comprises a nest chamber 1230B, a wiring chamber above the nest chamber 1230B, and a bottom chamber 1230C. The wiring chamber can be separated from the nest chamber 1230B by a camera platform, and the nest chamber 1230B can be separated from the bottom chamber 1230C by a nest chamber floor 1213. Opening 1220 is illustrated in FIGS. 39 and 40, and the opening 1220 can be configured to provide ventilation of any air from within the wiring chamber. The opening 1220 can be covered by a mesh cover to generally prevent insects, precipitation, and other material from entering into the opening 1220.

In some embodiments, the nest chamber floor 1213 can be removable from the birdhouse 1200 so that the nest chamber floor 1213 can be easily cleaned or so that maintenance can be performed on the nest chamber floor 1213. The nest chamber floor 1213 and other portions of the birdhouse 1200 can also be configured to provide insulation to help insulate the nest chamber 1230B from high or low temperatures outside of the birdhouse.

Within the bottom chamber 1230C, a screen panel 1214 can be provided within the bottom panel 1216, and the bottom panel 1216 can include a mesh area 1212. The screen panel 1214 and the mesh area 1212 can generally operate the same as the corresponding components described herein in reference to FIGS. 32 and 33.

The inclusion of a bottom chamber 1230C that is separate from the nest chamber 1230B can be beneficial to allow adjustments to be made in the bottom chamber 1030C without interfering with any birds located in the nest chamber 1230B. For example, the screen panel 1214 can be removed and replaced with a different screen panel so that the amount of airflow can be changed and so that the mesh area 1212 can be selected that better filters out certain particles or insects.

In the embodiments illustrated in FIGS. 39 and 40, solid panels 1217 are provided that can be optionally moved to block the mesh area 1212, thereby restricting the flow of air through the birdhouse 1200. For example, FIG. 39 illustrates the solid panels 1217 slid to the sides of the mesh area 1212 so that the mesh area 1212 is unblocked, and FIG. 40 illustrates the solid panels 1217 slid to cover the mesh area 1212 so that the mesh area 1212 is blocked. When a birdhouse 1200 is used by birds for roosting to protect themselves from inclement weather and particularly cold temperatures, blocking the mesh area 1212 and preventing airflow up through the birdhouse 1200 can be beneficial to enhance the safety of the birds in so that heat can be trapped inside the birdhouse 1200 and within the nest chamber 1230B. While the solid panels 1217 are configured to slide in the embodiment illustrated in FIGS. 39 and 40, the solid panels 1217 can be swiveled in other embodiments so that the solid panels 1217 cover the screen panel 1214 to effectively prevent the flow of air through the mesh area 1212. Additionally, while solid panels 1217 are illustrated as being positioned inside of the birdhouse within the bottom chamber 1230C, the solid panels 1217 may be positioned outside of a birdhouse (e.g., below the bottom wall 1623 to selectively cover the holes 1624 of FIG. 53). The solid panels 1217 and/or the screen panel 1214 can be adjusted or replaced in the bottom chamber 1230C without disturbing birds or nests within the nest chamber. The mesh area 1212 and other mesh areas or mesh vents described herein can be configured to prevent insects and other material from entering the birdhouse.

The solid panels 1217 can generally be slid to a closed position to cover the mesh area 1212 when the birdhouse 1200 is being used in a roosting configuration, thereby restricting airflow through the birdhouse 1200 and keeping the internal portions of the birdhouse 1200 as warm as possible. Additionally, the solid panels 1217 can generally be slid to an opened position to leave the mesh area 1212 uncovered when the birdhouse 1200 is being used in a nesting configuration, thereby permitting airflow through the birdhouse 1200 and keeping the internal portions of the birdhouse 1200 as cool as possible. However, in some embodiments, the solid panels 1217 can be in a closed position when the birdhouse 1200 is used in a nesting configuration, and the solid panels 1217 can be in an open position when the birdhouse 1200 is used in a roosting configuration. For example, where it is determined that cold temperatures warrant an effort to temporarily minimize airflow up through the birdhouse structure while maintaining a nesting configuration (e.g., where a nest remains present in the birdhouse), the solid panels 1217 can be moved to a closed position.

Thus, during periods of extreme heat, the birdhouse 1200 can be adjusted to allow air to flow up from the bottom of the birdhouse 1200 and up through the top of the birdhouse 1200 to keep the interior of the nesting chamber 1230B cooler. Additionally, during periods of extreme cold, the birdhouse 1200 can be adjusted to minimize air flow through the birdhouse 1200, allowing the area inside the nest chamber 1230B to retain as much heat as possible for the protection of the birds. The right-side wall 1208 and the left-side wall can also have light windows 1250 assembled within the walls, and the light windows can be similar to other light windows described herein. The light windows 1250 can provide increased natural light to enter the nest chamber 1230B, allowing birdhouses to be provided without any internal lighting in some embodiments. While the light windows 1250 are illustrated as having a particular shape and size, the shape and size can be adjusted in other embodiments.

In FIG. 40, a liner box 1282 is positioned within a nest chamber 1230B. The liner box 1282 defines a front opening 1284. The front opening 1284 is positioned on the front wall for the liner box 1282, and the front opening 1284 does not extend all the way to the edge of the front wall unlike the front openings in other embodiments of liner boxes. Additionally, the front opening 1284 also includes a rectangular shape, but a wide variety of other shapes can be used in other embodiments.

Figure 41:
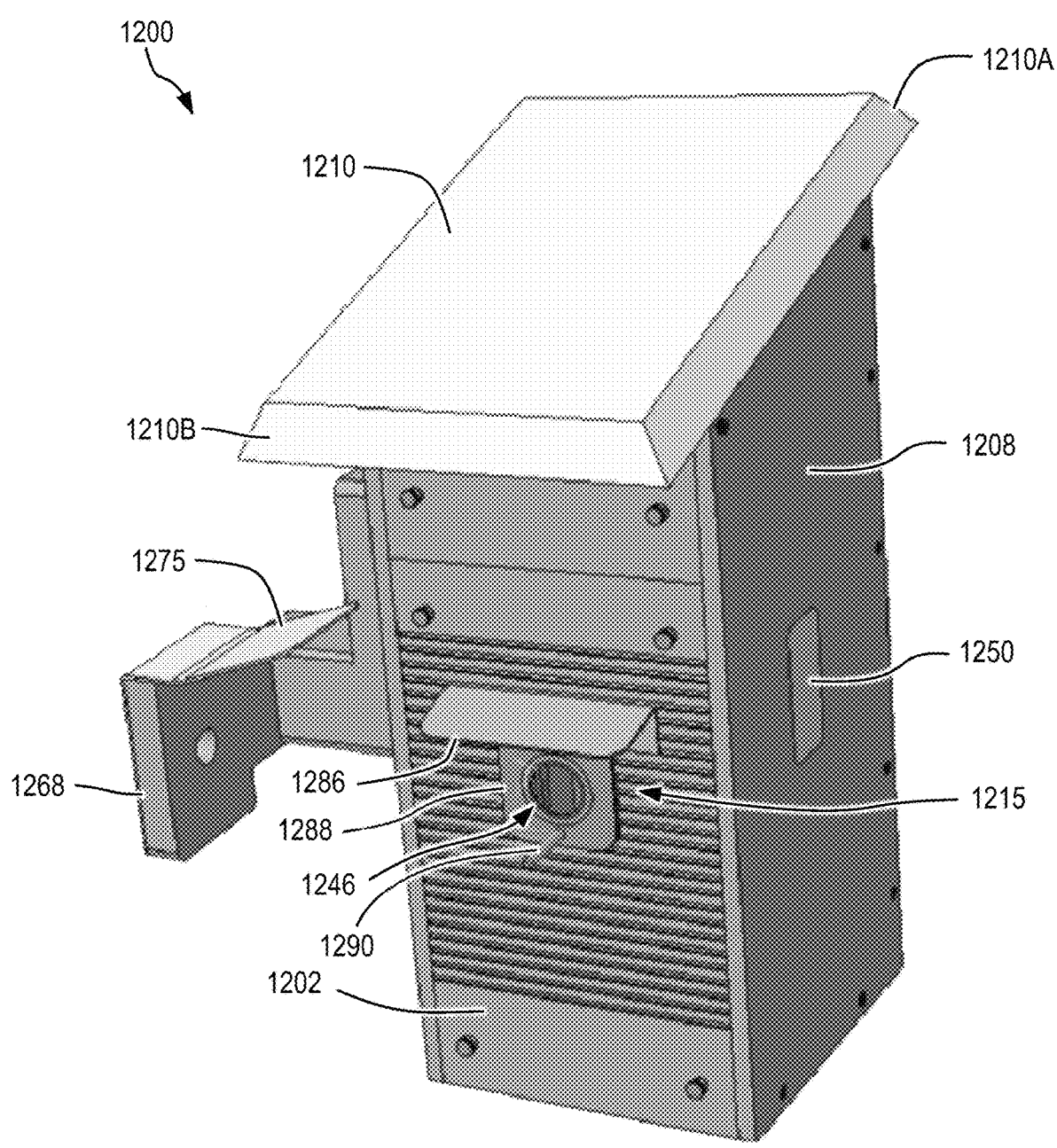
FIG. 41 is a perspective view illustrating the birdhouse of FIG. 39 where the front wall is shown in accordance with an exemplary embodiment.

The birdhouse 1200 also includes a right-side wall 1208 and a top wall 1210 that are visible in FIGS. 39-41. These components are similar to other corresponding components described herein. The top wall 1210 also comprises chamfered edges 1210A, 1210B, 1210C positioned at perimeter edges of the top wall 1210. The chamfered edges 1210A-1210C can extend beyond the front wall 1202, the right-side wall 1208, and the left-side wall (not shown) to cause any rainwater or other precipitation falling of the top wall 1210 to avoid coming in contact with the front wall 1202, the right-side wall 1208, and the left-side wall.

Figure 42:
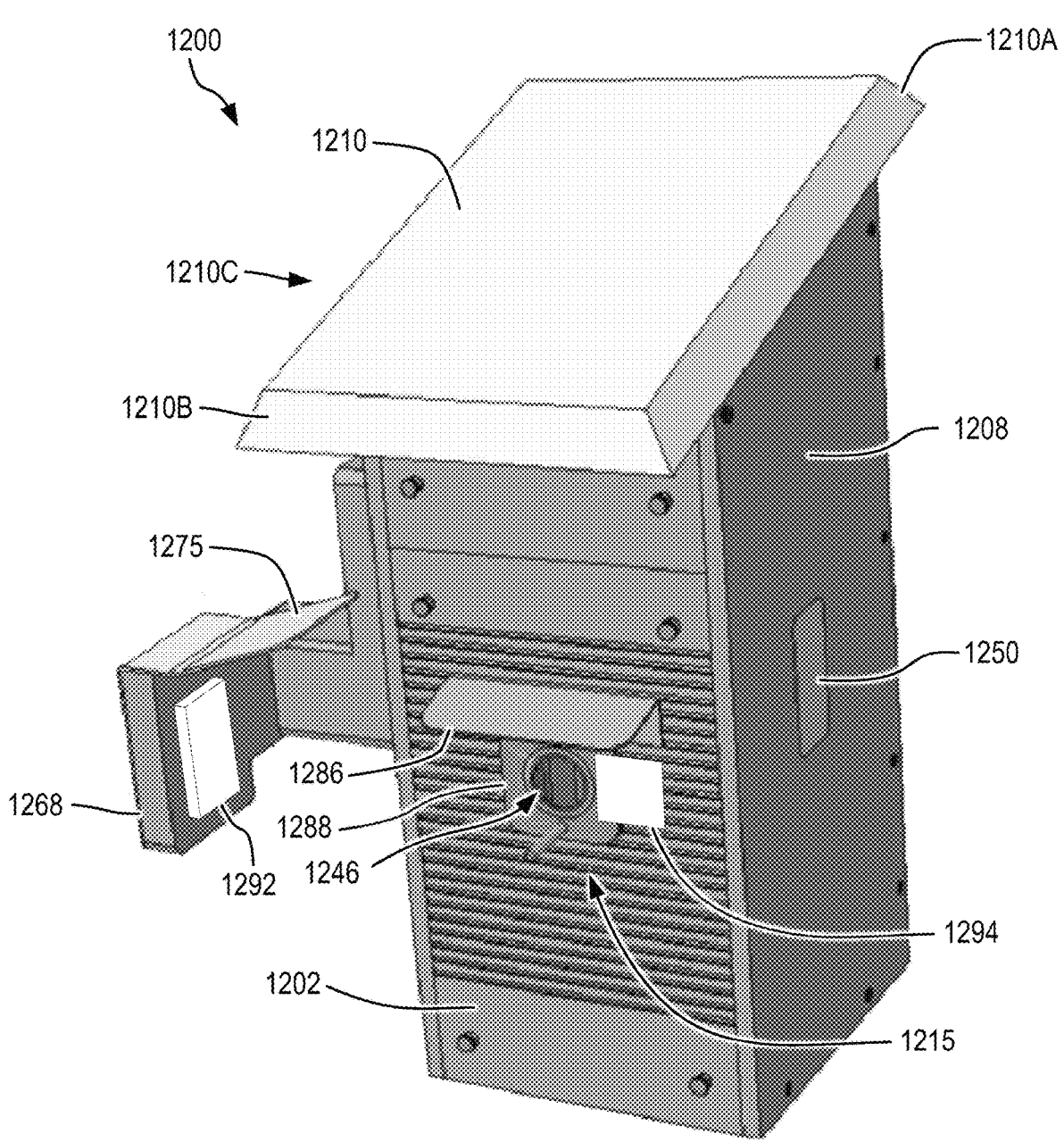
FIG. 42 is a perspective view illustrating the birdhouse of FIG. 39 where the front wall is shown and where a camera and an intruder defense device are also included in accordance with an exemplary embodiment.

FIG. 41 is a perspective view illustrating the birdhouse 1200 of FIG. 39 where the front wall is shown, and FIG. 42 is a perspective view illustrating the birdhouse 1200 of FIG. 39 where the front wall is shown and where an external camera 1292 and an intruder defense device 1294 are also included.

Birdhouses are routinely visited by predators and competing bird species constituting a threat to nesting birds. Having the ability to identify and reject a predator or unwanted intruder from the birdhouse structure can be beneficial to help nesting birds avoid disruption of their nesting process and to help reduce the risk of eggs and hatchlings being destroyed.

The birdhouse 1200 of FIG. 42 can identify the presence of a creature known generically to be dangerous or hostile to the birds inside the birdhouse 1200 and activate a protective response. The external camera 1292 can be configured to capture images and/or video footage of the area proximate to the portal 1246. The external camera 1292 can be configured to capture audio as well in some embodiments. The machine learning unit 1905 or processor(s) associated with the external camera 1292 can detect motion, identify animals near the portal, determine the type of animal, and determine whether or not an animal is a friend or a foe. This determination can be made based on a wide variety of different data points. For example, the friend-or-foe determination can partially depend upon the size of the animal, the shape of the animal, the external color(s) of the animal, movement patterns for the animal, the sound that the animal makes, etc.

The machine learning unit 1905 can be configured to utilize machine learning techniques. As used herein, the term "machine learning" is intended to mean the application of one or more software application techniques or models or artificial intelligence techniques or models that process and analyze data to draw inferences and/or predictions from patterns in the data. Machine learning techniques can process and analyze data to enable computer systems to autonomously learn and improve their performance over time from the data, to automatically identify patterns, extract insights, and make informed decisions or predictions without explicit programming for each scenario. The machine learning techniques can include a variety of models or algorithms, including supervised learning techniques, unsupervised learning techniques, reinforcement learning techniques, knowledge-based learning techniques, natural-language-based learning techniques such as natural language generation, natural language processing (NLP) and named entity recognition (NER), deep learning techniques, and the like. The machine learning techniques are trained using training data. The training data is used to modify and fine-tune any weights associated with the machine learning models, as well as record ground truth for where correct answers can be found within the data. As such, the better the training data, the more accurate and effective the machine learning model. Machine learning models utilize statistical methods and optimization processes and techniques to adaptively refine their internal parameters, allowing them to generalize from past observations and efficiently solve complex tasks, including classification, regression, clustering, and more. The models can include supervised learning models (e.g., linear regression models, logistic regression models, decision tree models, random forest models, support vector models, neural network models), unsupervised learning models (e.g., K-Means clustering models, hierarchical clustering models, principal component analysis (PCA) models, gaussian mixture models (GMM)), semi-supervised learning models (e.g., a combination of supervised and unsupervised learning approaches where the model is trained on a partially labeled dataset), reinforcement learning models (e.g., agents and Q-learning and deep Q networks (DQNs)), deep learning models (e.g., neural networks), transfer learning models, ensemble learning models, on-line learning models, and instance-based learning models. The supervised learning models can be trained on labeled datasets to learn to map input data to desired output data or labels. This type of learning model can involve tasks like classification and regression. The unsupervised learning model involves models that analyze and identify patterns in unlabeled data. Clustering and dimensionality reduction are common tasks in unsupervised learning. The semi-supervised learning models combine elements of both supervised and unsupervised learning models, utilizing limited labeled data alongside larger amounts of unlabeled data to improve model performance. The reinforcement learning model involves training models to make sequential decisions by interacting with a selected environment. The models learn through trial and error, receiving feedback in the form of rewards or penalties. The deep learning models utilizes neural networks with multiple layers to automatically learn hierarchical features from data. The neural networks can include interconnected nodes, or "neurons," organized into layers. Each connection between neurons is assigned a weight that determines the strength of the signal being transmitted. By adjusting the weights based on input data and desired outcomes, neural networks can learn complex patterns and relationships within the data. The neural networks can include feedforward neural networks (FNNs), convolutional neural networks (CNNs), recurrent neural networks (RNNs), long short-term memory (LSTM) networks, gated recurrent units (GRUs), autoencoders, generative adversarial networks (GANs), transformers, and the like. The machine learning unit can include one or more processors and one or more memory devices comprising computer program code configured to cause the one or more processors to complete certain functions.

In some embodiments, the machine learning unit 1905 can be configured to make the friend-or-foe determination, and the machine learning unit 1905 can develop a model based on historical data regarding known predators and non-predators. For example, the machine learning unit 1905 can obtain images and/or video footage of known predators and non-predators and can develop a model based on various aspects of the images and/or video footage (e.g., detected size of the creature, the shape of the creature, the external color(s) of the creature, movement patterns for the creature, the sound that the creature makes, etc.). Once the model has reached a desired accuracy level, the machine learning unit 1905 can deploy the model and use it to make determinations of whether or not creatures are friend or foe. The model developed by the machine learning unit 1905 can be improved over time as further data is obtained, and improvements can be made even after the model is deployed to make determinations of whether or not creatures are friend or foe.

In FIG. 42, the intruder defense device 1294 is an actuatable member that is configured to be moved upon activation of the sensor. The actuatable member can move to block the portal 1246 to prevent the predator from entering the portal 1246. In some embodiments, the actuatable member can be provided in the form of an arm or another component that can be moved to interfere with the predator to causes it to vacate the area. However, the intruder defense device 1294 can be provided in a variety of forms. For example, the intruder defense device 1294 can alternatively be a light, a buzzer, a speaker, etc. Where the indicator is a light, the light can turn on, can turn to a different color, can flash in certain intervals or strobe flash patterns, etc. As another example, where the indicator is a speaker or the buzzer, the speaker or the buzzer can emit an alarm sound.

In some embodiments, the intruder defense device 1294 can not be included, and the birdhouse 1200 can simply include the external camera 1292. Where this is the case, processor(s) or a machine learning unit 1905 associated with the external camera 1292 can identify a threat and can send a message to the appropriate human recipient that a threat is present which can warrant attention.

The external camera 1292 and intruder defense device 1294 can be utilized with a variety of different types of birdhouses, and the external camera 1292 and intruder defense device 1294 can be provided separately from the birdhouse and subsequently added to the birdhouse.

Additionally, an example portal assembly 1215 is illustrated in FIGS. 41 and 42. In the portal assembly illustrated in FIG. 41, the portal assembly 1215 includes a portal plate 1288. The portal assembly 1215 includes a base plate that has a portal roof 1286 that forms an integral part of the base plate. A portal opening is positioned on the base plate. Additionally, the portal assembly 1215 includes a removable portal plate 1288. The base plate can be removably attached to the front wall 1202, and the base plate 125 can define a hole that enables access to the portal 1246. The portal roof 1286 can be similar to other similar portal roofs described herein, and the portal roof 1286 can protect the portal from rainwater and other precipitation so that it does not enter the portal. The portal roof 1286 can also enable birds to stay dryer while perching on a roosting peg 1290 at the portal 1246 to look out during periods of rain. Existing birdhouses typically do not have a roof specifically designed to cover a portal, and the portal roof 1286 can be positioned above and proximate to the portal 1246 to prevent exposure to rainwater and other precipitation even when it is approaching at an angle. Maintaining a dry nesting area is important to the health and well-being of nesting birds and their young, and the portal roof 1286 helps to accomplish this important objective.

The base plate can also be configured to receive the removable portal plate 1288 for attachment. Like the base plate, the removable portal plate 1288 can define a hole that enables access to the portal 1246. However, in some embodiments, the size or shape of the hole within the removable portal plate 1288 can be different than the size or shape of the hole within the base plate. For example, the hole within the removable portal plate 1288 can be smaller than the hole of the base plate. Thus, the size of the hole for the portal 1246 can be effectively controlled by the size of the hole within the removable portal plate 1288. The use of the removable portal plate 1288 can enable the effective size and/or shape of the portal 1246 to be easily changed without requiring wholesale changes to the entire portal assembly 1215. Where a removable portal plate 1288 is used, a latch, a lock, or another similar mechanism may be included to prevent the removable portal plate 1288 from being moved by a predator or another animal to enlarge the effective size of the portal. For example, a different removable portal plate 1288 can be selected based on whether the birdhouse is intended to be used for a larger or a smaller bird, with the size of the hole within the removable portal plate 1288 being the desired size. By contrast, most existing birdhouses are provided with only a single portal size, which can be optimal for only a limited subset of birds who can physically enter the portal and who are inclined to nest in the birdhouse. By enabling the portal size and/or shape to be easily changed, users can freely apply different size portals to the birdhouse 1200 to have greater flexibility with regard to the birds that will be attracted to use the birdhouse 1200.

The portal assembly 1215 can also be configured to determine if an animal located at the portal 1246 is a friend or a foe based on camera footage or video footage from the external camera 1292 or based on data received from another sensor. If it is determined that a foe such as a predator is present close to the portal 1246, the intruder defense device 1294 can be activated. The intruder defense device 1294 can be configured to shift over to block the portal 1246 in some embodiments to prevent the predator from entering the portal 1246. In some embodiments, the intruder defense device 1294 can close slowly enough to avoid causing harm to any birds that can be positioned in the portal. However, in other embodiments, the intruder defense device can be configured to actuate movement of a member positioned at another location. Alternatively, the intruder defense device can take the form of a buzzer or speaker and can be configured to generate an alarm sound to potentially scare away the predator and/or to inform the owner of the presence of the predator. As another alternative, the intruder defense device can take the form of a light that is configured to flash when a predator is nearby.

Figure 45:
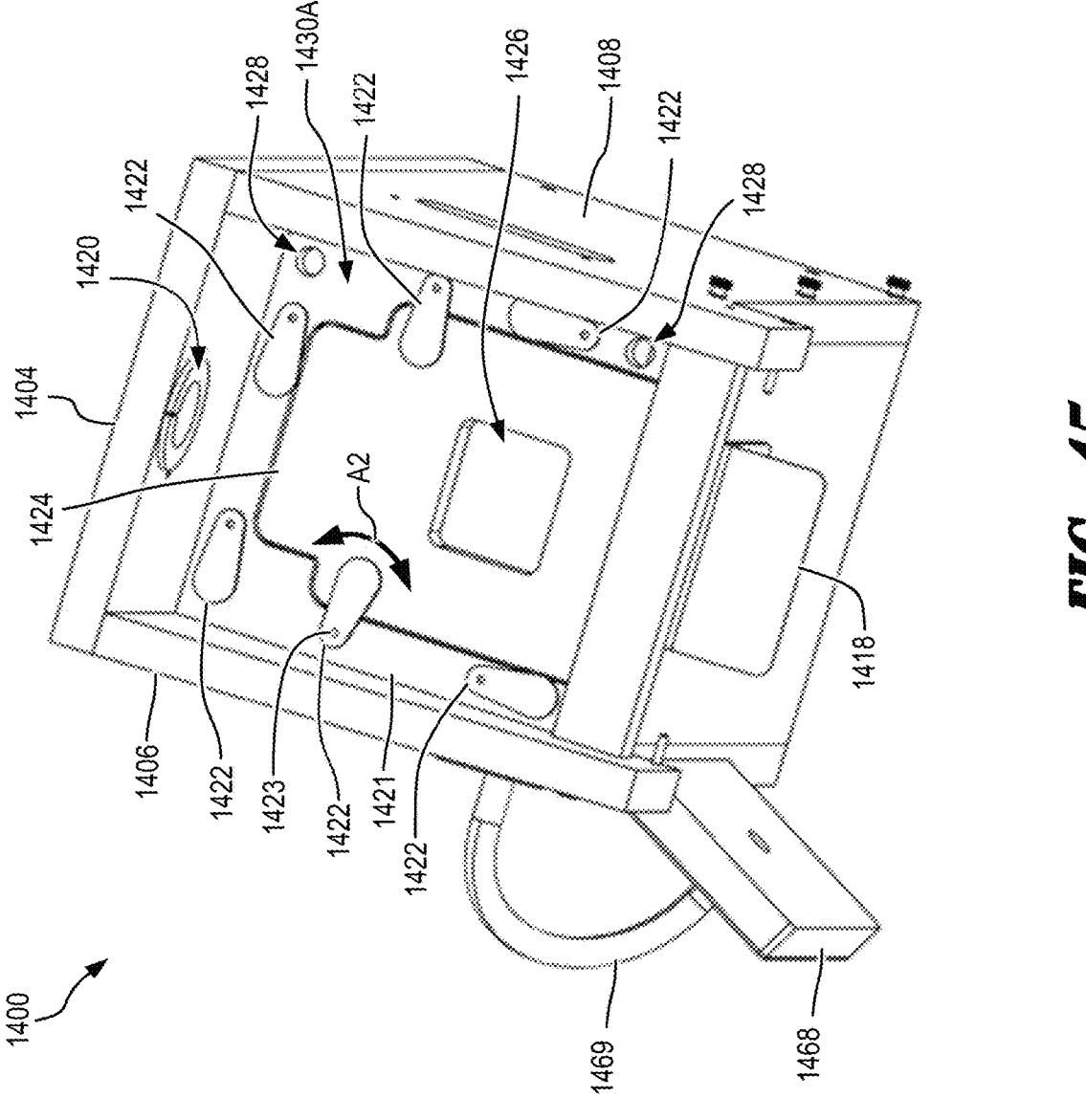
FIG. 45 is a top, perspective view illustrating a camera platform having a removable camera panel that hosts a birdhouse camera in accordance with an exemplary embodiment.

FIG. 45 is a top, perspective view illustrating a camera platform 1421 having a removable panel 1424 that hosts a birdhouse camera. This allows the wiring chamber 1430A to be seen and the contents within the wiring chamber 1430A to be seen. The birdhouse 1400 is similar to other birdhouses described herein in many respects. For example, the birdhouse 1400 comprises a rear wall 1404, a left-side wall 1406, a right-side wall 1408, a portal assembly 1418, an external camera platform 1468, and a wiring cover 1469, and each of these components can be similar to corresponding components described in other embodiments herein.

Holes 1428 are defined in the camera platform 1421. The holes 1428 are positioned at the corners of the camera platform 1421, but the holes 1428 can be positioned at other locations. The holes 1428 are illustrated with a circular cross-sectional shape, but the holes 1428 can possess different cross-sectional shapes in other embodiments. Additionally, the holes 1428 can be provided with different sizes in other embodiments. Additionally, hole covers can be provided to selectively permit or prevent the flow of air through the holes 1428 in some embodiments. The hole covers can function similarly to the locking members 1422 in some embodiments.

A cord access port 1420 can be positioned on the rear wall 1404. The cord access port 1420 can be configured to enable cords, cables, wires, etc. to extend from outside the birdhouse 1400 through the cord access port 1420 and into the wiring chamber 1430A. The cord access port 1420 can allow alternating current or direct current connectors to be provided in the wiring chamber. The cord access port 1420 can also allow an owner to run an extension cord from outside the birdhouse 1400 through the cord access port 1420 and into the wiring chamber 1430A, thereby providing direct power to the birdhouse 1400 with regard to any electrical components that the owner can want to power using either standard plugs, USB, etc.

The camera platform 1421 can also be configured to receive a removable panel 1424. The removable panel 1424 can be configured to host a birdhouse camera, with the birdhouse camera being configured to capture images and/or video footage of birds in the nesting chamber below the camera platform 1421. The removable panel 1424 can define an access area 1426, which can be an opening that provides access to the rear side of the camera. The access area 1426 can potentially allow the camera to be adjusted without removing the camera from within the removable panel 1424. The access area 1426 can provide access to a reset button or other reset functionality for a camera, and the access area 1426 can provide access to cord connection areas for the camera.

The removable panel 1424 can be retained in place using various locking members 1422. The locking members 1422 can be positioned at various locations around the perimeter of the removable panel 1424. The locking members 1422 can be configured to rotate about a pin 1423 so that the locking members 1422 can rotate as indicated by the line A2. The locking members 1422 can each be rotated to an opened position to enable the removable panel 1424 to be inserted or removed. Alternatively, the locking members 1422 can each be rotated to a closed position to cause the removable panel 1424 to be retained in position in the camera platform 1421. The ability to remove the removable panel 1424 can be beneficial to enable maintenance to be easily performed on the removable panel 1424 or the camera or for removal or replacement of the removable panel 1424 or the camera. The removable panel 1424 and the access area 1426 can be beneficial to enable changes to be implemented or for maintenance to be performed at the camera without disturbing any nesting birds because changes can be made without entering the nest chamber. In some embodiments, a transparent cover can be positioned at the top of the nest chamber and immediately below the camera to enable the camera to see through the transparent cover while still keeping the nest chamber entirely separate from the wiring chamber 1430A. While the removable panel 1424 is illustrated as being inserted through the wiring chamber 1430A so that the removable panel 1424 may be assembled to the camera platform, a similar removable panel may be assembled on the camera platform from the underside of the camera platform (see, e.g., removable panel 1661 of FIG. 54), and locking members similar to locking members 1422 may be used to retain the removable panel in position and to prevent the removable panel from falling.

Figure 46A:
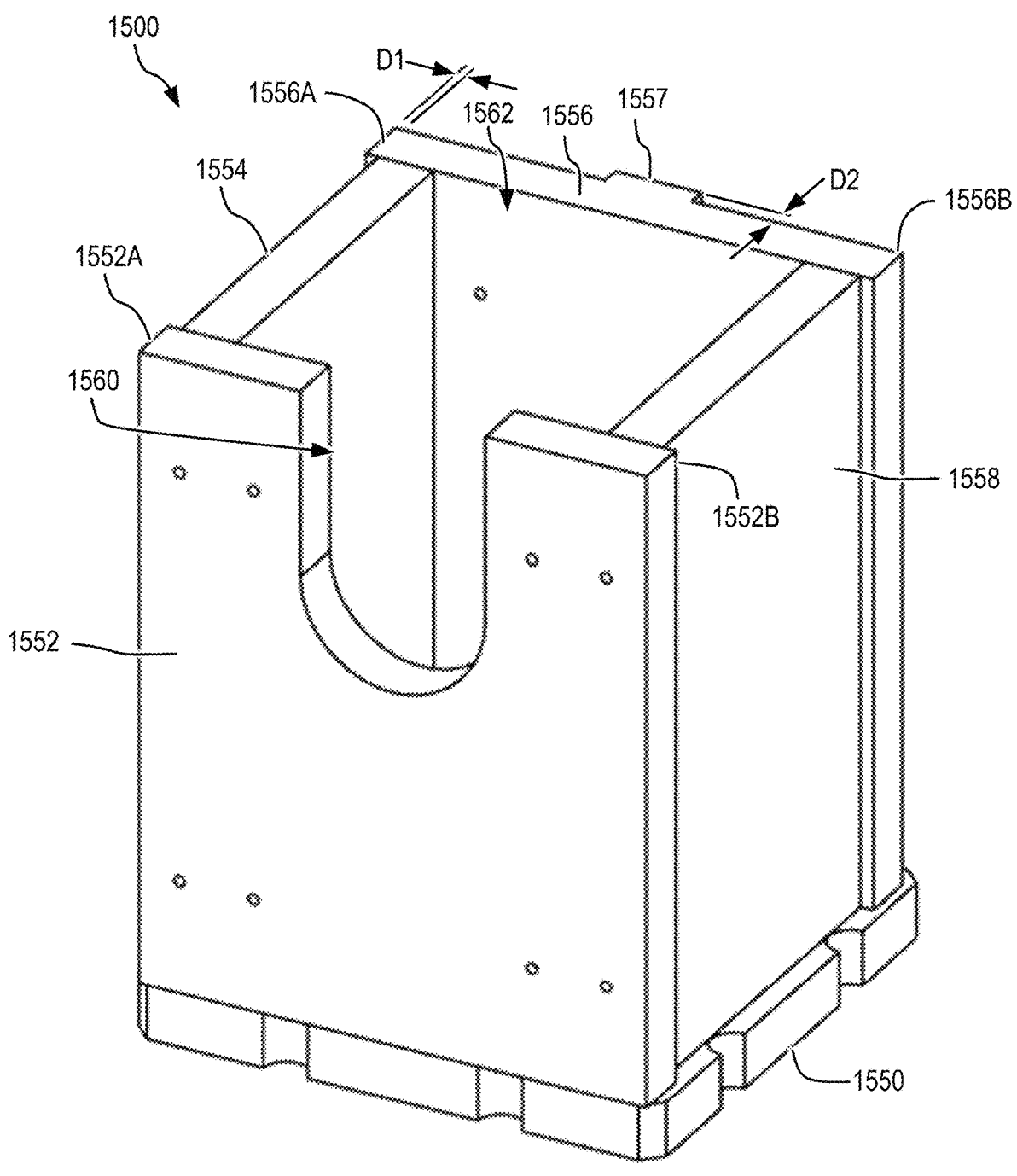
FIG. 46A is a perspective view illustrating an example liner box in a nesting configuration with the liner box sitting on a floor in accordance with an exemplary embodiment.

FIG. 46A is a perspective view illustrating an example liner box 1500 in a nesting configuration and with the liner box 1500 sitting on a floor 1550. The liner box 1500 comprises a front liner panel 1552, side panels 1554, 1558, and a rear panel 1556. The panels 1552, 1556 extend parallel to each other, the side panels 1554, 1558 extend parallel to each other, and the panels 1552, 1556 extend perpendicularly relative to the side panels 1554, 1558. Various fasteners can attach the panels of the liner box 1500, and these fasteners can generally be used to attach other components of liner boxes, birdhouses, and other assemblies described herein. The fasteners can include screws, nails, or other means for gripping or holding two components together (e.g., the liner panels).

The front liner panel 1552 comprises a front opening 1560. The front opening 1560 extends from the top of the front liner panel 1552 to a location proximate to the center of the front liner panel 1552. When the liner box 1500 is positioned proximate to a portal of a birdhouse, the front opening 1560 can rest adjacent to the portal so that a bird can enter through both the portal and the front opening 1560 and into the internal volume 1562 of the liner box 1500. The interior volume 1562 can effectively serve as a "space within a space," with birds entering into the interior volume 1562. An air gap can be present between the panels forming the liner box 1500 and the outer walls of the birdhouse in some embodiments, and this can be beneficial as the exterior walls can be very hot from exposure to the sun or very cold due to direct exposure to cold external air and/or precipitation.

The shape and size of the front opening 1560 can be selected to enable the liner box 1500 to be used in both a nesting configuration and in a roosting configuration.

The front liner panel 1552 and the rear panel 1556 extend further to the left and to the right than the side panels 1554, 1558. For example, the front liner panel 1552 comprises an extended portion 1552A that extends past the outer surface of the side panel 1554 on the left side, and the front liner panel 1552 comprises an extended portion 1552B that extends past the outer surface of the side panel 1558 on the right side. Similarly, the rear panel 1556 comprises an extended portion 1556A that extends past the outer surface of the side panel 1554 on the left side, and the rear panel 1556 comprises an extended portion 1556B that extends past the outer surface of the side panel 1558 on the right side.

The extended portion 1556A extends past the outer surface of the side panel 1554 on the left side by a distance D1. The distance D1 can be between about 1 millimeter and about 25 millimeters, between about 2 millimeters and about 15 millimeters, or less than about 10 millimeters. However, the distance D1 may possess other values.

Additionally, the rear panel 1556 comprises an extended portion 1557 that extends outwardly relative to other portions of the rear panel 1556. The extended portion 1557 extends out a distance D2 relative to other locations on the rear surface of the rear panel 1556. The distance D2 can be between about 1 millimeter and about 25 millimeters, between about 2 millimeters and about 15 millimeters, or less than about 10 millimeters. This distance D2 can be equal to the distance D1 in some embodiments, but these distances can be different in other embodiments. Other extended portions similar to the extended portion 1557 can be provided at other locations on the rear panel 1556 or on the other panels. However, the distance D2 may possess other values.

The interior surfaces of the panels 1552, 1554, 1556, 1558 that face the internal volume 1562 can possess grooves in some embodiments, but grooves can be omitted from these interior surfaces in other embodiments. The grooves can be configured to enable birds to grip on to the grooves at the interior surfaces of the panels 1552, 1554, 1556, 1558.

The liner box 1500 and the corresponding floor 1550 can be beneficial to increase the ease of cleaning the interior of a birdhouse. Without a liner box 1500, the birdhouse would either need to be cleaned where the birdhouse is attached, or the birdhouse would need to be removed from its installed location so that the birdhouse can be taken to another location for cleaning. By contrast, when the liner box 1500 is used, the liner box 1500 can be easily removed from the birdhouse so that the liner box 1500 can be cleaned at another location without requiring the birdhouse to be disassembled or removed from its installation location. In some embodiments, the liner box 1500 can simply be positioned so that it rests within the nest chamber of a birdhouse without attaching the liner box 1500 to any other parts of the birdhouse (e.g., walls forming the nest chamber), thereby allowing the liner box 1500 to be quickly and easily inserted or removed from the birdhouse. Additionally, the ability to remove the liner box 1500 can make it easier to reach all parts of the liner box 1500 during cleaning. The liner box 1500 can also be disassembled either partially or fully in some embodiments to enable effective cleaning or maintenance of the liner box 1500 when necessary. Where a liner box 1500 is used, the liner box 1500 can be the only part of a birdhouse that requires regular cleaning. In some embodiments, the floor 1550 can be contiguous with or directly attached to the panels that form the liner box 1500, but the floor 1550 can be a separate component form the liner box 1500 in other embodiments.

The use of a liner box 1500 can also be beneficial in the event water enters the birdhouse. If water somehow makes its way inside of the birdhouse, then the presence of the liner box 1500 can help to keep moisture generally positioned at locations outside of the liner box 1500, preventing the moisture from reaching birds and their nests within the inner volume 1562 of the liner box 1500.

The use of the liner box 1500 also helps to effectively create a double hull design with multiple walls, with an air gap being present between the liner panels that form the liner box 1500 and the exterior walls of a birdhouse. This air gap can be beneficial to control the temperature within the inner volume 1562 of the liner box 1500. For example, where a birdhouse is used in a very warm environment, the double hull design and the air gap can help to maintain the inner volume 1562 at a temperature that is suitable for birds within the birdhouse. Additionally, other features described herein can help to control the temperature such as those that help facilitate increased airflow through a birdhouse. The liner panels that form the liner box 1500 can help to provide additional insulation.

Figure 47A:
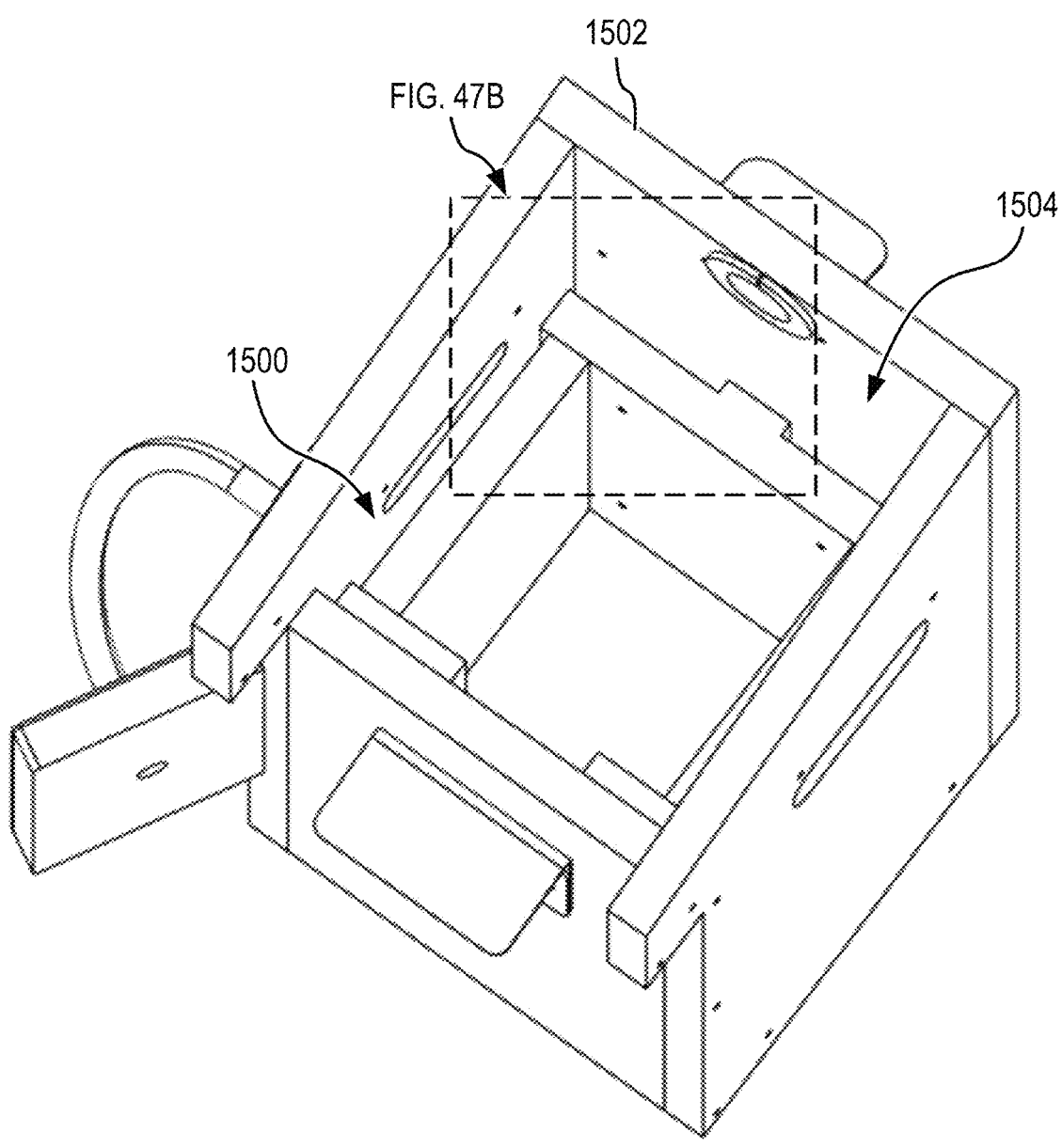
FIG. 47A is a perspective view illustrating the liner box of FIG. 46A positioned within an internal chamber of a birdhouse, in accordance with an exemplary embodiment.
Figure 47B:
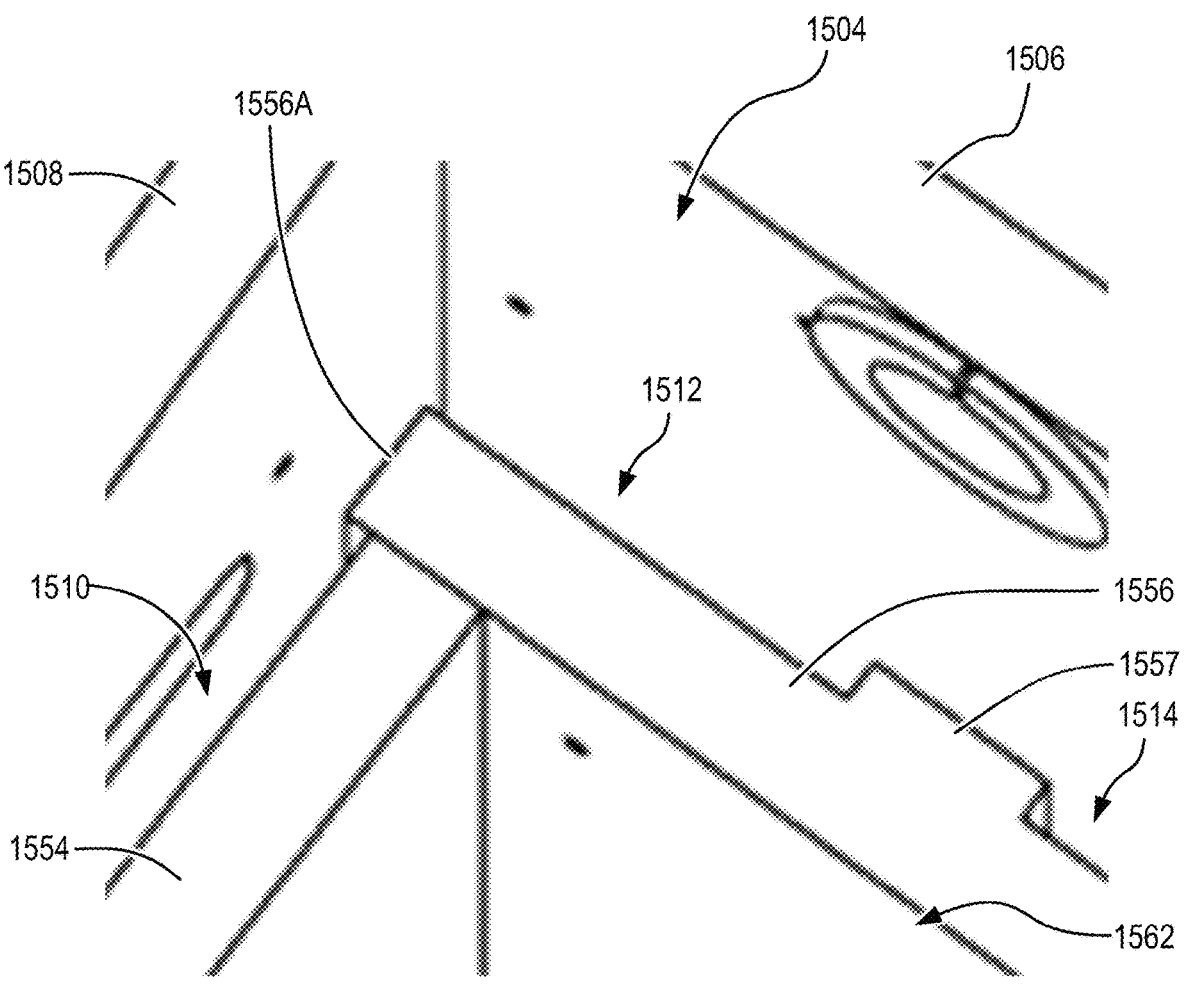
FIG. 47B is an enhanced, perspective view illustrating the liner box and birdhouse of FIG. 47A in accordance with an exemplary embodiment.

The spacing generated by the extended portions 1556A, 1157 can be seen in FIGS. 47A and 47B. FIG. 47A is a perspective view of a birdhouse 1502 and the liner box 1500 of FIG. 46A, with the liner box 1500 positioned within an internal chamber 1504 of a birdhouse 1502. FIG. 47B is an enhanced, perspective view illustrating the liner box 1500 and birdhouse 1502 of FIG. 47A. As illustrated, the birdhouse 1502 defines an interior volume 1504 that is bounded by the rear wall 1506, the left-side wall 1508 and other walls. When the liner box 1500 is received in the internal chamber 1504, the extended portion 1556A and the extended portion 1552A (see FIG. 46A) can ensure that a space 1510 is retained between the internal surface of the left-side wall 1508 and the external surface of the side panel 1554. Additionally, the extended portion 1557 can ensure that spaces 1512, 1514 are positioned between the internal surface of the rear wall 1506 and the external surface of the rear panel 1556.

The liner box 1500 can also be positioned in different configurations within the same birdhouse. Additionally, different bird species prefer different sized spaces and different sized portals when looking for attractive nesting locations. By enabling the liner box 1500 to be adjusted to different configurations, by allowing the liner box 1500 to be replaced by another liner box 1500, and/or by allowing the portal assembly 1615 (see, e.g., FIG. 51) to be easily adjusted to change the size of the portal, a single birdhouse can be adjusted so that it attracts a bird type desired by the owner. In some embodiments, the birdhouse can be adjusted to be used by a particular bird type without removing the birdhouse from its installation location and without requiring the birdhouse to be disassembled.

Figure 46B:
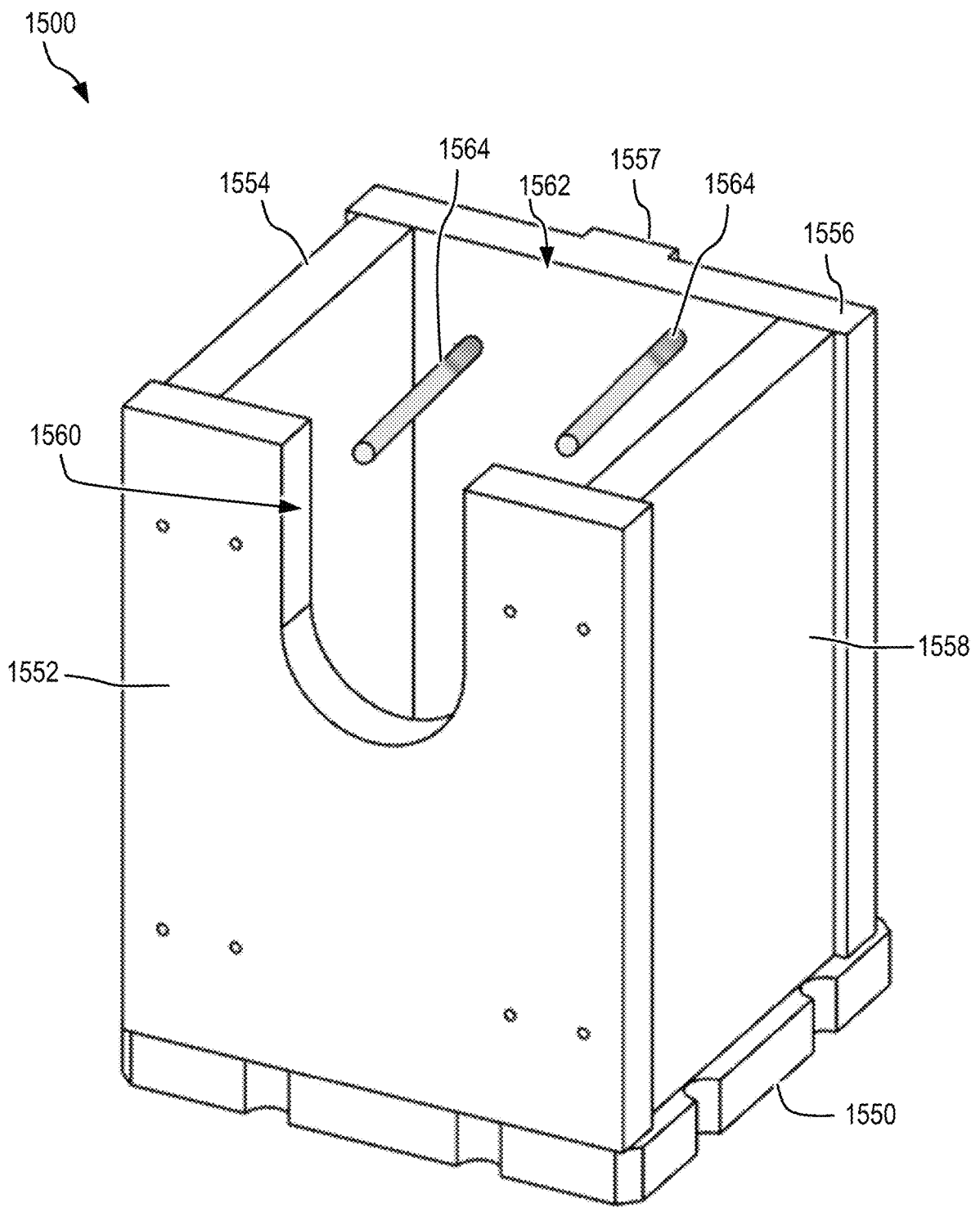
FIG. 46B is a perspective view illustrating the liner box of FIG. 46A with pegs attached within the interior volume of the liner box in accordance with an exemplary embodiment.

In FIG. 46B, the liner box 1500 is illustrated with pegs 1564 provided within the internal volume 1562 of the liner box 1500. The pegs 1564 can serve as roosting pegs. The pegs 1564 can be configured to be attached and/or removed from the liner box 1500. For example, when the liner box 1500 is positioned in a nesting configuration, the pegs 1564 can be removed. When the liner box 1500 is positioned in a roosting configuration, the pegs 1564 can be added. The pegs 1564 can enable birds to roost at elevated locations within the liner box 1500 or at elevated locations within a birdhouse where the pegs 1564 are positioned at other locations in the nest chamber of the birdhouse.

While pegs 1564 are illustrated as being added to the liner box 1500 of FIG. 46B, similar pegs can be added to other liner boxes or within a nesting chamber of a birdhouse. While the pegs 1564 are illustrated as having a cylindrical shape in FIG. 46B, the shape and size of the pegs 1564 can be different in other embodiments.

Figure 48:
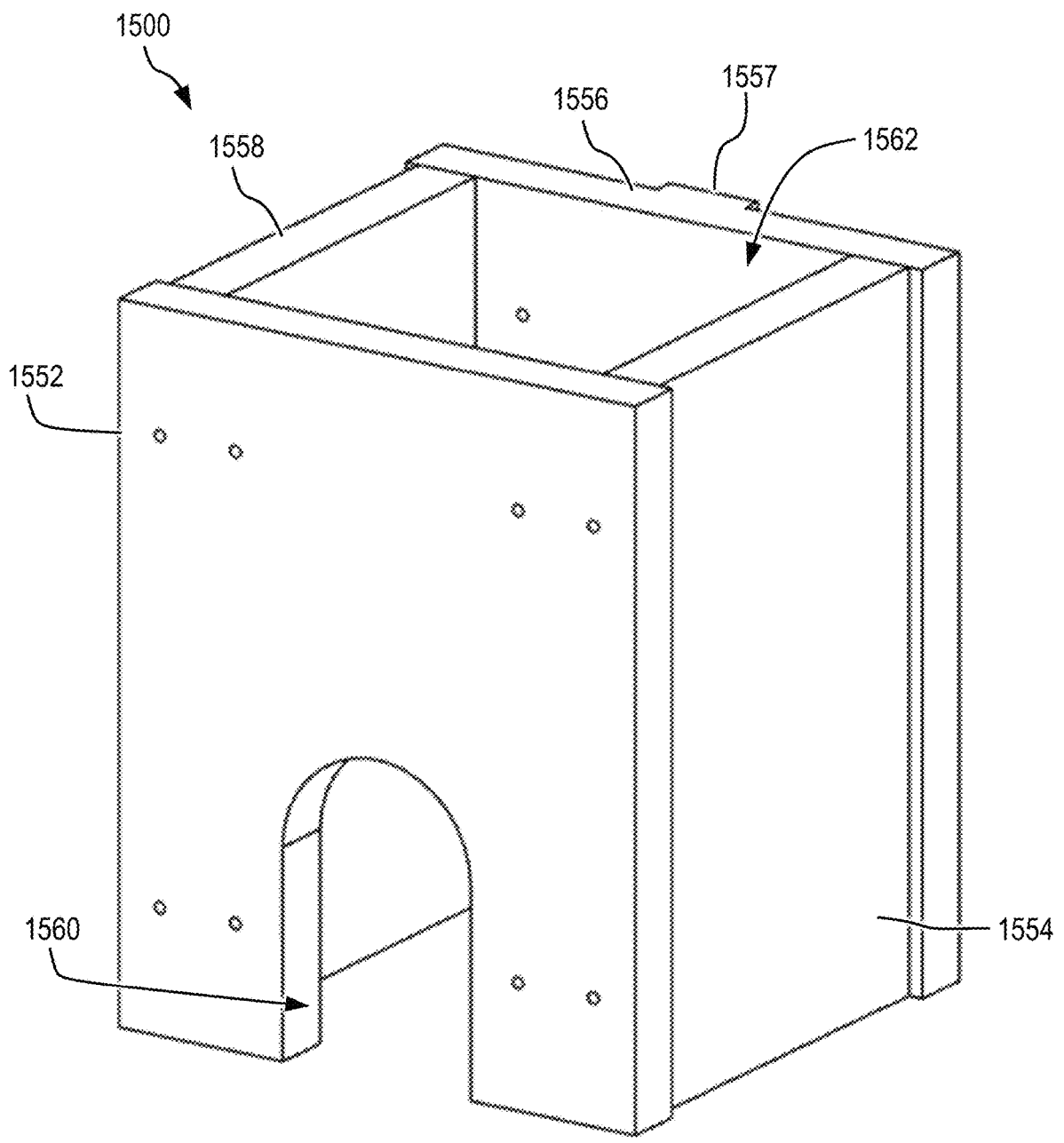
FIG. 48 is a perspective view illustrating the liner box of FIG. 46A where the liner box is in a roosting configuration in accordance with an exemplary embodiment.
Figure 50:
FIG. 50 is a front, perspective view illustrating the liner box of FIG. 46A where the liner box is in a roosting configuration and where a front wall is positioned relative to the liner box, in accordance with an exemplary embodiment.

FIG. 48 is a perspective view illustrating the liner box 1500 of FIG. 46A where the liner box 1500 is in a roosting configuration. In the roosting configuration, the liner box 1500 is inverted relative to the liner box 1500 when the liner box 1500 is in a nesting configuration. In the roosting configuration illustrated in FIG. 48, the front opening 1560 is positioned at the bottom of the front liner panel 1552 rather than at the top of the front liner panel 1552. In this position, the front opening 1560 can be positioned adjacent to the portal 1546 of the front wall 1505 when the front wall 1505 is in a roosting configuration as illustrated in FIG. 50. In some embodiments, the liner box 1500 can be oriented in the configuration illustrated in FIG. 48 even when the liner box 1500 is used for nesting, and this can be done where the owner believes that it is appropriate to orient the liner box 1500 in this manner.

Figure 49:
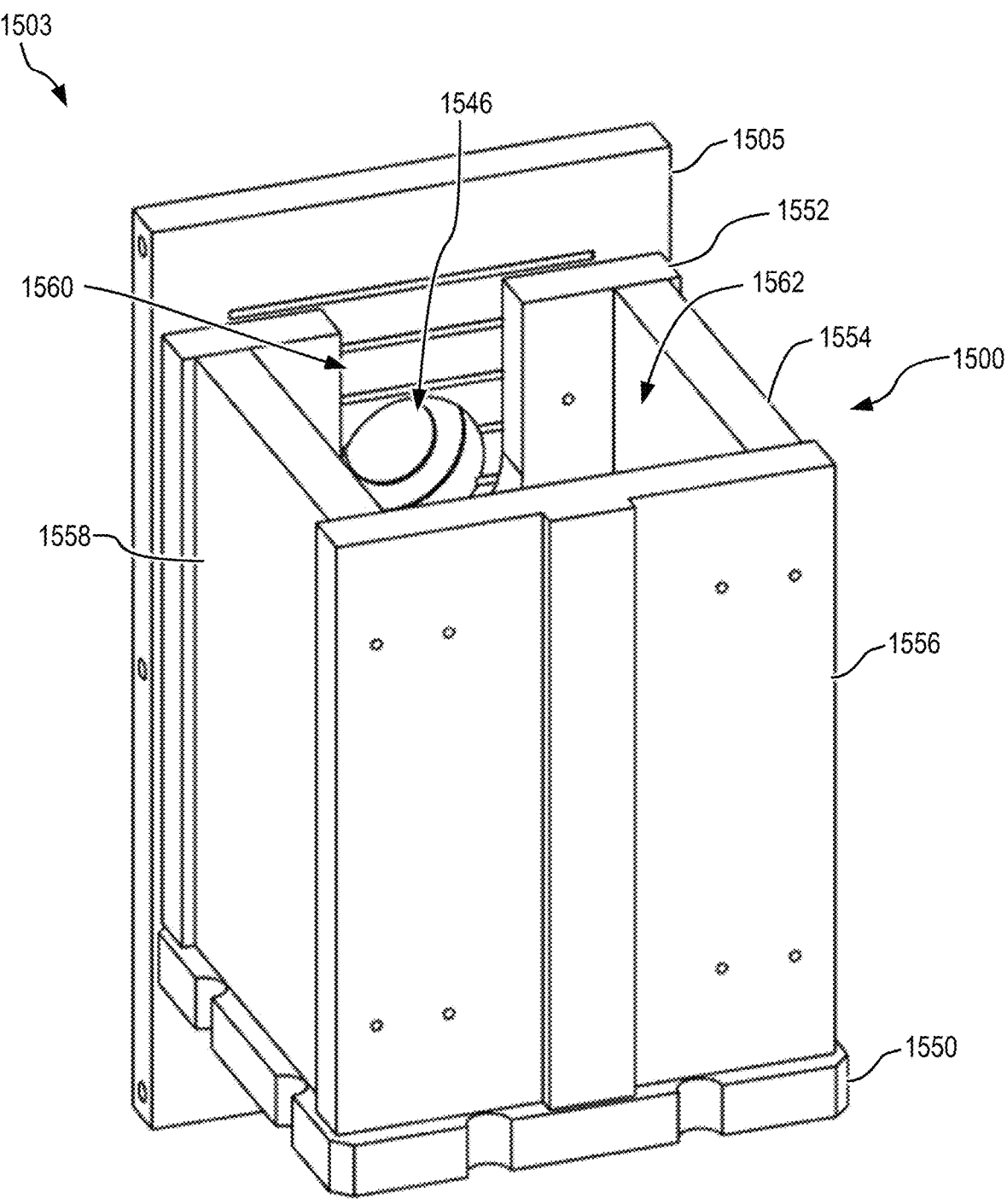
FIG. 49 is a rear, perspective view illustrating the liner box of FIG. 46A where the liner box is in a nesting configuration, where the liner box is resting on a floor, and where a front wall is positioned relative to the liner box, in accordance with an exemplary embodiment.

FIG. 49 is a rear, perspective view illustrating an assembly 1503 comprising the liner box 1500 of FIG. 46A, the front wall 1505, and the floor 1550. In the assembly 1503 illustrated in FIG. 49, the liner box 1500 is positioned in a nesting configuration similar to how the liner box 1500 is shown in FIG. 46A. In the nesting configuration, the front opening 1560 is positioned at the top of the front liner panel 1552. In the assembly 1503, the liner box 1500 is resting on a floor 1550. The floor 1550 can comprise a solid material that is configured to prevent debris from falling through, thereby allowing the floor 1550 to hold any debris. The front wall 1505 also defines the portal 1546, and the front wall 1505 is positioned relative to the liner box 1500 so that the portal 1546 and the front opening 1560 align with each other, thereby allowing access to the internal volume 1562 of the liner box 1500 through the portal 1546. The liner box 1500 can be positioned in the appropriate configuration so that, when the portal 1546 is placed in its higher location when the birdhouse is in a nesting configuration as illustrated in FIG. 49, the portal 1546 will not be blocked by the panels of the liner box and entry into and exit from the birdhouse will still be possible.

Figure 56:
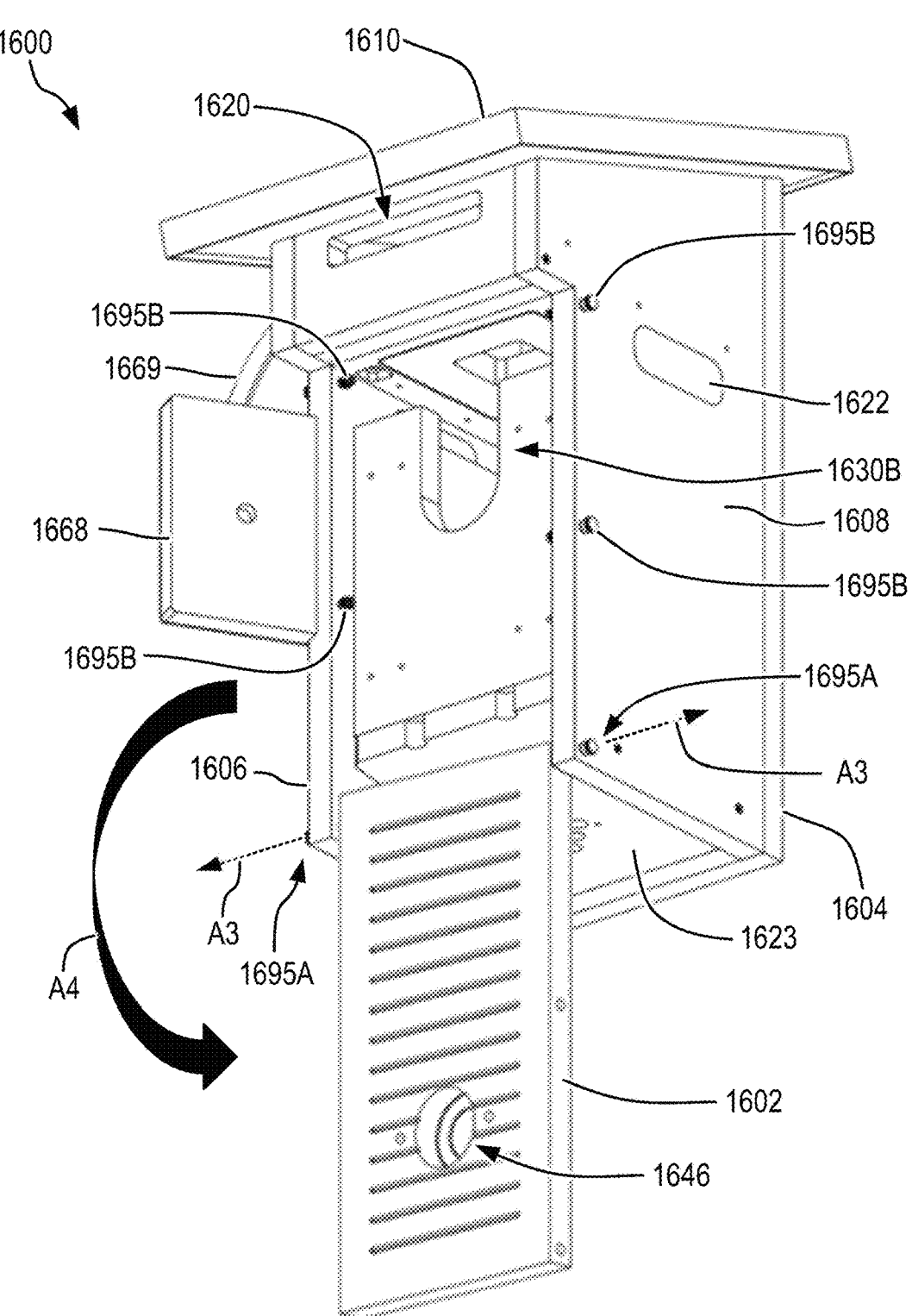
FIG. 56 is a perspective view illustrating the birdhouse of FIG. 51 where the front wall has been rotated about an axis to expose the internal chamber of the birdhouse and other components within the birdhouse in accordance with an exemplary embodiment.

Similarly, the liner box 1500 can be positioned in the appropriate configuration so that, when the portal 1546 is placed in its lower location when the birdhouse is in a roosting configuration as illustrated in FIG. 50, the portal 1546 will not be blocked by the panels of the liner box and entry into and exit from the birdhouse will still be possible. FIG. 50 is a front, perspective view illustrating an assembly 1503A where the liner box 1500 is provided in the roosting configuration as illustrated in FIG. 48 and the front wall 1505 is positioned relative to the liner box 1500. Again, the front opening 1560 of the liner box 1500 is positioned at the bottom of the front wall 1505, thereby allowing access into the internal volume of the liner box 1500 through the portal 1546. In some embodiments, the front wall 1505 can be attached to the liner box 1500. However, the front wall 1505 can merely be positioned adjacent to the liner box 1500 in some embodiments, with the front wall 1505 being rotatable about a hinge as illustrated in FIG. 56.

Figure 51:
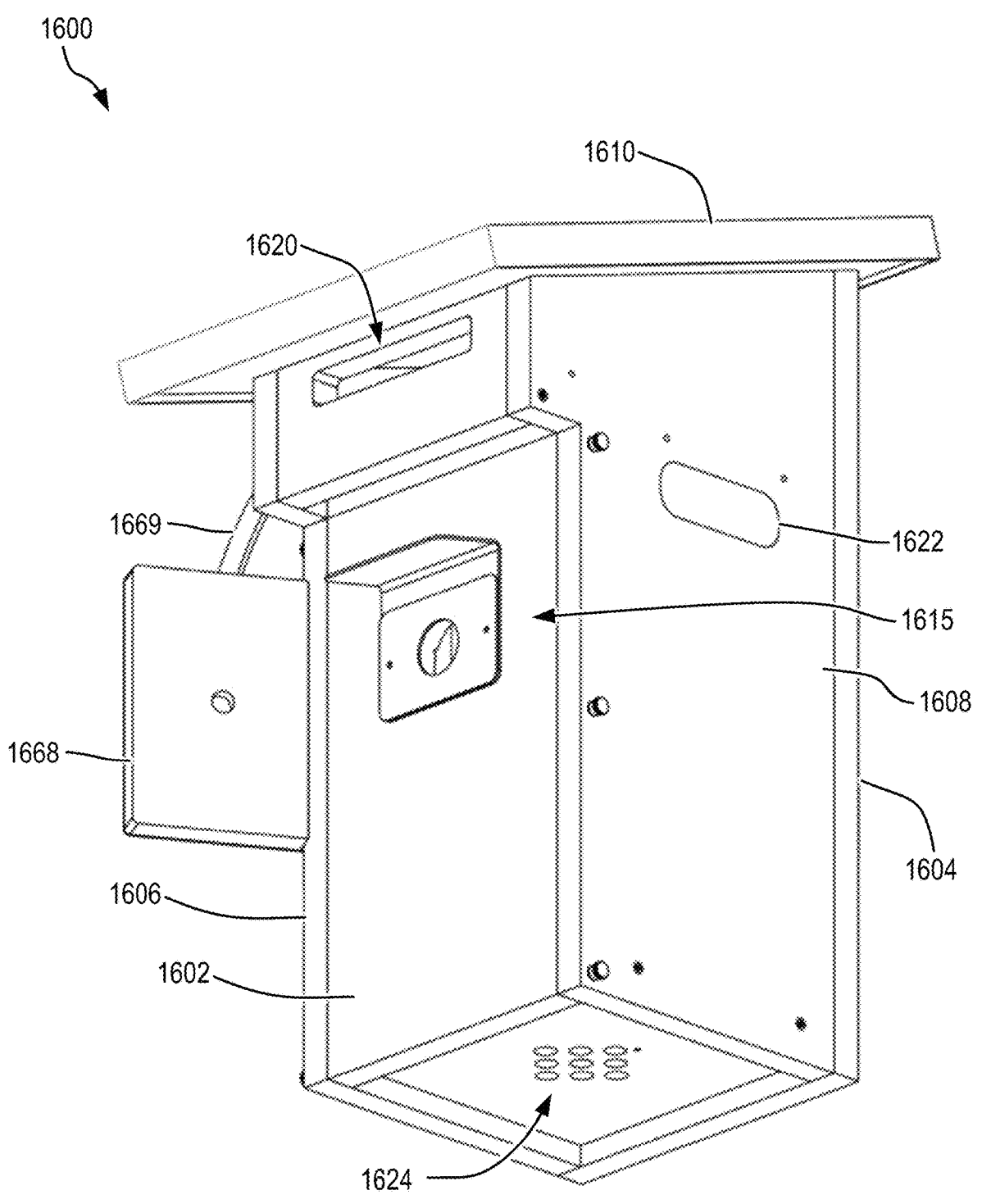
FIG. 51 is a right-side, perspective view illustrating another example birdhouse in accordance with an exemplary embodiment.
Figure 52:
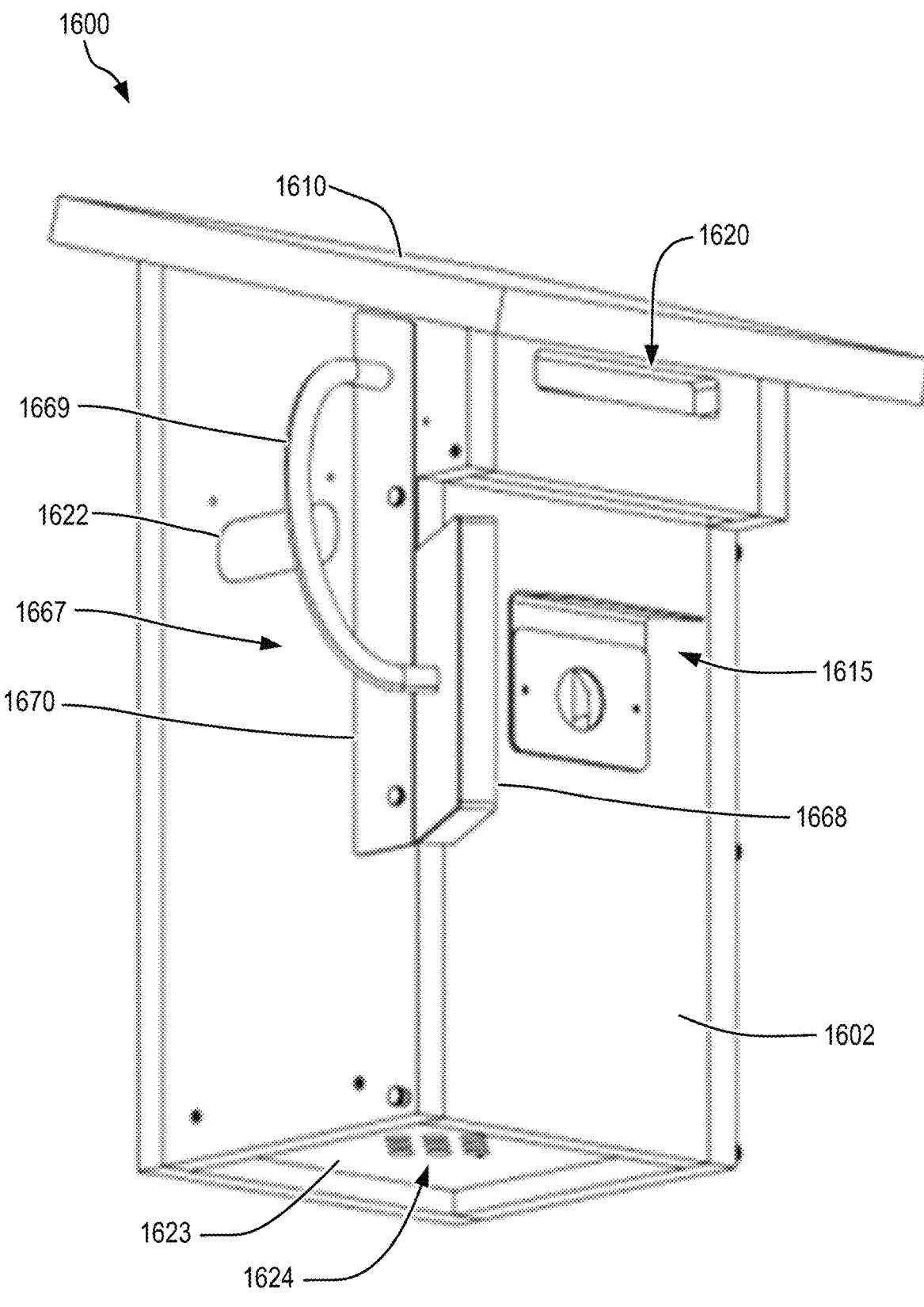
FIG. 52 is a left-side, perspective view illustrating the birdhouse of FIG. 51 in accordance with an exemplary embodiment.

FIG. 51 is a right-side, perspective view illustrating another example birdhouse 1600, with the birdhouse 1600 including an external camera mounting system 1667, and FIG. 52 is a left-side, perspective view illustrating the birdhouse 1600 of FIG. 51. The external camera mounting system 1667 includes an external camera platform 1668, a wiring conduit 1669, and a bracket 1670. The external camera platform 1668 can be configured to receive an external camera for attachment at the external camera platform 1668, and the external camera can be directed towards the portal of the birdhouse 1600 when the external camera is attached to the external camera platform 1668. The external camera platform 1668 can be adjusted in orientation in some embodiments so that the direction of the external camera can be adjusted. For example, the external camera platform 1668 of FIG. 51 is pivotably attached to the bracket 1670. This can allow the external camera positioned on the external camera platform 1668 to be manipulated to varying angles to allow the user to optimize a viewing angle of the external camera to accomplish the user's intended goal. For example, where the user's intended goal is to watch the activity of birds at locations away from the portal, then the external camera can be oriented differently than if the user's intended goal is to watch the area around the portal for the purpose of monitoring for predators. Additionally, the external camera platform 1668 defines a hole therein where one or more connection cables (e.g., power lines, data lines, etc.) can be fed from the wiring chamber through the wiring conduit 1669 within the birdhouse 1600 to the camera on the external camera platform 1668. In some embodiments, the external camera platform 1668 can be configured to be manipulated forward or backward relative to the portal, thereby allowing for cameras having different physical dimensions and mounting requirements to be used. Thus, the external camera mounting system 1667 can be configured to enable a wide variety of different external cameras to be used. The bracket 1670 can be configured to attach the external camera mounting system 1667 to the remainder of the birdhouse 1600. The bracket 1670 is attached to the left side wall of the birdhouse 1600, but the bracket 1670 can be attached to a different portion of the birdhouse 1600 in other embodiments. The wiring conduit 1669 can be configured to protect the connection cables from precipitation and other material.

Additionally or alternatively, the external camera platform 1668 can be configured to enable a camera to be adjusted so that it views the appropriate location for a portal when the portal is either a nesting configuration location or a roosting configuration location. When the front wall 1602 is in the nesting configuration, the portal can be positioned at a higher location relative to when the portal is in a roosting configuration. Thus, having an external camera platform 1668 that is configured to enable easy adjustment of the camera position and/or angle is beneficial so that the camera views the appropriate area. In some embodiments, the external camera platform 1668 can simply be rotated downwardly to view the area proximate to the portal when the front wall 1602 is in the roosting configuration and the external camera platform 1668 can be rotated upwardly to view the area proximate to the portal when the front wall 1602 is in the nesting configuration. However, additionally or alternatively to this angular adjustment approach, the external camera platform 1668 can be shifted up or down based on the location of the portal. For example, the external camera platform 1668 can be configured to be installed at a first vertical position when the front wall 1602 is in a roosting configuration and at a second vertical position when the front wall 1602 is in a nesting configuration.

The birdhouse 1600 also includes a rear wall 1604, a left side wall 1606, a right side wall 1608, a top wall 1610, and a bottom wall 1623, and each of these components can be similar to other corresponding components described herein. The bottom wall 1623 can optionally comprise one or more holes 1624 that are configured to enable airflow through the bottom wall 1623. The holes 1624 can be selectively covered when airflow is not desired, and the holes 1624 can be covered with a mesh covering to prevent insects from entering through the holes 1624. The birdhouse 1600 also comprises a portal assembly 1615 that includes various components, and this portal assembly 1615 is described in greater detail herein (especially in reference to FIGS. 57 and 58).

The birdhouse 1600 also includes light windows 1622 on walls 1606, 1608 that are similar to other light windows described herein, and the birdhouse 1600 also defines an opening 1620 that is similar to opening 1220 described in reference to FIGS. 39 and 40.

Figure 53:
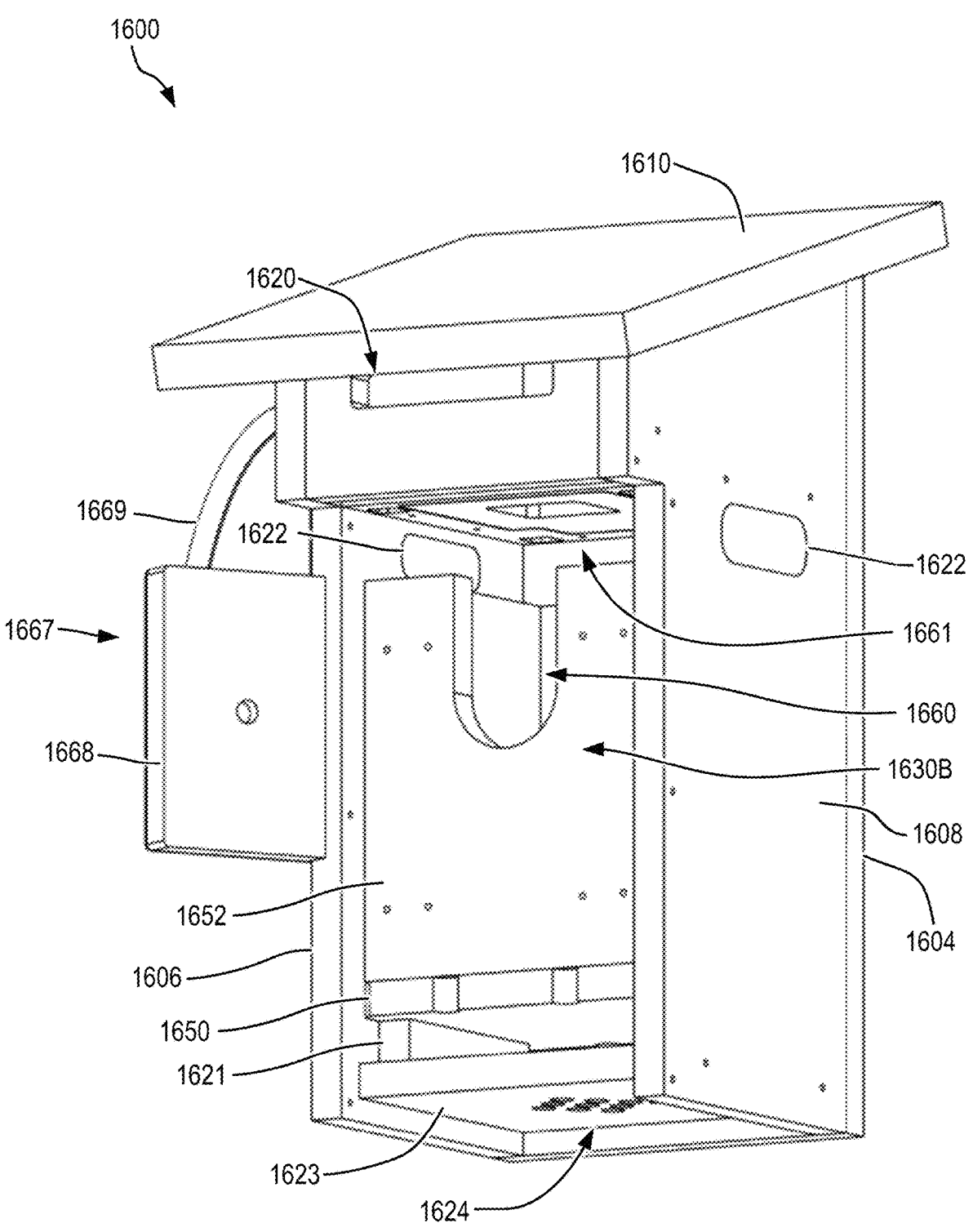
FIG. 53 is a perspective view illustrating the birdhouse of FIG. 51 where the front wall is hidden so that the liner box can be seen within the internal chamber of the birdhouse, with the liner box being in a nesting configuration in accordance with an exemplary embodiment.
Figure 54:
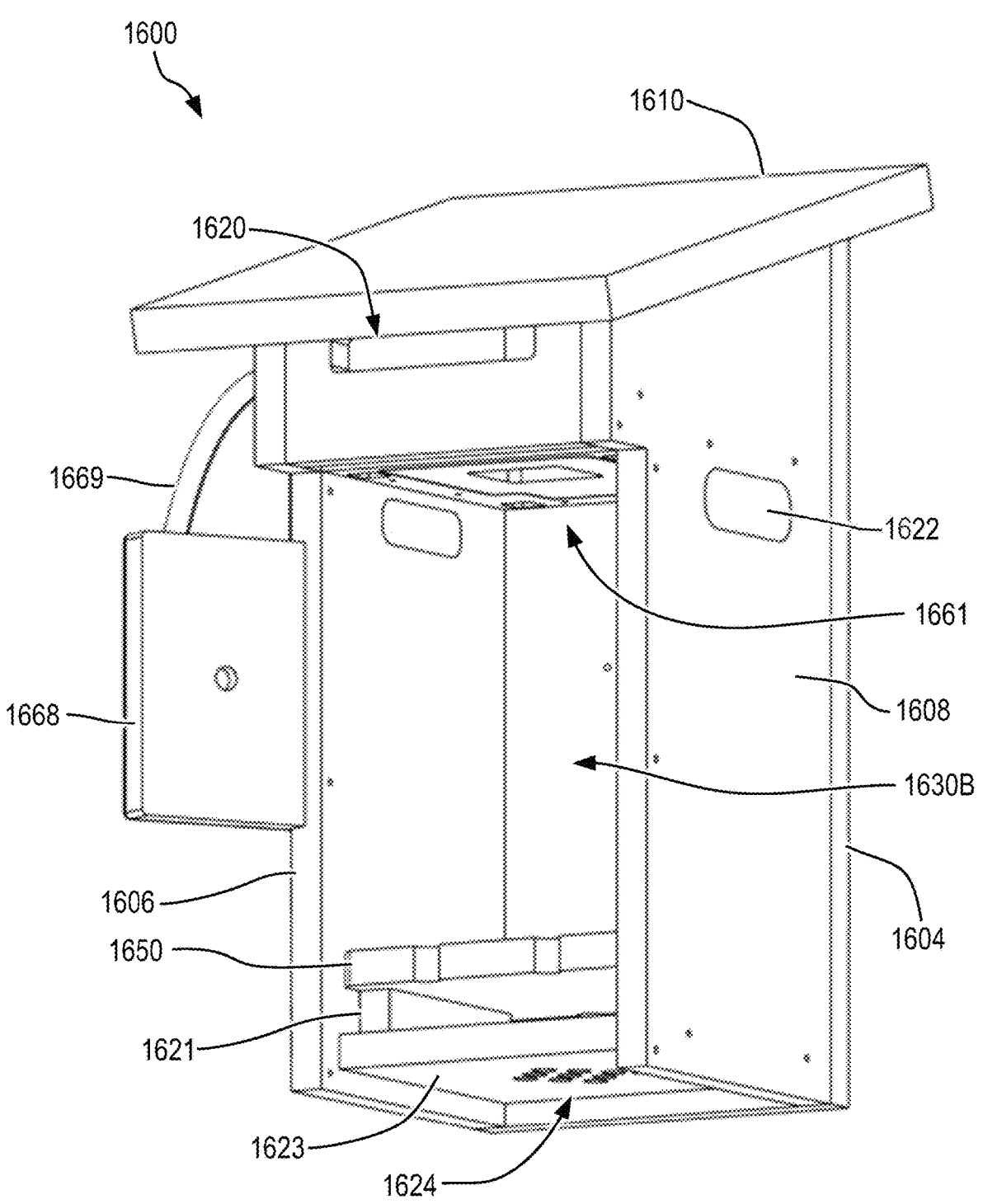
FIG. 54 is a perspective view illustrating the birdhouse of FIG. 51 where the front wall and the liner box are hidden so that the internal chamber of the birdhouse can be seen in accordance with an exemplary embodiment.
Figure 55:
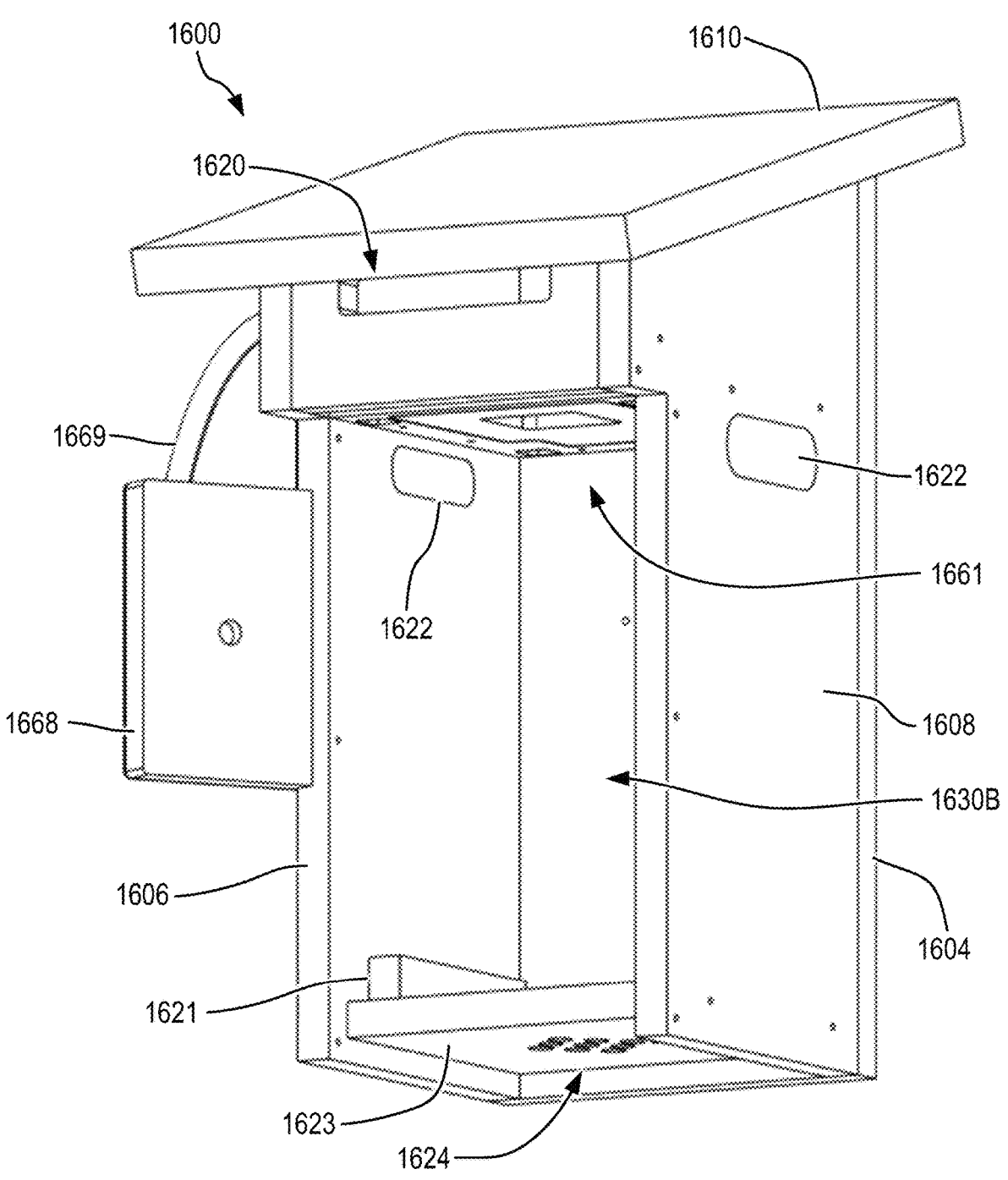
FIG. 55 is a perspective view illustrating the birdhouse of FIG. 51 where the front wall, the liner box, and the liner floor are hidden so that the internal chamber of the birdhouse can be seen in accordance with an exemplary embodiment.

FIG. 53 is a perspective view illustrating the birdhouse 1600 of FIG. 51 where the front wall 1602 is hidden so that the liner box 1652 can be seen within the nesting chamber of the birdhouse 1600, with the liner box 1652 being in a nesting configuration. FIG. 54 is a perspective view similar to FIG. 53 but where the liner box 1652 is also hidden, and FIG. 55 is a perspective view similar to FIG. 54 but where the floor 1650 that the liner box 1652 rests on is also hidden. As illustrated, the liner box 1652 can include a front opening 1660 on the front liner panel. The front opening 1660 can be identical to the front opening 1560 in the liner box 1500 of FIG. 46A.

Light windows 1622 are implemented in the left side wall 1606 and in the right side wall 1608. The light windows 1622 can be configured to enable light from outside to shine in through the light windows 1622 so that the nest chamber 1630B generally remains well-lit during daytime hours.

Without light windows 1622, the main source of light during daytime hours is through the portal within the front wall. However, when a bird is positioned proximate to the portal to block light from shining through the portal, a very low amount of light can shine into the nest chamber. As a result, any video footage obtained by a camera inside of the nest chamber can rapidly change in lighting when birds move through the portal, making the video footage difficult to see and/or difficult to interpret.

Additionally, a camera located inside of the birdhouse can be equipped with technology allowing the camera to operate in daylight and nighttime mode, and determination of whether or not the mode is daylight mode or nighttime mode can depend upon the amount of light within the nest chamber 1630B. Where this is the case and where no light windows 1622 are provided, the passage of a bird through a portal can obscure enough light so that the camera within the nest chamber 1630B will switch temporarily from daylight to nighttime mode and then back, which can be distracting and undesirable to end users recording or remotely watching the activity. Using the light windows 1622 can enable more lighting to be provided within the nest chamber 1630B during daytime hours to reduce the likelihood of these issues arising.

The light windows 1622 can be translucent rather than transparent or clear. Where light windows are made transparent or clear, this makes the light windows look like openings or portals through which a bird can enter the birdhouse 1600. Thus, a bird could try to enter the birdhouse at the light window 1622, which can harm the bird. With a translucent light window 1622, light can be provided into the nest chamber 1630B while still reducing the risk of a bird flying into the light window 1622.

Additionally, where the light windows 1622 have a sufficiently large size and a shape like a circle or a square, birds can inadvertently fly into the light windows 1622 thinking that they are a portal that the bird can fit through to enter the birdhouse 1600. Thus, designing light windows 1622 to have a size and shape that a bird would not be able to fit through (if the light windows 1622 were actually portals) can also prevent birds from inadvertently flying into the light windows.

If the light windows 1622 are too large in size or placed in the wrong location(s), then this can cause so much light to enter that it can generate unhealthy amounts of heat in a nesting chamber 1630B. Thus, the amount of heat generated in the nesting chamber 1630B can be a consideration in designing the light windows 1622 or in selecting a particular birdhouse. For example, generating a large amount of light can be beneficial to generate more heat where the birdhouse is used in very cold environments but less beneficial in very warm environments.

If the light windows 1622 are placed in the wrong location(s), then this can potentially interfere with the lens of a camera located inside the birdhouse 1600 and the camera and associated software will not render a pleasing or effective view of birds located inside the nest chamber 1630B. Light windows 1622 that are too large or placed in the wrong location(s) can cause so much light to enter and can generate so much contrast between light and dark in different sections of the interior of the birdhouse that the camera and associated software will not render a pleasing or effective view of birds located inside the nest chamber 1630B.

The position, shape, size, and transparency level of the light windows 1622 can be desirable to overcome the aforementioned issues. The light windows 1622 can be made translucent in some embodiments. The light windows 1622 can extend vertically a certain distance, with this distance being less than the distance between the top of the liner box and the very top of the nest chamber 1630B. Thus, the light windows 1622 can be positioned between the top of the liner box and the very top of the nest chamber 1630B, thereby allowing light shining through the light windows 1622 to shine into the internal volume of the liner box. This positioning can be beneficial to limit the amount of light that is absorbed by the liner panels that form the liner box, which can lead to an increase of temperature within the birdhouse without much of a corresponding increase in lighting. The light windows 1622 can also extend a certain length horizontally, but this length can be less than the full length from the front of the nest chamber 1630B to the rear of the nest chamber 1630B.

While one light window 1622 is illustrated on both the left-side wall 1606 and on the right side wall 1608, additional light windows 1622 can be provided on these walls in other embodiments.

In the birdhouse 1600, a member 1621 can rest on the bottom wall 1623 adjacent to the left-side wall 1606, and a similar member can rest on the bottom wall 1623 adjacent to the right-side wall 1608. The floor 1650 can rest on the member 1621 and the other member, and the floor 1650 can effectively serve as the barrier between a bottom chamber and a wiring chamber, with the bottom chamber being below the floor 1650 and with the wiring chamber being positioned above the floor 1650. Additionally, the liner box 1652 can be allowed to rest on the floor 1650. Also, in FIGS. 53-55, a removable panel 1661 similar to the removable panel 1424 of FIG. 45 is visible.

FIG. 56 is a perspective view illustrating the birdhouse 1600 of FIG. 51 where the front wall 1602 has been rotated about an axis A3 to expose the nesting chamber 1630B of the birdhouse 1600 and other components within the birdhouse 1600. Bottom pegs 1695A can be positioned proximate to the bottom of the right-side wall 1608 and proximate to the bottom of the left-side wall 1606. The bottom pegs 1695A can define the axis A3, and the bottom pegs 1695A can be configured to be received within corresponding holes at an end of the front wall 1602. The front wall 1602 can be configured to pivot about the axis A3 with the bottom pegs 1695A retained within the holes of the front wall 1602, with the rotation of the front wall 1602 being indicated by the arrow A4. While the arrow A4 indicates rotation in only one rotational direction, the front wall 1602 can also be configured to rotate in a rotational direction opposite to the arrow A4 so that the front door can be closed. Once in the closed position, the front wall 1602 can come in contact with the upper pegs 1695B, and the upper pegs 1695B can prevent the front wall 1602 from rotating further. Additionally, once in the closed position, a latch or another similar mechanism can be used to retain the front wall in the closed position. The latch can be similar to other rotatable latches described herein in some embodiments. The birdhouse 1600 illustrated in FIG. 56 also includes a light window 1622 on the right-side wall 1608 and on the left-side wall (not shown).

Figure 57:
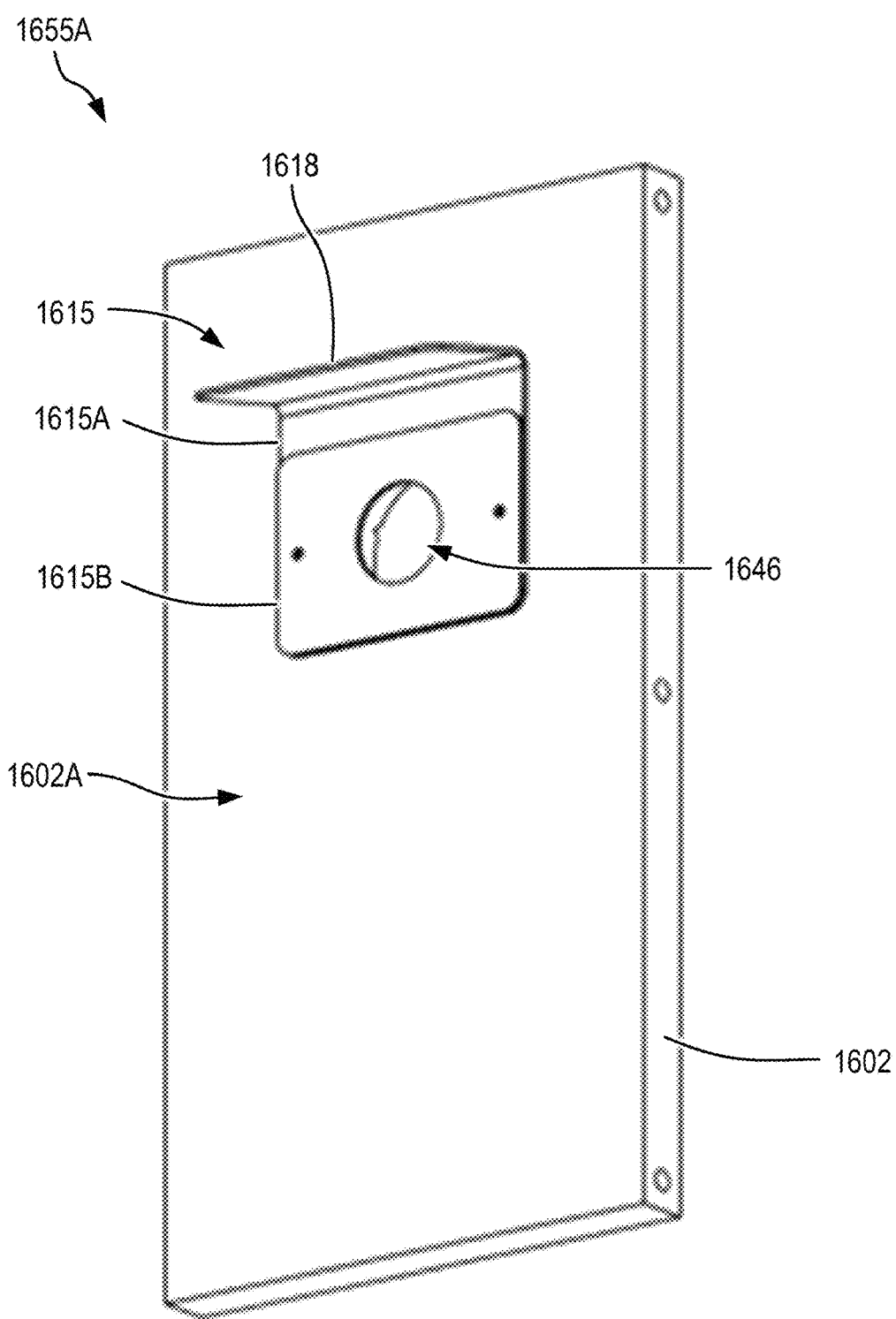
FIG. 57 is a perspective view illustrating a first side of the front wall of the birdhouse of FIG. 51 with a portal assembly attached to the first side of the front wall in accordance with an exemplary embodiment.

In various embodiments, a portal assembly 1615 can be provided that is configured to accomplish various goals. FIG. 57 is a perspective view illustrating a front wall assembly 1655A, with a first side 1602A of the front wall 1602 of the birdhouse 1600 of FIG. 51 being shown and with a portal assembly 1615 attached to the first side 1602A of the front wall 1602. In FIG. 57, the portal assembly 1615 is attached to the first side 1602A.

The portal assembly 1615 includes a base plate 1615A and a removable portal plate 1615B. The base plate 1615A can be removably attached to the first side 1602A of the front wall 1602, and the base plate 1615A can define a hole that enables access to the portal 1646. The base plate 1615A also includes a portal roof 1618, and this may be intergrally attached. The portal roof 1618 can be similar to other similar portal roofs described herein, and the portal roof 1618 can protect the portal from rainwater and other precipitation so that it does not enter the portal. The portal roof 1618 can also enable birds to stay dryer while perching at the portal 1646 to look out during periods of rain. Existing birdhouses typically do not have a roof specifically designed to cover the portal, and the portal roof 1618 can be positioned above and proximate to the portal 1646 to prevent exposure to rainwater and other precipitation even when it is approaching at an angle. Maintaining a dry nesting area is important to the health and well-being of nesting birds and their young, and the portal roof 1618 helps to accomplish this important objective.

The base plate 1615A can also be configured to receive the removable portal plate 1615B for attachment. Like the base plate 1615A, the removable portal plate 1615B can define a hole that enables access to the portal 1646. However, in some embodiments, the size or shape of the hole within the removable portal plate 1615B can be different than the size or shape of the hole within the base plate 1615A. For example, the hole within the removable portal plate 1615B can be smaller than the hole of the base plate 1615A. Thus, the size and shape of the hole for the portal 1646 can be effectively controlled by the size and shape of the hole within the removable portal plate 1615B. The use of the removable portal plate 1615B can enable the effective size and/or shape of the portal 1646 to be easily changed without requiring wholesale changes to the entire portal assembly 1615. For example, a different removable portal plate 1615B can be selected based on whether the birdhouse is intended to be used for a larger or a smaller bird, with the size and shape of the hole within the removable portal plate 1615B being the desired size and shape for the portal. By contrast, most existing birdhouses are provided with only a single portal size, which can be optimal for only a limited subset of birds who can physically enter the portal and who are inclined to nest in the birdhouse. By enabling the portal size and/or shape to be easily changed, users can easily apply different size portals to the birdhouse 1600 to have greater flexibility with regard to the birds that will be attracted to use the birdhouse 1600. The removable portal plate 1615B can allow this to be accomplished in a cost-effective manner.

Figure 58:
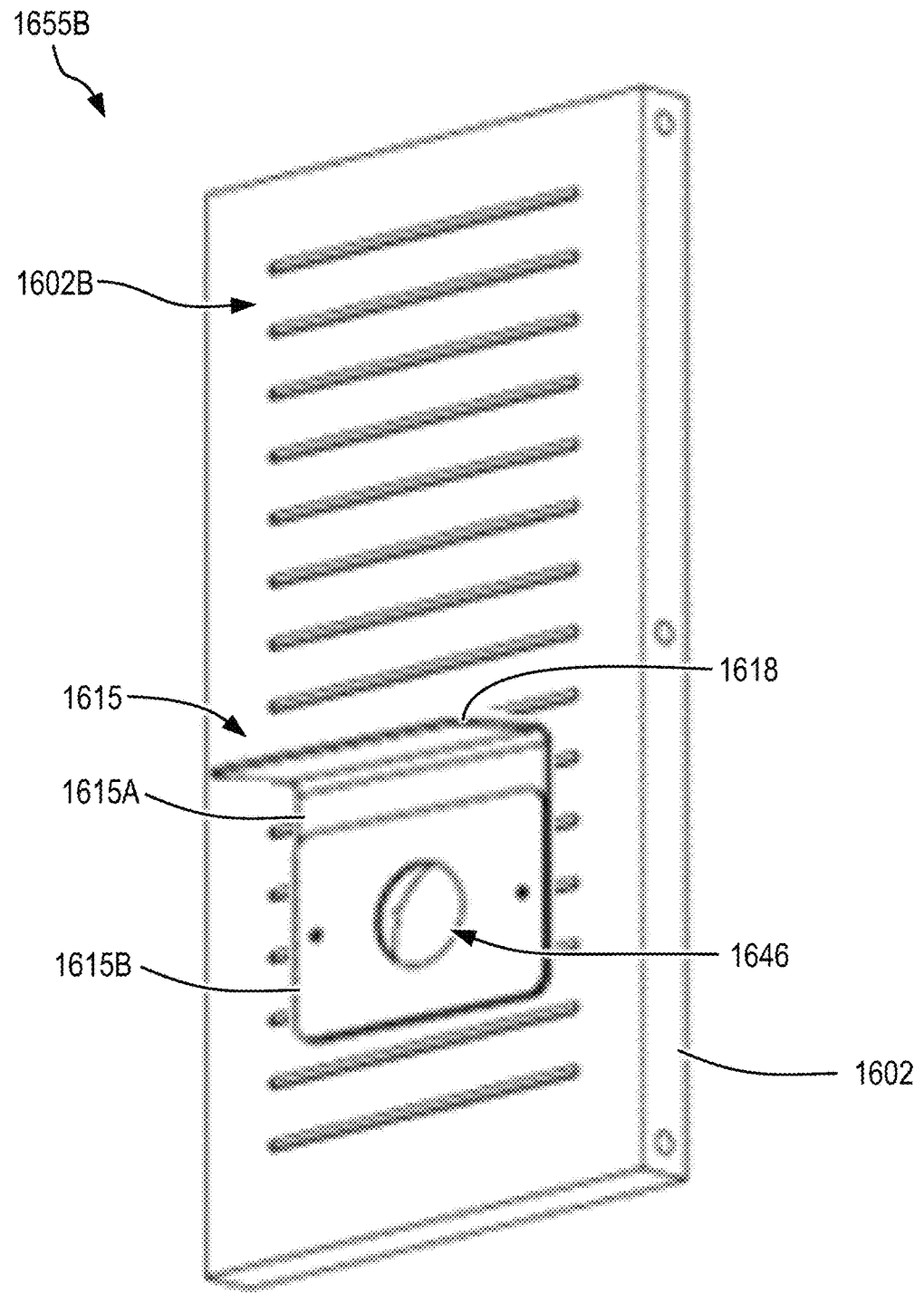
FIG. 58 is a perspective view illustrating a second side of the front wall of FIG. 57 where the portal assembly is attached to the second side of the front wall in accordance with an exemplary embodiment.

In FIG. 58, a front wall assembly 1655B is illustrated, with this front wall assembly 1655B including the same portal assembly 1615 and front wall 1062 present in FIG. 57. However, in FIG. 58, the portal assembly 1615 is attached to the second side 1602B of the front wall 1602. The front wall 1602 is flipped so that the portal 1646 is positioned closer to the bottom of the front wall 1602 relative FIG. 57.

Figure 43:
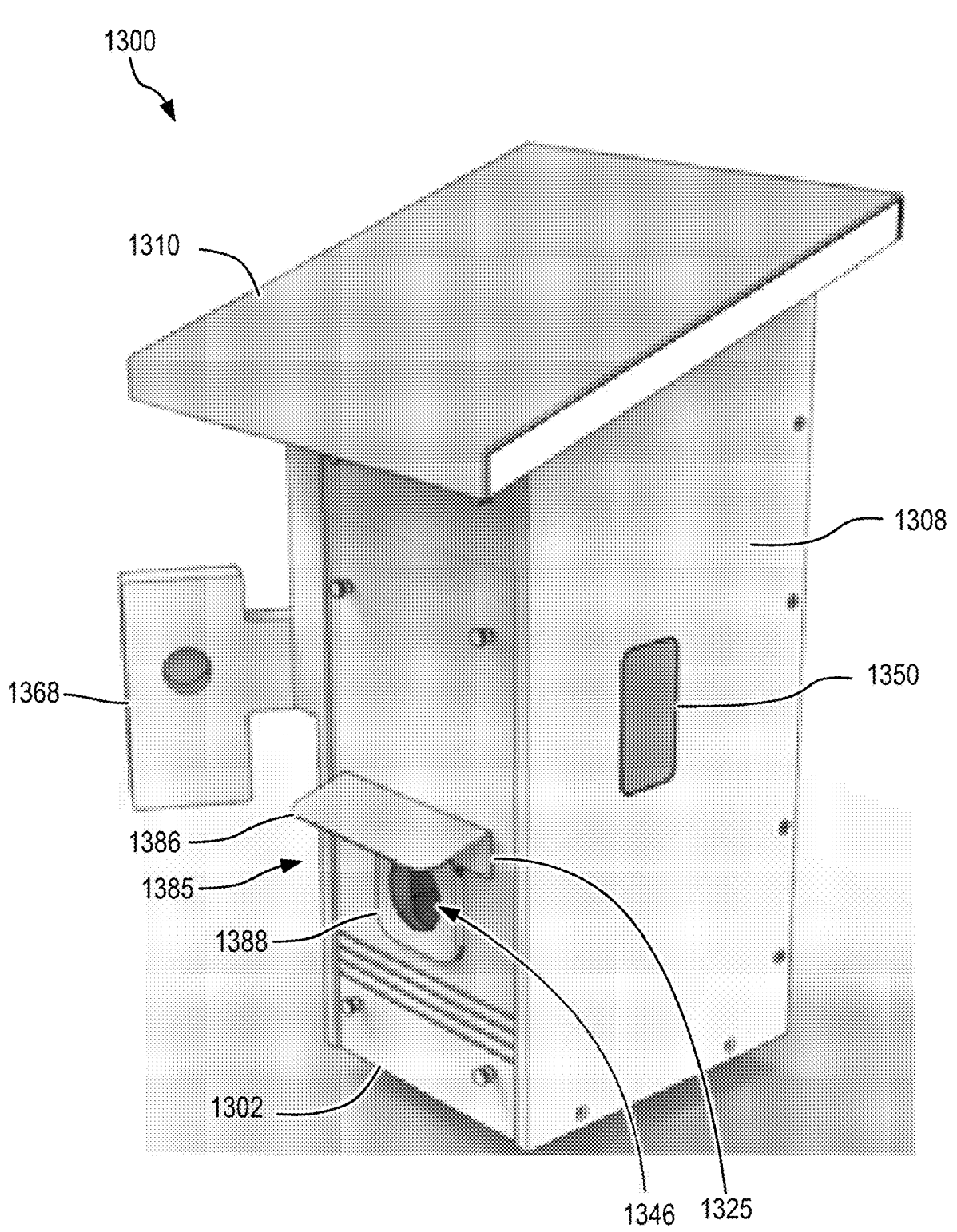
FIG. 43 is a perspective view illustrating another example birdhouse with a portal assembly having a portal roof in accordance with an exemplary embodiment.

Looking now at FIG. 43, a perspective view illustrating another example birdhouse 1300 with a portal assembly 1385 is illustrated having a portal roof 1386. The birdhouse 1300 is similar to other birdhouses described herein. The birdhouse 1300 includes a front wall 1302, a right-side wall 1308 having a light window 1350 positioned on the right-side wall 1308, top wall 1310, and an external camera platform 1368, and each of these components can be similar or identical to corresponding components described elsewhere herein.

The portal assembly 1385 comprises a base plate 1325 and a removable portal plate 1388, with the portal roof 1386 being integrally attached to the base plate 1325. In the portal assembly 1385, the effective size of the portal 1346 can be larger than the effective size of the portal 1646 of FIG. 57 as the size of the hole within the removable portal plate 1388 is relatively large in size.

Figure 44:
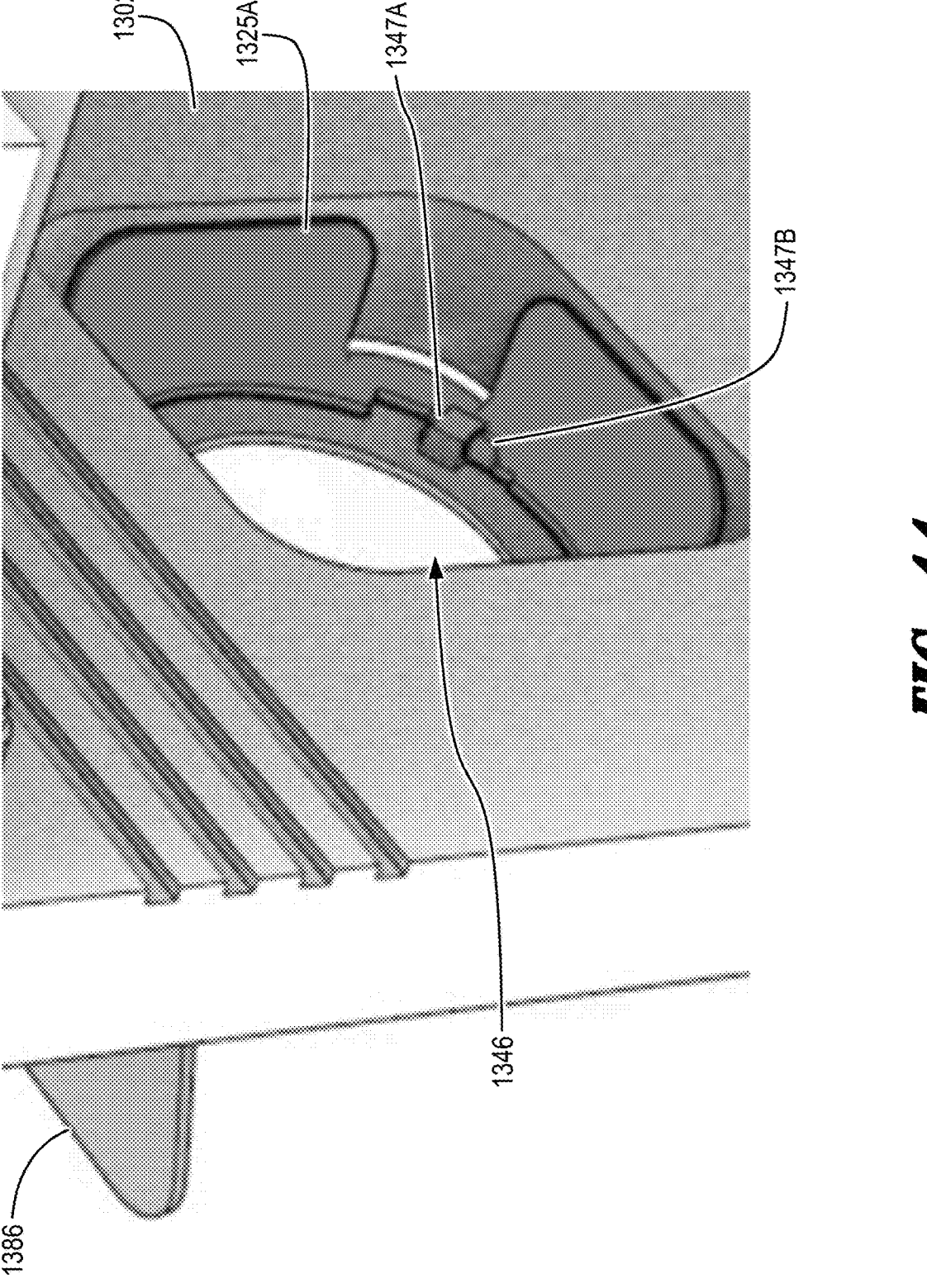
FIG. 44 is an enhanced, perspective view of the birdhouse of FIG. 43 where interlocking components are illustrated that are configured to enable the attachment of the adjustable portal cover to the remainder of the birdhouse in accordance with an exemplary embodiment.

FIG. 44 is an enhanced, perspective view of the birdhouse 1300 of FIG. 43 where interlocking components are illustrated. FIG. 44 illustrates a view looking from the inside of the birdhouse 1300 to a location outside of the portal 1346. A first interlocking component 1347A is positioned on the member 1325A that forms a part of the base plate 1325. A second interlocking component 1347B is positioned on the portal plate 1388. The first interlocking component 1347A and the second interlocking component 1347B can be snap fit members, a tabs, etc. that are configured to engage each other so that the member removable portal plate 1388 can be attached to the base plate 1325.

Figure 59:
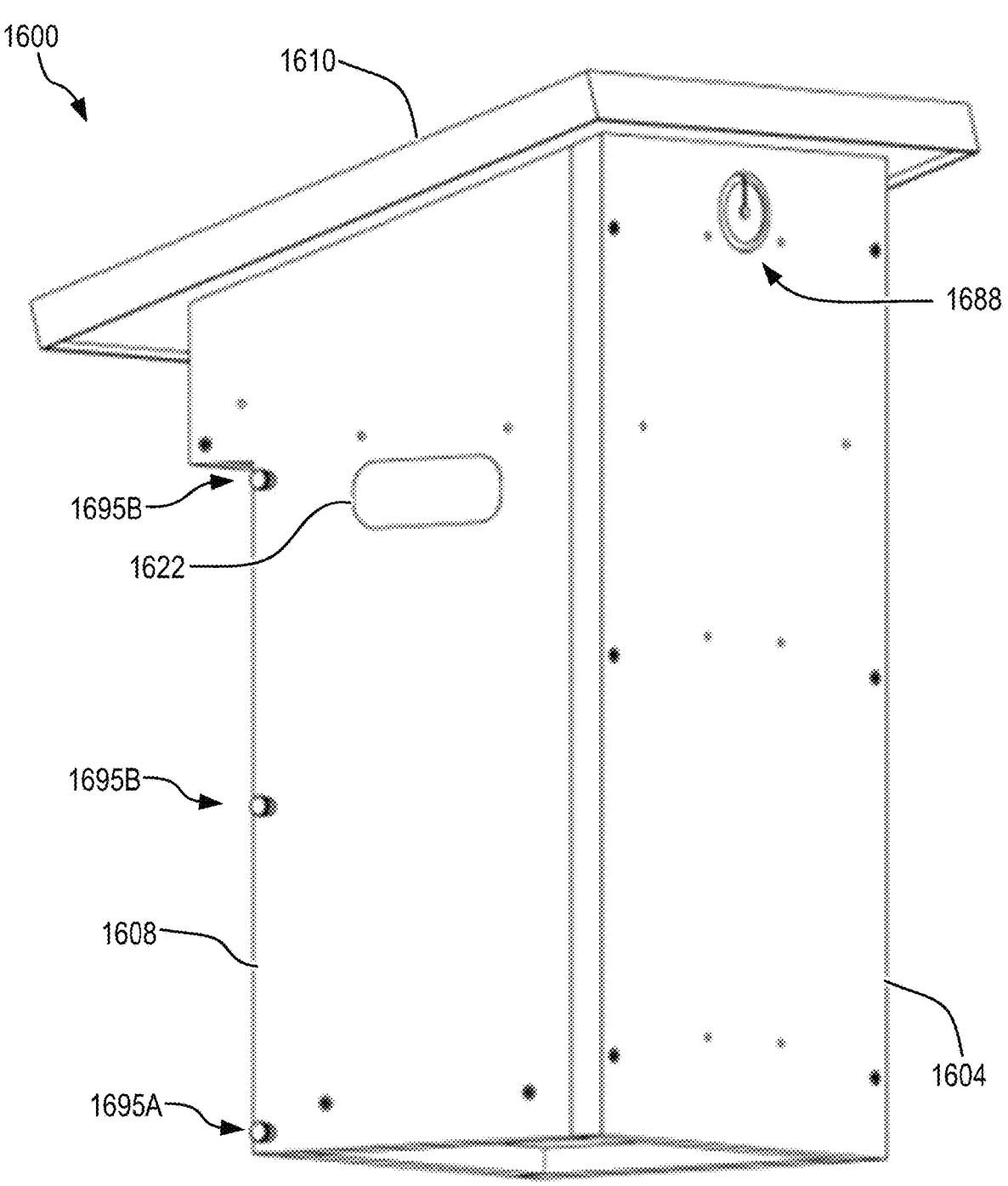
FIG. 59 is a rear, perspective view illustrating the birdhouse of FIG. 51 where a cord access port is visible on the rear wall in accordance with an exemplary embodiment.

Looking now at FIG. 59, a rear, perspective view illustrating the birdhouse 1600 of FIG. 51 is presented where a cord access port 1688 is visible on the rear wall 1604. The cord access port 1688 can be similar to the cord access port 1420 of FIG. 45 and other cord access ports described herein. The cord access port 1688 can be positioned proximate to a wiring chamber within the birdhouse 1600, but the cord access port 1688 can be positioned at other locations in other embodiments. For example, a cord access port similar to cord access port 1688 can be positioned proximate to the bottom chamber within the birdhouse 1600. The cord access port 1688 is also defined at the rear wall 1604. The cord access port 1688 provides a location where cables, wires, cords, etc. can be permitted to extend from outside the birdhouse 1600, through the cord access port 1688, and into the wiring chamber of the birdhouse 1600.

Figure 60:
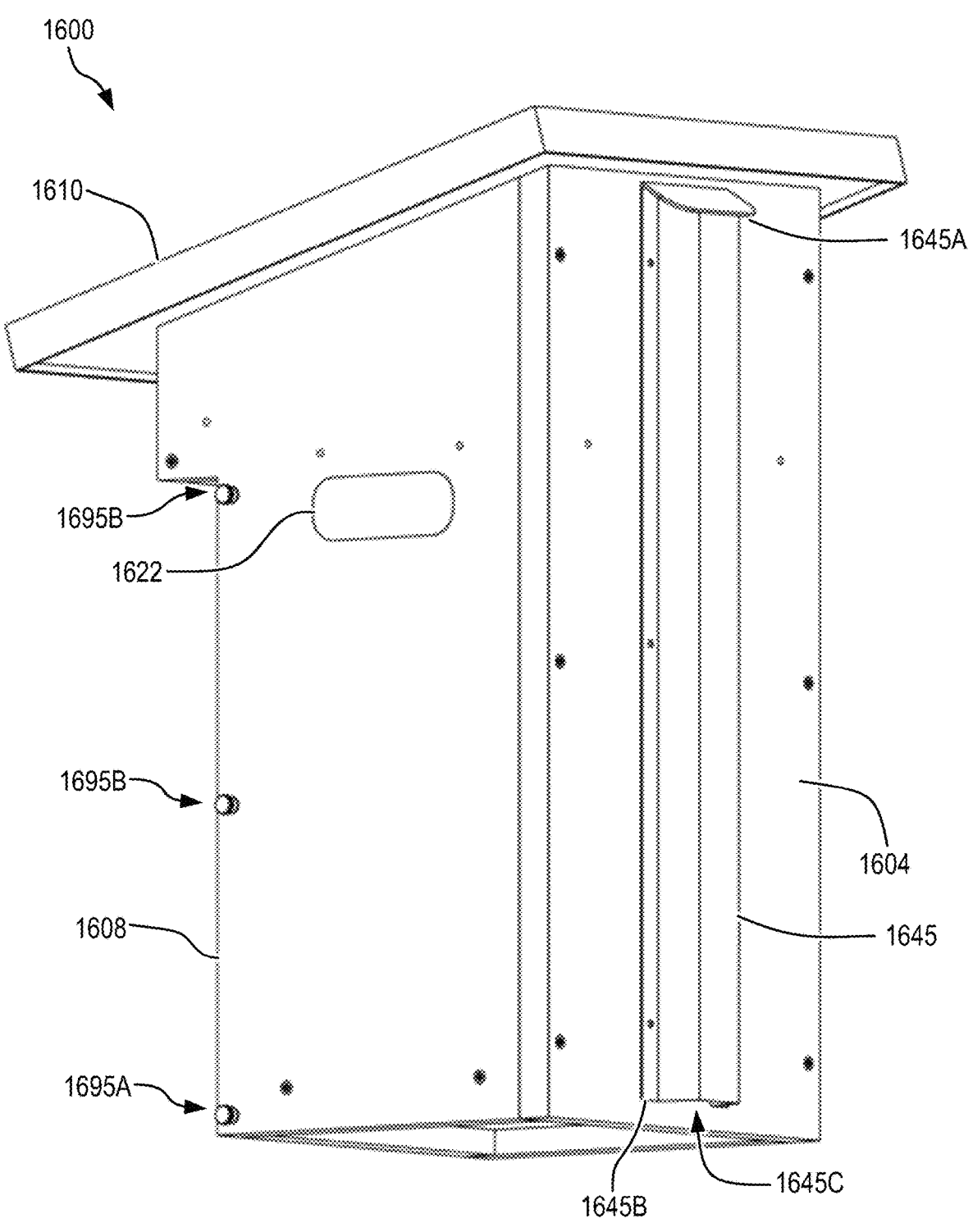
FIG. 60 is a rear, perspective view illustrating the birdhouse of FIG. 59 where a cord concealing spine is attached to the rear wall in accordance with an exemplary embodiment.

FIG. 60 is a rear, perspective view illustrating the birdhouse 1600 of FIG. 59 where a cord concealing spine 1645 is attached to the rear wall 1604. The cord concealing spine 1645 comprises attachment portions 1645B which extend out towards the sides of the cord concealing spine 1645. The attachment portions 1645B can extend in the same plane and can rest against the surface of the rear wall 1604. When the cord concealing spine 1645 is attached to the rear wall 1604, an interior channel 1645C is defined between the cord concealing spine 1645 and the attachment portions 1645B. The cord concealing spine 1645 also includes a top cover 1645A. The top cover 1645A can be configured to cover the cord concealing spine 1645 and to prevent rainwater and other precipitation from entering the interior channel 1645C, thereby protecting any cables, wires, cords, etc. positioned within the interior channel 1645C. The top cover 1645A can be sloped at an angle as illustrated in FIG. 60 so that rainwater and any other precipitation is deflected away from the cord concealing spine 1645. The cord concealing spine 1645 of FIG. 60 can be positioned relative to the cord access port 1688 of FIG. 59 so that cables, wires, cords, etc. can extend directly from the wiring chamber within the birdhouse 1600 through the cord access port 1688 and into the interior channel 1645C defined by the cord concealing spine 1645 without exposing the cables, wires, cords, etc. to rainwater, precipitation, and other elements.

The cord access port 1688, the cord concealing spine 1645, and/or the back surface(s) of the rear wall 1604 of the birdhouse 1600 can be designed so that any such extension cord can be present and the birdhouse 1600 can still sit flush against a solid wall, post, or pole. The cord concealing spine 1645 can optionally be provided with a modular design that allows a birdhouse to be mounted to flat surface (e.g., a post or a wall) or a cylindrical surface (e.g., a tree or a cylindrical pole). Additionally, the cord access port 1688 and the cord concealing spine 1645 can be configured to limit the amount of water entering a wiring chamber. The cord access port 1688 and other cord access ports described herein can be configured to seal the hole around the perimeter of whatever electrical cords are used to help form an effective seal regardless of the size of the electrical cords. This can help to prevent insects, water, moisture, etc. from entering into the wiring chamber.

Predators routinely try to visit birdhouses and can try to enter a portal of the birdhouse. Predators can also attempt to climb or scale the post to which the birdhouse is mounted. Having a means by which a predator can be prevented from climbing/scaling above a certain point will help nesting birds avoid disruption of their nesting process, and this can also reduce the risk of eggs and hatchlings being destroyed.

Figure 61:
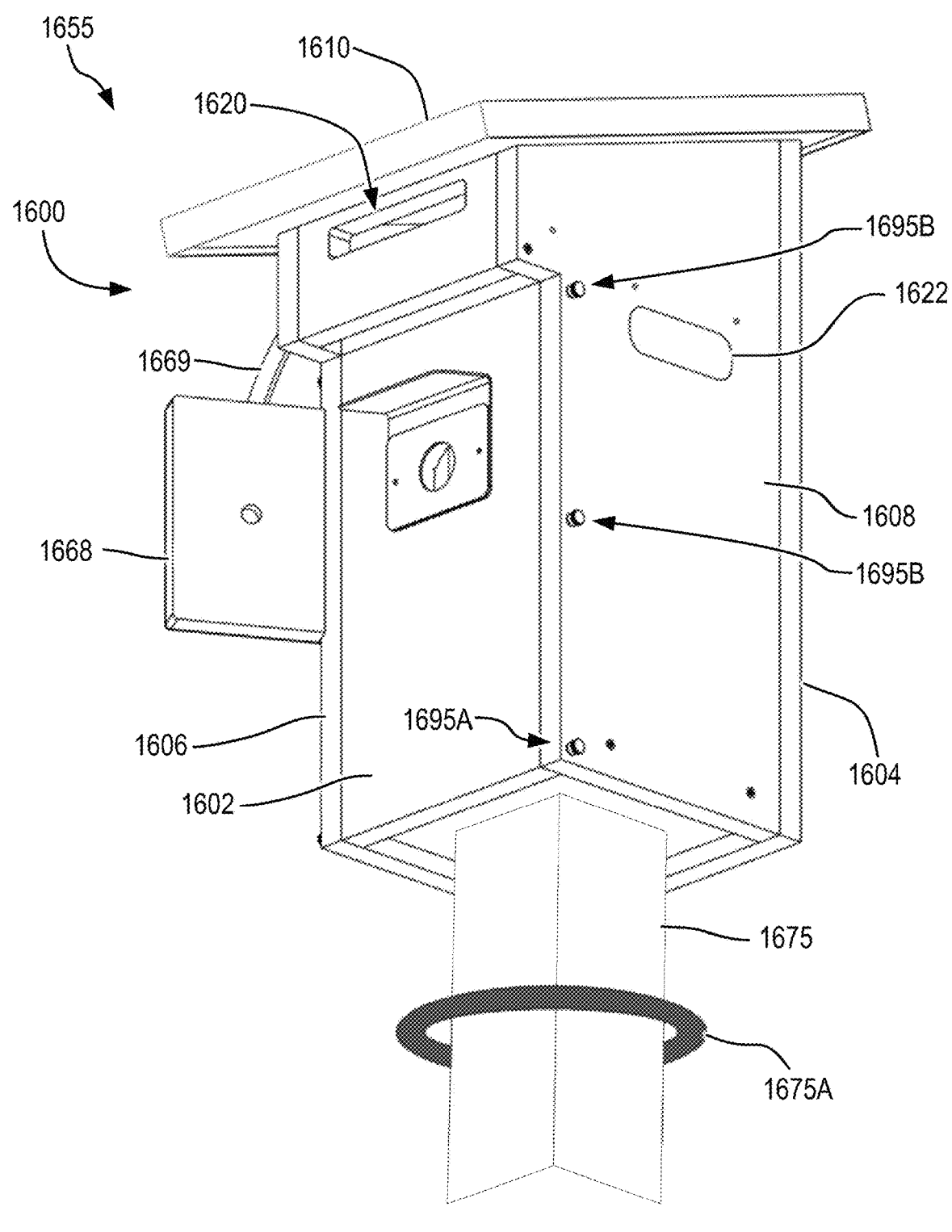
FIG. 61 is a perspective view illustrating the birdhouse of FIG. 51 where the birdhouse is attached on a post and a sensor positioned on the post in accordance with an exemplary embodiment.

FIG. 61 is a perspective view illustrating an assembly 1655 including the birdhouse 1600 of FIG. 51 where the birdhouse 1600 is attached on a post 1675 and an intruder rejection device 1675A is positioned on the post 1675. The intruder rejection device 1675A can comprise a sensor and an indicator (e.g., a light, a speaker, a buzzer, an actuatable arm, etc.). The sensor within the intruder rejection device 1675A be sensitive to the weight of the predator. The sensor can be a pressure sensor, a weight sensor, or some other kind of sensor. If a predator attempts to climb or scale the post 1675, then the predator will eventually come in contact with the intruder rejection device 1675A. Once the predator comes in contact with the intruder rejection device 1675A, the weight of the predator will pull down on the intruder rejection device 1675A, activating the indicator within the intruder rejection device 1675A. Where the indicator is a light, the light can turn on, can turn to a different color, can flash in certain intervals or strobe flash patterns, etc. As another example, where the indicator is a speaker or the buzzer, the speaker or the buzzer can emit an alarm sound. As another example, the actuatable member can be moved activation of the sensor. The actuatable member can move around to contact the predator and prevent the predator from climbing or scaling the post 1675 past the intruder rejection device 1675A. Additionally or alternatively, the intruder rejection device 1675A can be rotated or moved upon activation of the sensor, thereby preventing the predator from climbing or scaling the post 1675 past the intruder rejection device 1675A. The birdhouse 1600 can be attached to posts of various shapes and sizes, and the birdhouse 1600 can be easily attached to new posts without requiring the birdhouse 1600 itself to be disassembled. The intruder rejection device 1675A can be utilized with a wide variety of different birdhouses.

Figure 62:
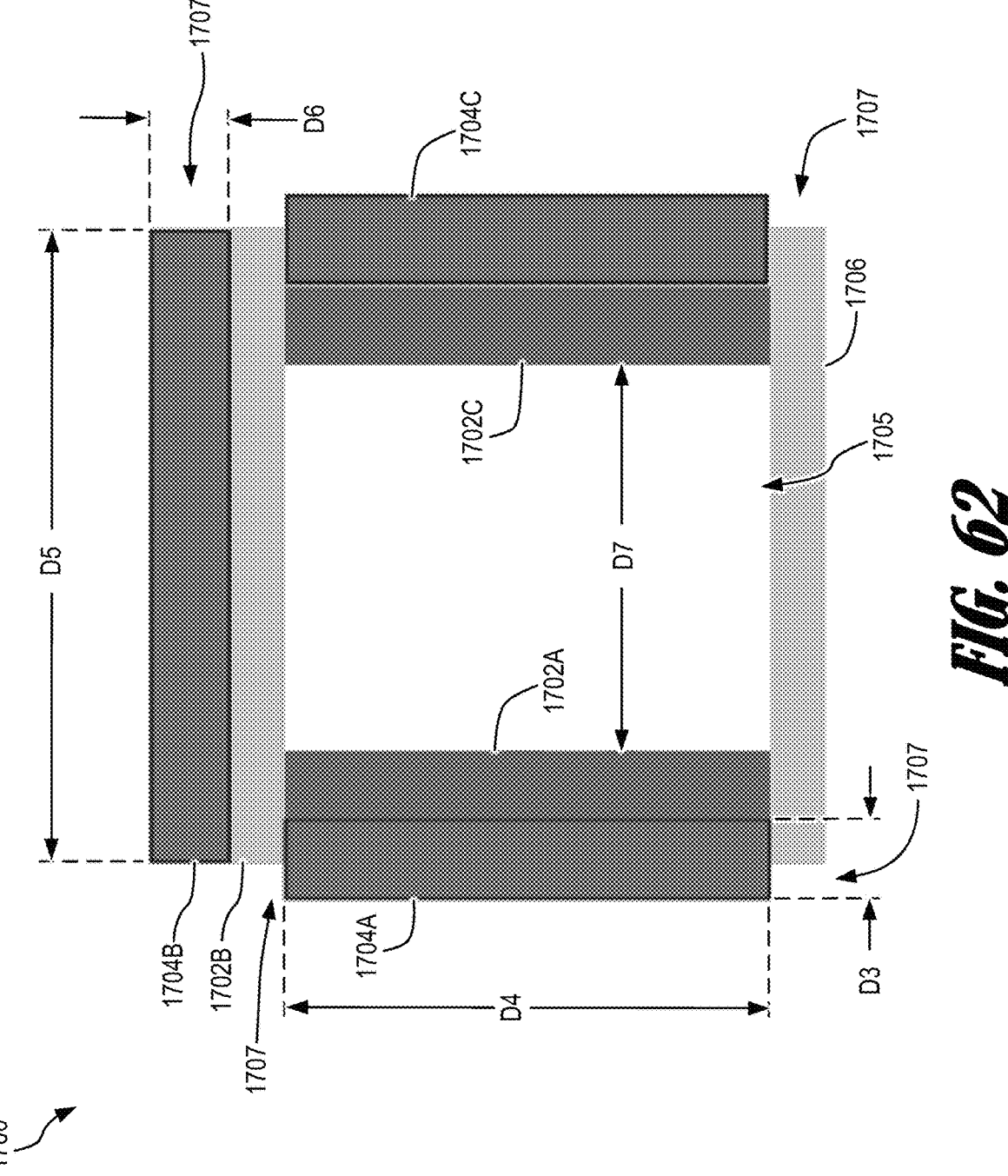
FIG. 62 is a top, schematic view illustrating another example liner box having various spacers that are configured to create air gaps when the liner box is positioned within a birdhouse in accordance with an exemplary embodiment.

FIG. 62 is a top, schematic view illustrating another example liner box 1700 having various spacers 1704A, 1704B, 1704C that are configured to create air gaps when the liner box 1700 is positioned within a birdhouse. The spacers 1704A, 1704B, 1704C are also beneficial to prevent large gaps from being present between the external surfaces of the walls of the liner box 1700 and the internal surfaces of the walls within the nest chamber of a birdhouse, and doing so can prevent small birds or baby birds from falling down into these large gaps.

In addition to the spacers 1704A, 1704B, 1704C, the liner box 1700 includes a side panel 1702A, a back panel 1702B, a side panel 1702C, and a front panel 1706. The side panels 1702A, 1702C extend parallel to each other, the front panel 1706 and the back panel 1702B extend parallel to each other, and the side panels 1702A, 1702C extend perpendicularly relative to the front panel 1706 and the back panel 1702B. The spacers 1704A, 1704B, 1704C are each positioned outwardly relative to the panels 1702A-1702C, and the panels 1702A-1702C and the front panel 1706 can surround the internal volume 1705 of the liner box 1700. The liner box 1700 can optionally include a bottom wall, which is not shown. The bottom wall can be attached to the end of the panels 1702A-1702C and the front panel 1706, and the bottom wall can extend in a plane that is parallel to the cross-sectional plane shown in FIG. 62.

The spacers 1704A, 1704B, 1704C can be configured to leave gaps 1707 between the liner box 1700 and the internal walls of a birdhouse when the liner box 1700 is received within a nest chamber of a birdhouse. Each of the gaps 1707 are positioned at the corners of the nest chamber. The dimensions of the spacers 1704A, 1704B, 1704C can be adjusted to change the size of the gaps 1707 that are formed. The size of the gaps 1707 can adjust the amount of airflow that is permitted around the liner box 1700 and within the birdhouse.

In FIG. 62, the spacer 1704A defines a thickness D3 and a length D4. The spacer 1704C can possess dimensions that are identical to the dimensions for the spacer 1704A. The thickness D3 can be about 0.75 inches in some embodiments, but the thickness D3 can range from about 0.25 inches to about 2 inches or from about 0.5 inches to about 1 inch in other embodiments. The length D4 can be about 4 inches in some embodiments, but the length D4 can range from about 3 inches to about 10 inches in some embodiments. However, the dimensions D3 and D4 can be different in other embodiments.

The spacer 1704B also defines a length D5 and a thickness D6. The length D5 can be about 6.5 inches in some embodiments, but the length D5 can instead range from about 4 inches to about 12 inches in other embodiments. The thickness D6 can be about 1.25 inches in some embodiments, but the thickness D6 can range from about 0.25 inches to about 2 inches or from about 0.5 inches to about 1 inch in other embodiments. However, the dimensions D5 and D6 can be different in other embodiments.

In the illustrated embodiment, the internal volume 1705 defines a length that corresponds to the length D4, and the internal volume 1705 defines a width D7. The width D7 is about 4 inches so that the internal volume defines a cross-sectional area that is about 4 inches by 4 inches, but the internal volume 1705 can possess different dimensions in other embodiments.

Figure 63:
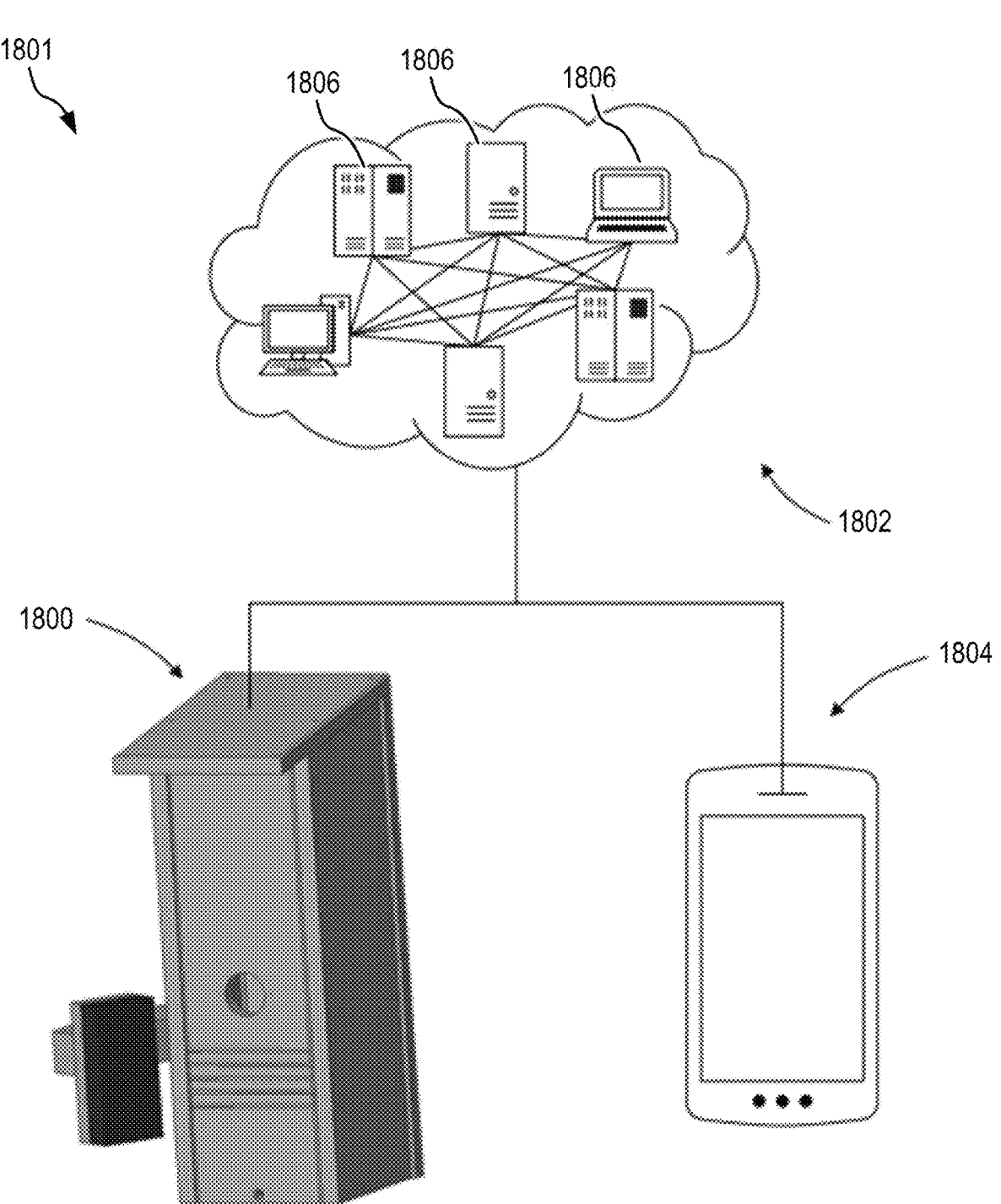
FIG. 63 schematically illustrates a system wherein a cloud computing environment is in communication with a smartphone and with cameras of the birdhouse in accordance with an exemplary embodiment.
Figure 64:
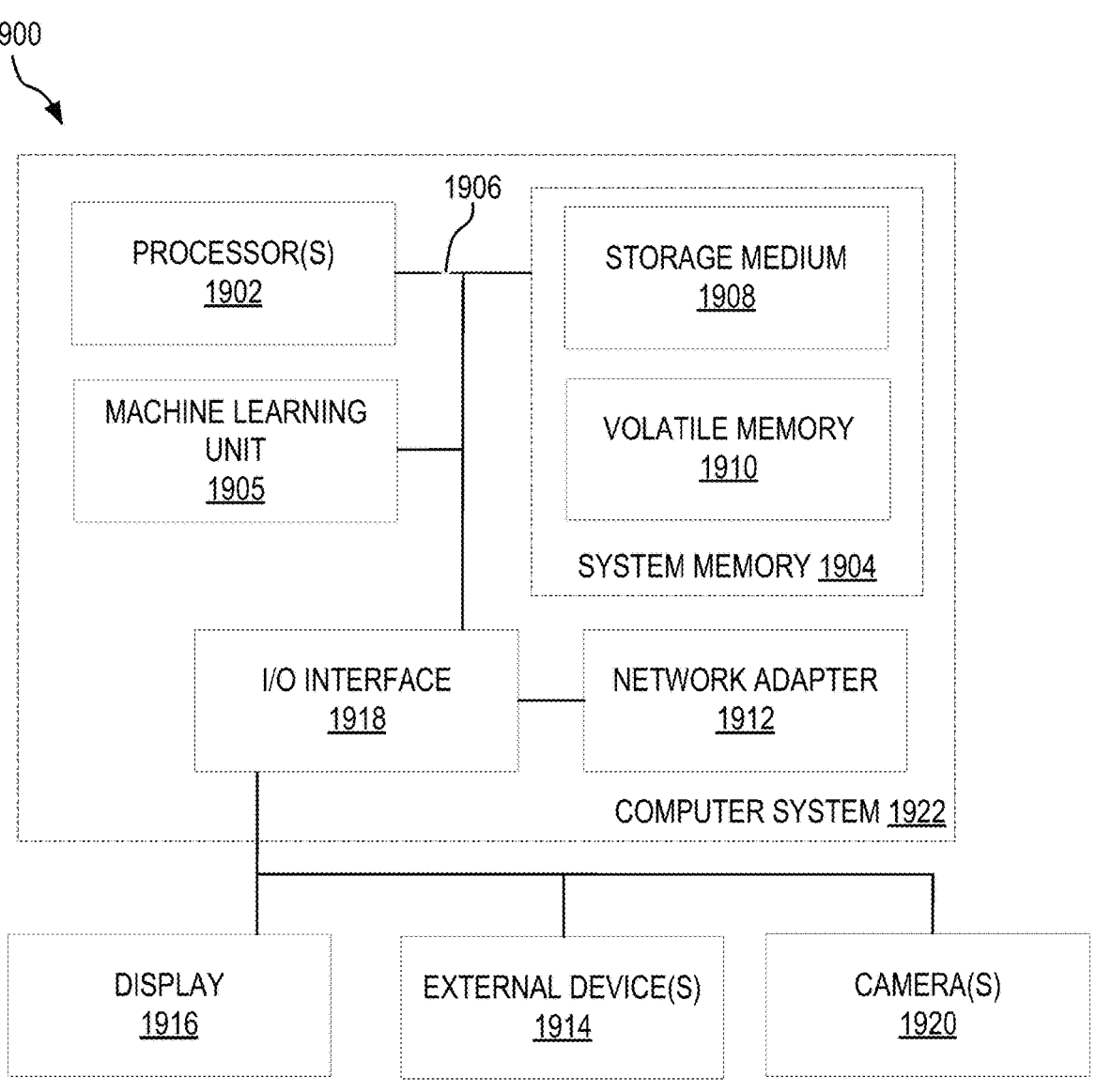
FIG. 64 schematically illustrates a computer system connected to other components in accordance with an exemplary embodiment.

Referring now to FIGS. 63 and 64, systems for monitoring birds is shown in accordance with an exemplary embodiment. The system 1801 of FIG. 63 includes the birdhouse 1800, a computer system 1804, and a cloud computing environment 1802. The cloud computing environment 1802 can comprise various nodes 1806. These nodes 1806 can be an electronic device that is attached to a network. A computer system 1804 can be any system/device capable of receiving, processing, and/or sending data. Examples of computer systems include, but are not limited to personal computers, servers, hand-held computer devices, tablets, smart phones, multiprocessor-based systems, mainframe computer systems, and distributed cloud computing environments that include any of the above systems and the like. While the computer system 1804 is depicted as a smartphone, the computer system 1804 can be any type of computer system (e.g., laptop, personal computer, server, etc.).

As shown in FIG. 64, the computer system 1922 includes one or more processors or processing units 1902, a system memory 1904, and a bus 1906 that couples various components of the computer system 1922 including the system memory 1904 to the processor(s) 1902.

The system memory 1904 includes a computer readable storage medium 1908 and volatile memory 1910 (e.g., Random Access Memory, cache, etc.). As used herein, a computer readable storage medium includes any media that is capable of storing computer readable program instructions and is accessible by a computer system. The computer readable storage medium 1908 includes non-volatile and non-transitory storage media (e.g., flash memory, read only memory (ROM), hard disk drives, etc.). Computer readable program instructions (e.g., computer readable code) as described herein include program modules (e.g., routines, programs, objects, components, logic, data structures, etc.) that are executable by a processor. Furthermore, computer readable program instructions, when executed by a processor, can direct a computer system (e.g., the computer system 1804) to function in a particular manner such that a computer readable storage medium (e.g., the computer readable storage medium 1908) comprises an article of manufacture. The computer readable program instructions can be configured, when executed, to cause the processor(s) 1902 to carry out the methods described herein.

The bus 1906 can be one or more of any type of bus structure capable of transmitting data between components of the system 1900 (e.g., a memory bus, a memory controller, a peripheral bus, an accelerated graphics port, etc.).

In some embodiments, as depicted in FIG. 64, the system 1900 can include one or more external devices 1914 and a display 1916. As used herein, an external device includes any device that allows a user to interact with a computer system (e.g., mouse, keyboard, touch screen, user interface, etc.). External device(s) 1914 and the display 1916 can be in communication with the processor(s) 1902 and the system memory 1904 via an Input/Output (I/O) interface 1918. External device(s) 1914 can include the cloud computing environment 1802 of FIG. 63 in some embodiments.

The display 1916 can display a graphical user interface (GUI) that can include a plurality of selectable icons and/or editable fields. A user can use an external device 1914 (e.g., a mouse) to select one or more icons and/or edit one or more editable fields. Selecting an icon and/or editing a field can cause the processor(s) 1902 to execute computer readable program instructions stored in the computer readable storage medium 1908.

The processor(s) 1902 and processors used in other embodiments can be any means configured to execute various programmed operations or instructions stored in a memory device (e.g., system memory 1904) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 1902 and other processors as described herein.

The techniques described above and below can be implemented, for example, in hardware, one or more computer programs tangibly stored on one or more computer-readable media, firmware, or any combination thereof. The techniques described herein can be implemented in one or more computer programs executing on (or executable by) a programmable computer or electronic or computing device having any combination of any number of the following: a processor, a storage medium readable and/or writable by the processor (including, for example, volatile and non-volatile memory and/or storage elements and non-transitory mediums), an input device, an output device, a display, and the like. Program code can be applied to input(s) entered using the input device to perform the functions described herein and to generate output(s) using the output device.

The computer system 1922 can further include a network adapter 1912 which allows the computer system 1922 to communicate with one or more other computer systems/devices via one or more networks (e.g., a local area network (LAN), a wide area network (WAN), a public network (the internet), etc.). The system 1900 can also include one or more cameras 1920, and the camera(s) 1920 can be similar to the camera 154, the camera 184, and other cameras described herein. The camera(s) 1920, the computer system 1922, and the cloud computing environment 1802 can be connected to and in communication with one another when the camera(s) 1920, the computer system 1922, and the cloud computing environment 1802 are connected to the same network (e.g., via the internet).

In some embodiments, a node 1806 of the cloud computing environment 1802 is connected to and receives a video stream from the camera(s) 1920 and can save the video within a computer readable storage medium. A user of a computer system 1922 can access and play the video stored in the node 1806 via an app stored locally on the computer system 1922 or can access the video via an internet browser. In some embodiments the video can be a live stream and a user of the computer system 1922 can access the live stream to view a real-time video of the birdhouse 1800. In other embodiments, the computer system 1922 can directly connect to and receive a live stream from the camera(s) 1920.

Figure 65:
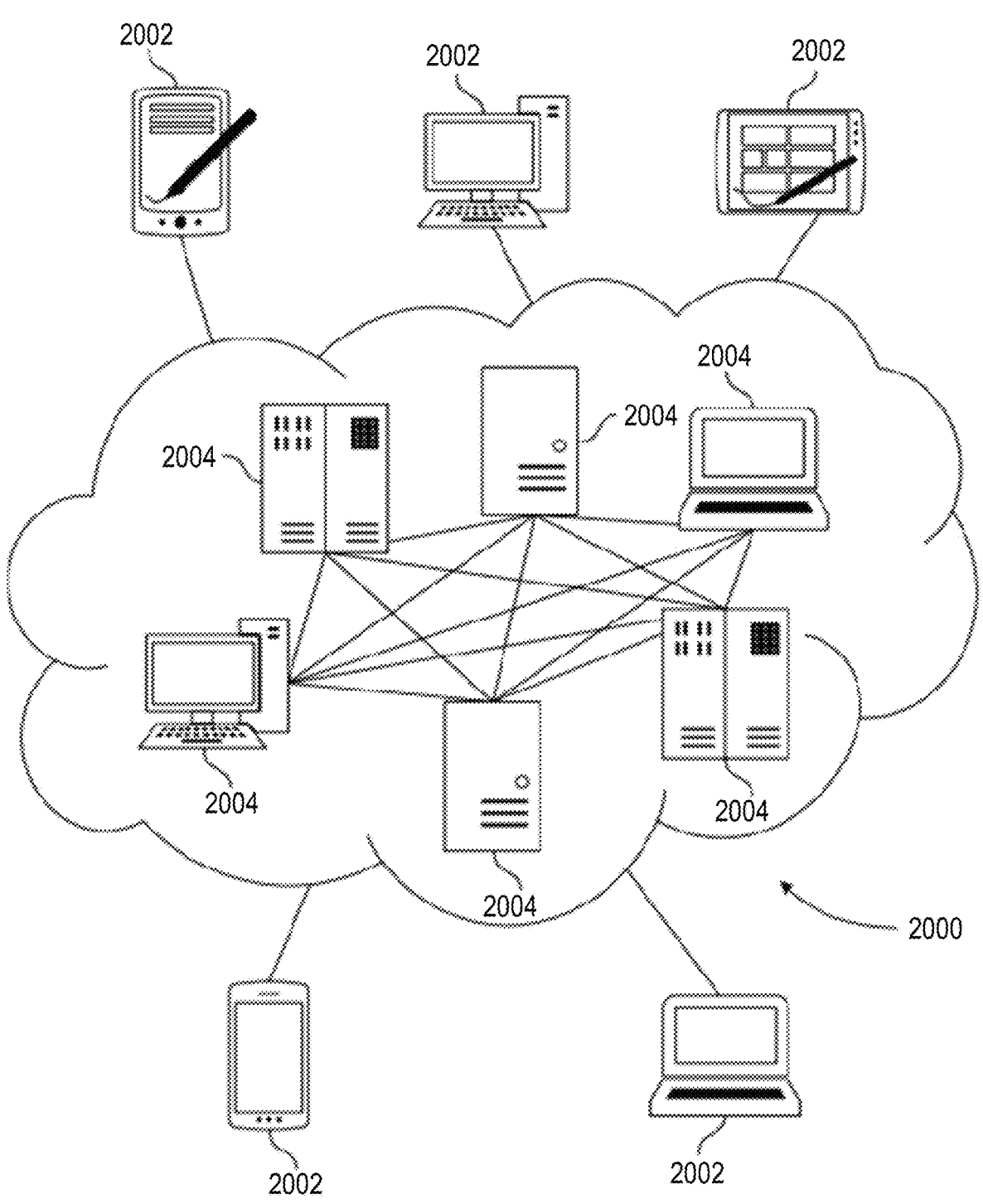
FIG. 65 schematically illustrates a cloud computing environment in accordance with an exemplary embodiment.

With reference to FIG. 65, the cloud computing environment 2000 connected to one or more user computer systems 2002 is depicted in accordance with an exemplary embodiment. The cloud computing environment 2000 can be similar to the cloud computing environment 1802 of FIG. 63. The cloud computing environment 2000 can provide network access to shared computer resources (e.g., storage, memory, applications, virtual machines, etc.) to the one or more user computer systems 2002. In one embodiment, the computer system 1922 is a user computer system 2002 that is connected to the cloud computing environment 2000. As depicted in FIG. 65, the cloud computing environment 2000 includes one or more interconnected nodes 2004. Each node can be a computer system or device with local processing and storage capabilities. The nodes 2004 can be grouped and in communication with one another via one or more networks. This allows the cloud computing environment 2000 to offer software services to the one or more user computer systems 2002 and as such, a user computer system 2002 does not need to maintain resources locally.

Figure 66:
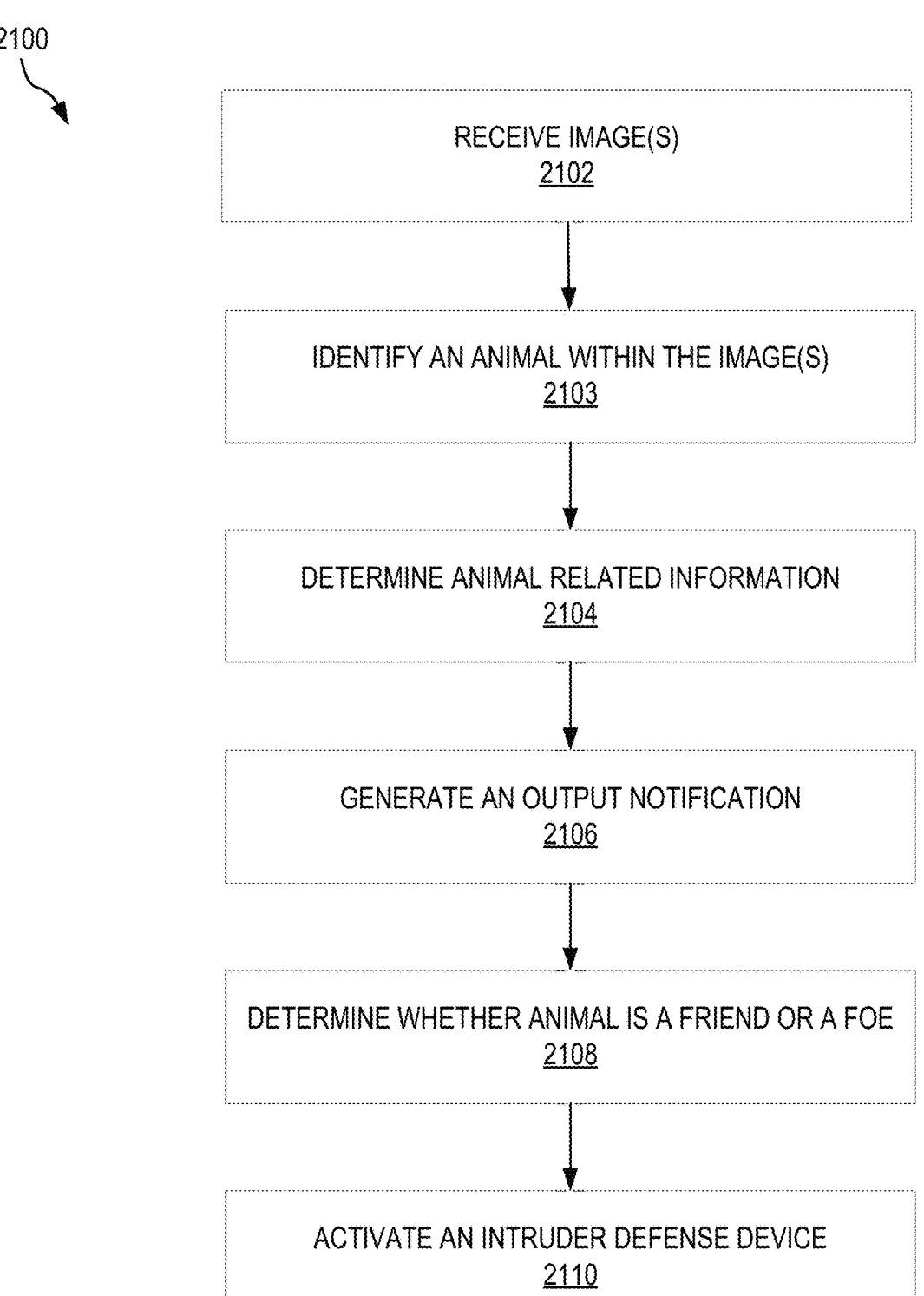
FIG. 66 is a flow chart of a method for monitoring birds in accordance with an exemplary embodiment.

In one embodiment, a node 2004 includes a system memory that includes computer readable program instructions for carrying the method 2100 of FIG. 66. In this embodiment, a user of a user computer system 2002 (which can be similar to the computer system 1922) that is connected the cloud computing environment 2000 can cause a node 2004 to execute the computer readable program instructions to carry out the method 2100.

Referring now to FIG. 66, a flow chart is illustrated for a method 2100 for monitoring birds in accordance with an exemplary embodiment. Steps of the method 2100 can be stored as computer readable program instructions in a computer readable storage medium (e.g., a computer readable storage medium of a node 2004 within the cloud computing environment 2000 of FIG. 65). A processor (e.g., a processor of a node 2004) can be configured to execute the computer readable program instructions for the method 2100.

At operation 2102, the processor receives images, which can be frames within a video feed (e.g., a live video stream). The processor can also be configured to receive corresponding audio at operation 2102. Audio and/or video can be received from a camera and/or a microphone associated with the camera. The image(s) that are received can be received from an internal camera within a birdhouse or from an external camera that is positioned outside of a birdhouse.

At operation 2103, an animal can be identified within the image(s) received at operation 2102. The animal can be identified using image processing techniques, and the machine learning unit 1905 (see FIG. 64) or other processor(s) can be configured to assist in performing the image processing techniques to identify the animal within the image(s). In some embodiments, animals can be identified based on movement of the animals relative to others within the external environment—where this is the case, the animals can be distinguished from the external environment based on their movement from frame to frame within the image(s). Additionally, in some embodiments, the animals can be identified based on their shape, size, or color or based on their other properties.

At 2104, animal related information can be determined, and the animal related information can be determined using the machine learning unit 1905 (see FIG. 64) or other processor(s). The received video and audio can be analyzed to determine animal related information within the video. Animal related information includes, but is not limited to, a presence of a bird or another animal, a presence of a bird or another animal within a nest chamber, a number of full body bird visits within a nest chamber, a number of bird head peeks within a nest chamber, a nest building activity within a nest chamber, a portal visit (e.g., a bird perched on the portal 142), egg laying within a nest chamber, a number of eggs within a nest in a nest chamber, a brooding period, a number of hatchlings within a nest chamber, a number of offspring survival, fledging activity withing a nest chamber, a feeding activity within the nest chamber, predator activity, etc. In some embodiments in response to determining a presence of an animal within the image, the processor(s) and/or the machine learning unit 1905 can also determine what species the animal is. The processor(s) and/or the machine learning unit 1905 can execute image and audio recognition software that is stored as computer readable instructions in a storage medium of a node 2004 to determine the animal related information within the received image. The processor(s) and/or the machine learning unit 1905 can further determine the animal related information based on a user input. For example, a user of the computer system 1900 can access the video received by the processor as previously discussed herein and identify animal related information and input animal related information into a graphical user interface provided by the computer system 1900. In response to receiving the animal related information, the processor sends a signal indicative of the input information to the cloud computing environment 2000 which associates the input with the saved video. In some embodiments, the input animal related information can include personalized information (e.g., a bird name, birdhouse name, observations of activity (e.g., nest building, egg laying, egg hatching, number of offspring), dates of activities, etc.).

Where the processor(s) and/or the machine learning unit 1905 determine animal related information at 2104, the processor can generate an output notification (e.g., a push notification) at operation 2106 and can cause the output notification to be sent to the computer system 1922 and/or causes display of the notification. The notification can include the determined animal related information. In other embodiments, the notification can prompt a user of the computer system 1922 for additional information or can provide additional information relating to a species of animal identified in the video (e.g., migratory habits, nesting habits, scientific classification, scientific name, etc.). Furthermore, the notification can include a prompt asking a user of the computer system 1922 if the user would like to view the video associated with the notification. In response to the user selecting the prompt to provide the video, the processor(s) and/or the machine learning unit 1905 output the video with the determined animal related information to the computer system 1922.

In other embodiments, the notification can further include a prompt to share the video to a third party (e.g., a social media website). In response to the user selecting the prompt to share the video, processor(s) can upload the video with the automatically determined animal related information and any user input animal related information to a third-party website and/or provides a link to the video to the computer system 1922.

At operation 2108, a determination can be made on whether the animal is a friend or a foe. The determination can be made based on the animal related information determined at operation 2104. In some embodiments, operations 2104 and 2108 can be combined together to form a single operation. In some embodiments, the determination of whether an animal is a friend or a foe can be made based on the size, shape, movement patterns, etc. of the animal.

An intruder defense device can be activated at operation 2110 where it is determined that an animal is a foe at operation 2108. The intruder defense device can be a speaker or a buzzer configured to generate a sound upon activation, a light configured to be flashed upon activation, or an actuatable member configured to be moved upon activation. Where the intruder defense device is an actuatable member, the intruder defense device can be configured to be moved to cover a portal or to prevent a predator from climbing further to reach the portal.

The method 2100 of FIG. 66 is merely exemplary, and the method 2100 can be modified in various embodiments. For example, the operations of the method 2100 can be performed in different orders, and some of the operations can be performed simultaneously. Additionally, some of the operations of the method 2100 can be omitted in some embodiments, and additional operations can be added to the method 2100 in other embodiments. In some embodiments, the method 2100 can be executed by processor(s) 1902, the machine learning unit 1905, and/or other components within the system 1900 of FIG. 64. However, the method 2100 can be performed using other components as well.

While the invention has been illustrated and described in detail in the drawings and foregoing description, such illustration and description are to be considered illustrative or exemplary and not restrictive; embodiments of the present disclosure are not limited to the disclosed embodiments. Other variations to the disclosed embodiments can be understood and effected by those skilled in the art in practicing embodiments of the present disclosure, from a study of the drawings, the disclosure, and the appended claims.

In the claims, the word "comprising" does not exclude other elements or steps, and the indefinite article "a" or "an" does not exclude a plurality. A single processor or other processing unit can fulfill the functions of several items recited in the claims. The mere fact that certain measures are recited in mutually different dependent claims does not indicate that a combination of these measured cannot be used to advantage. Any reference signs in the claims should not be construed as limiting the scope.

CONCLUSION

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A birdhouse comprising:
a housing including an inner volume;
a camera platform disposed within the inner volume, wherein the camera platform separates a nest chamber and a wiring chamber within the inner volume;
a camera connected to the camera platform;
a front wall defining a portal in open communication with the nest chamber and an environment external from the housing; and
a liner box configured to rest within the nest chamber, wherein the liner box further comprises a front liner panel, a left-side liner panel, a right-side liner panel, and a rear liner panel,
wherein the liner box includes a corner support member having a base portion and a plurality of brackets, wherein the brackets define slots, wherein the brackets are configured to receive a panel within each slot so that the panel is capable of sliding along the slot to adjust a size of the liner box, and wherein the panel is one of the front liner panel, the left-side liner panel, the right-side liner panel, or the rear liner panel.

2. The birdhouse of claim 1, further comprising:
a channel wall defining a channel extending through the nest chamber and in open communication with the wiring chamber and the external environment, wherein the channel is configured to retain wiring.

3. The birdhouse of claim 2, wherein the housing includes a ventilation gap in open communication with the wiring chamber and the external environment.

4. The birdhouse of claim 3, wherein the camera platform is sized and shaped based on a size and shape of the camera.

5. The birdhouse of claim 4, wherein the wiring chamber is vertically above the nest chamber and the camera is disposed within the nest chamber, wherein the camera platform includes an aperture extending through the camera platform, and wherein wiring for the camera extends through the aperture.

6. The birdhouse of claim 5, wherein a rotatable latch retains the camera or a removable camera panel housing the camera in a position vertically below the camera platform.

7. The birdhouse of claim 5, further comprising:
a nest chamber door that provides access to the nest chamber when open; and a wiring chamber door that provides access to the wiring chamber when open, wherein the nest chamber door and the wiring chamber door are different.

8. The birdhouse of claim 1, wherein the camera disposed within the inner volume is a first camera and further comprising:
a second camera connected to an exterior surface of the housing, wherein a direction of the second camera is adjustable.

9. The birdhouse of claim 8, wherein the second camera is connected to the exterior surface of the birdhouse via an arm that includes a conduit, wherein the conduit is in open communication with the channel and is configured to retain wiring associated with the second camera.

10. The birdhouse of claim 9, further comprising:
a portal assembly including a base plate and a removable portal plate, wherein a portal roof is integrally attached to the base plate, wherein the base plate defines a base plate opening, wherein the base plate is configured to be attached to the front wall of the birdhouse so that the base plate opening aligns with the portal of the front wall, wherein the removable portal plate defines a portal plate opening, and wherein the removable portal plate is removably attachable to the base plate or the front wall of the birdhouse so that the portal plate opening aligns with the portal of the front wall and the portal plate opening.

11. The birdhouse of claim 1, wherein the front liner panel defines a front opening, wherein the liner box is configured to be used in a nesting configuration and a roosting configuration, wherein the front opening is positioned at a first location in the nesting configuration, wherein the front opening is positioned at a second location in the roosting configuration, and wherein the first location is positioned above the second location.

12. The birdhouse of claim 11, wherein the liner box is configured to be converted from the nesting configuration to the roosting configuration by flipping the liner box upside down.

13. The birdhouse of claim 1, wherein a bottom wall includes a plurality of beveled corners and each of the beveled corners of the bottom wall define an opening that is communication with the nest chamber or a bottom chamber and the external environment, and wherein the camera platform includes a plurality of beveled corners and each of the beveled corners of the camera platform define an opening that is communication with the wiring chamber and the nest chamber.

14. The birdhouse of claim 13, wherein the openings defined by the beveled corners of the camera platform are configured to enable airflow from the nest chamber into the wiring chamber.

15. The birdhouse of claim 1, wherein, when the birdhouse is in use, the liner box is configured to rest within the nest chamber without any attachments between the liner box and the walls forming the nest chamber.

16. The birdhouse of claim 1, wherein the brackets define extended portions that are configured to act as spacers that enable airflow around the liner box when the liner box is received within the nest chamber.

17. The birdhouse of claim 1, further comprising a nest chamber floor and a bottom wall, wherein a bottom chamber is positioned between the bottom wall and the nest chamber floor, wherein the nest chamber is positioned directly above the nest chamber floor, wherein a bottom panel is configured to be attached to the bottom wall, wherein the bottom panel is configured to be adjusted to enable adjustment of an airflow level within the birdhouse and the nest chamber without entering the nest chamber.

18. The birdhouse of claim 1, further comprising:
a roosting peg configured to be attached to a panel of the liner box or to the housing of the birdhouse.

19. A birdhouse comprising:
a housing including an inner volume;
a camera platform disposed within the inner volume, wherein the camera platform separates a nest chamber and a wiring chamber within the inner volume;
a camera connected to the camera platform;
a front wall defining a portal in open communication with the nest chamber and an environment external from the housing;
a liner box configured to rest within the nest chamber;
wherein the camera is disposed within the inner volume is a first camera and further comprising, and a second camera connected to an exterior surface of the housing, wherein a direction of the second camera is adjustable; and wherein the second camera is connected to the exterior surface of the birdhouse via an arm that includes a conduit, wherein the conduit is in open communication with the channel and is configured to retain wiring associated with the second camera.

\* \* \* \* \*